Figure 4:
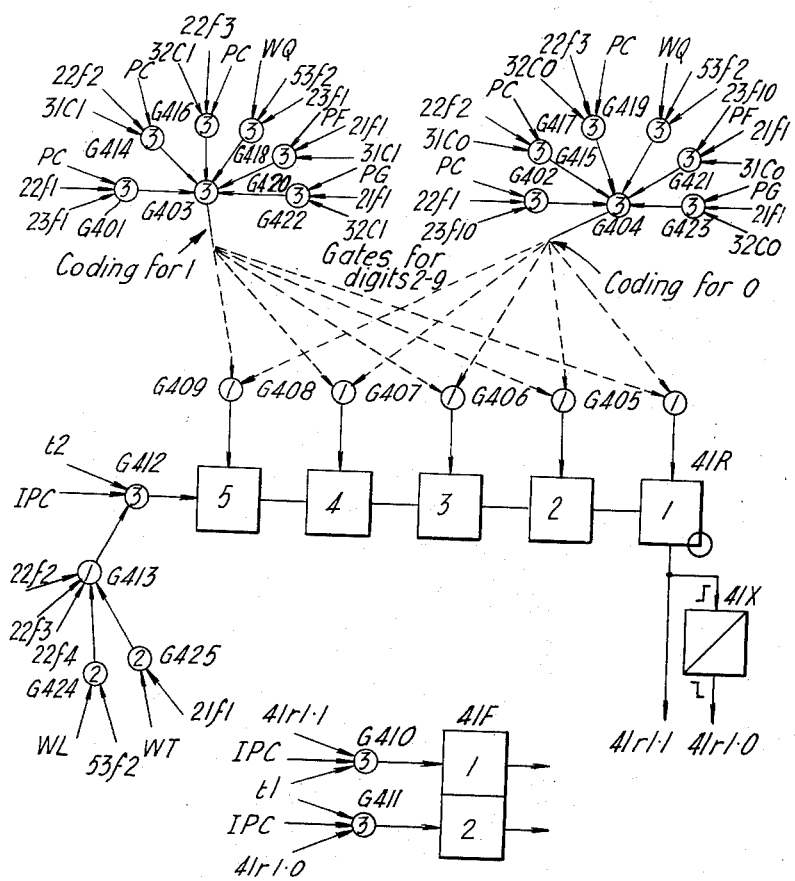
Figure 5:
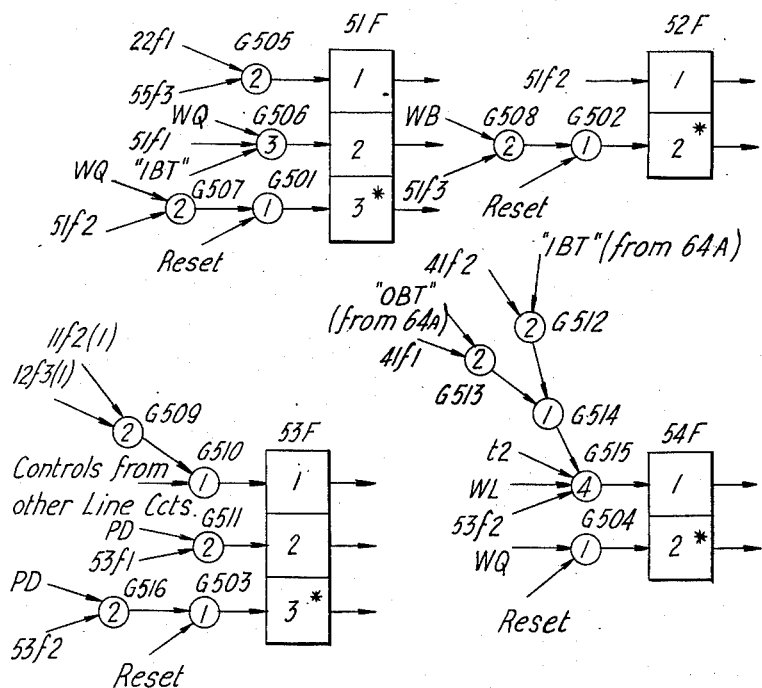

April 25, 1961 E. P. G. WRIGHT ET AL 2,981,789
ELECTRIC SIGNALLING SYSTEMS
Filed Aug. 7, 1956 33 Sheets-Sheet 1
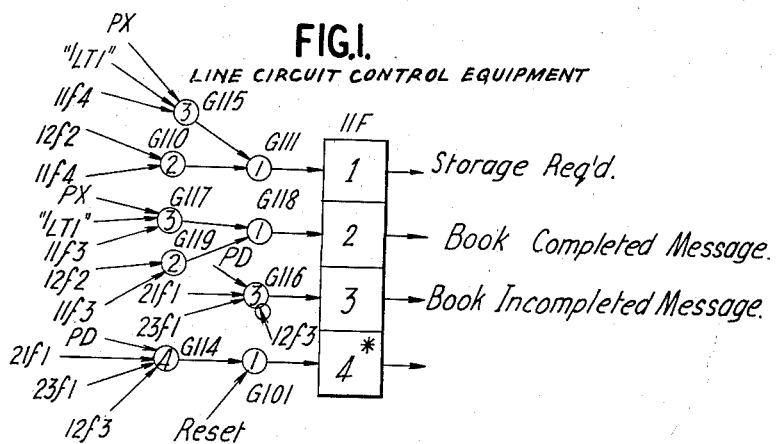
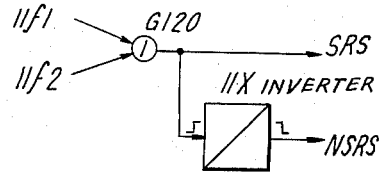
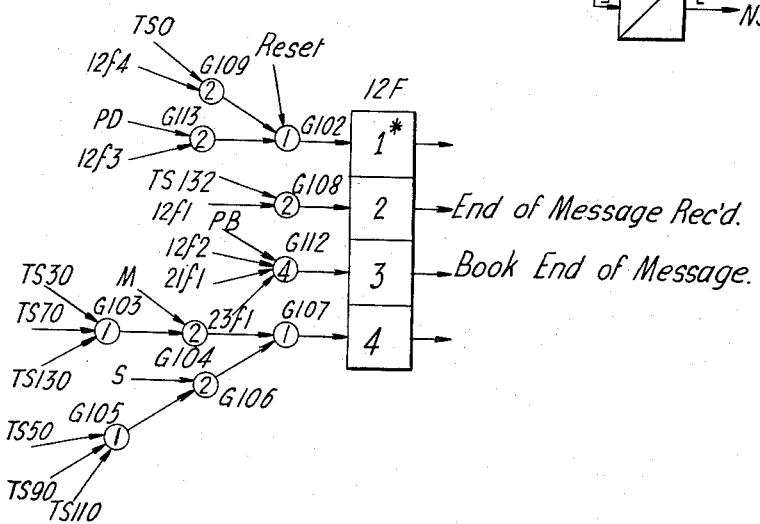
Inventors
E. P. G. WRIGHT
D. A. WEIR
J. RICE
By Robert Harding Jr.
Attorney

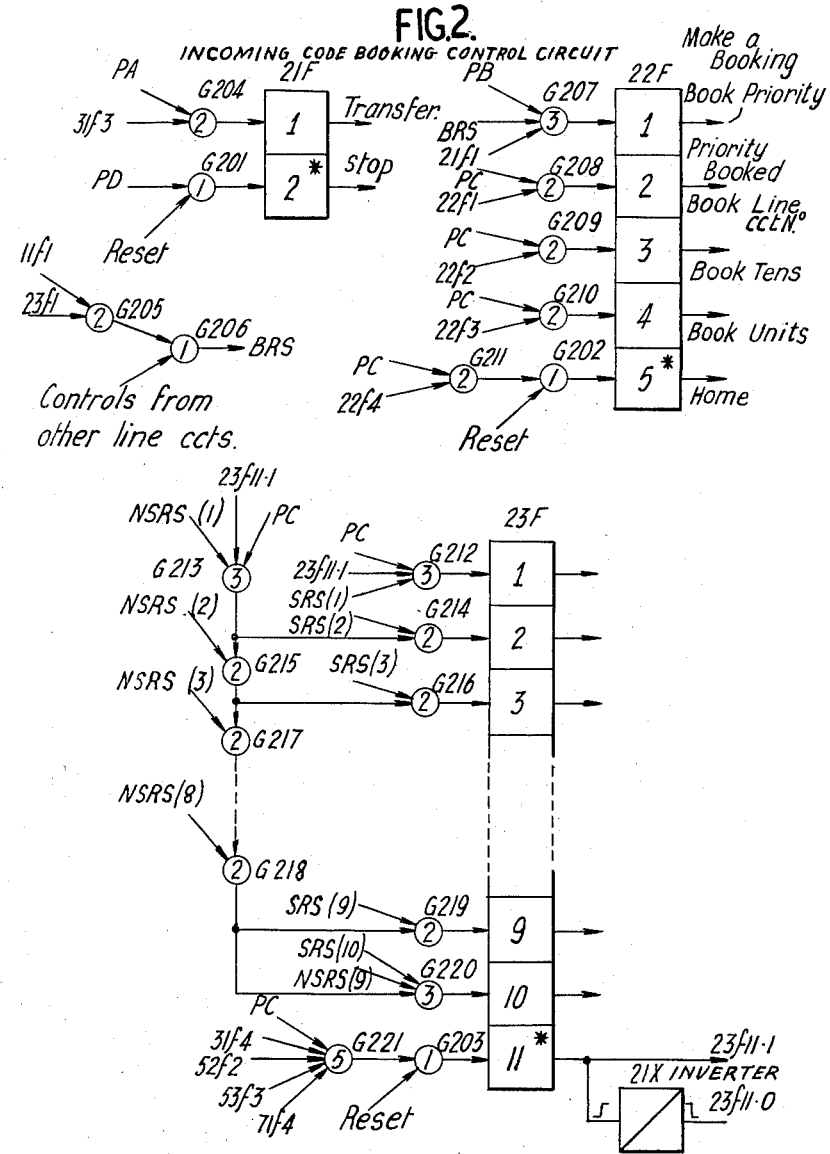

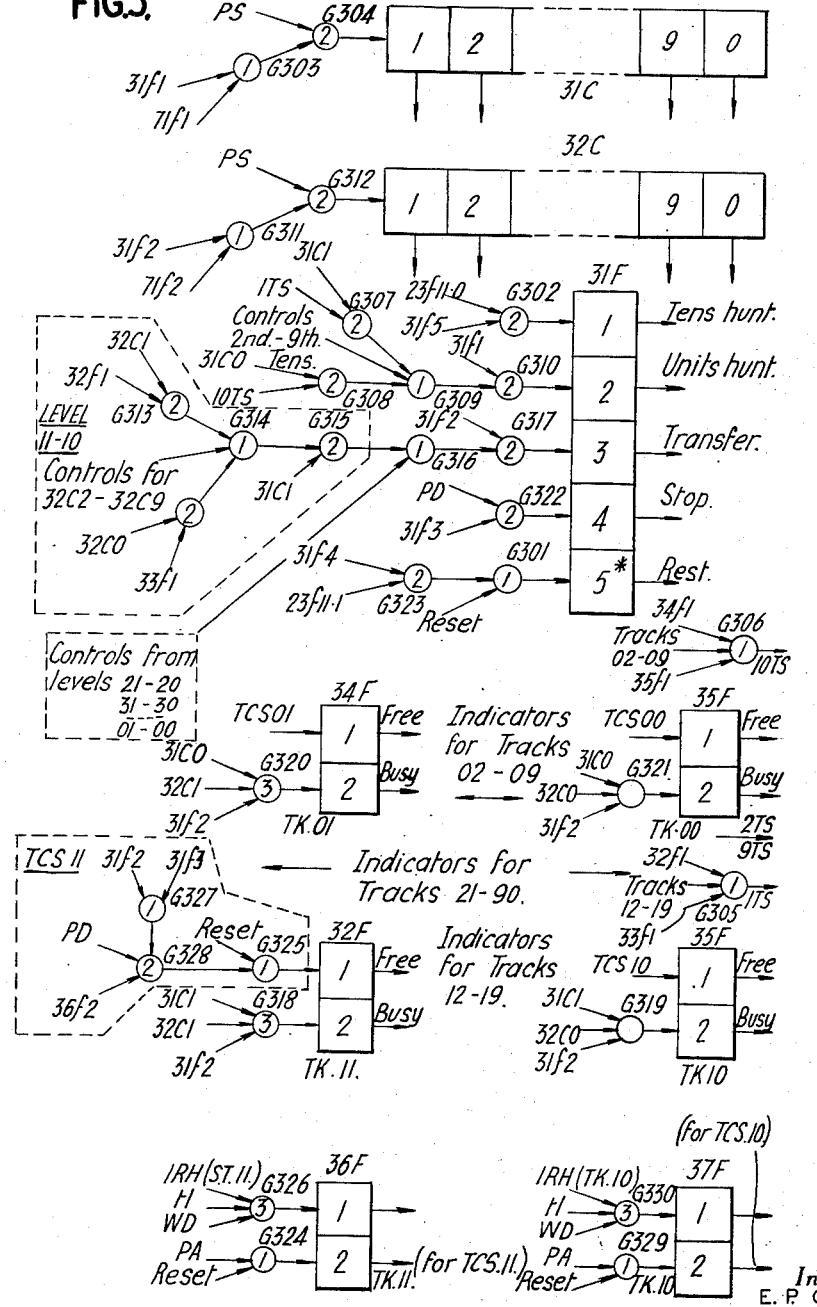

BOOKING REGISTER CIRCUIT

INCOMING BOOK TRANSFER CIRCUIT

April 25, 1961     E. P. G. WRIGHT ET AL     2,981,789
ELECTRIC SIGNALLING SYSTEMS Filed Aug. 7, 1956     33 Sheets-Sheet 6

COMMON STORAGE CONTROL CIRCUIT

Inventors
E. P. G. WRIGHT-
D. A. WEIR-
J. RICE
By Robert Harding Jr.
Attorney

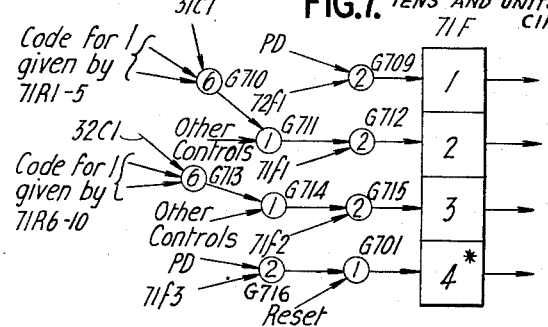
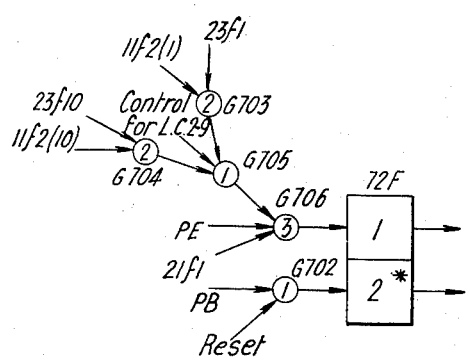
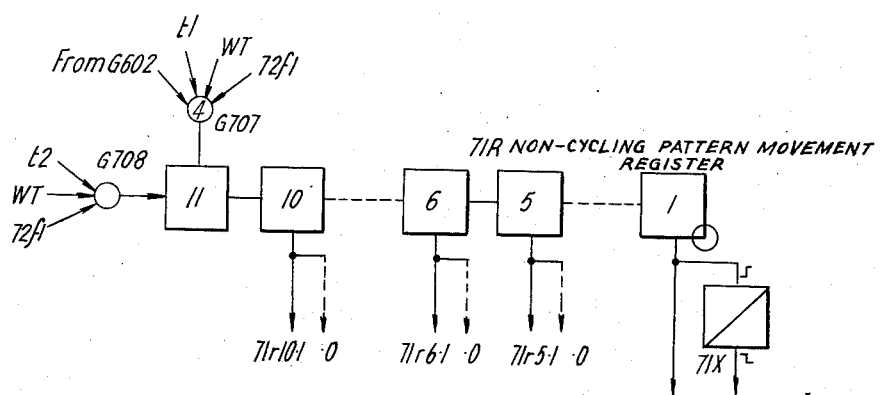

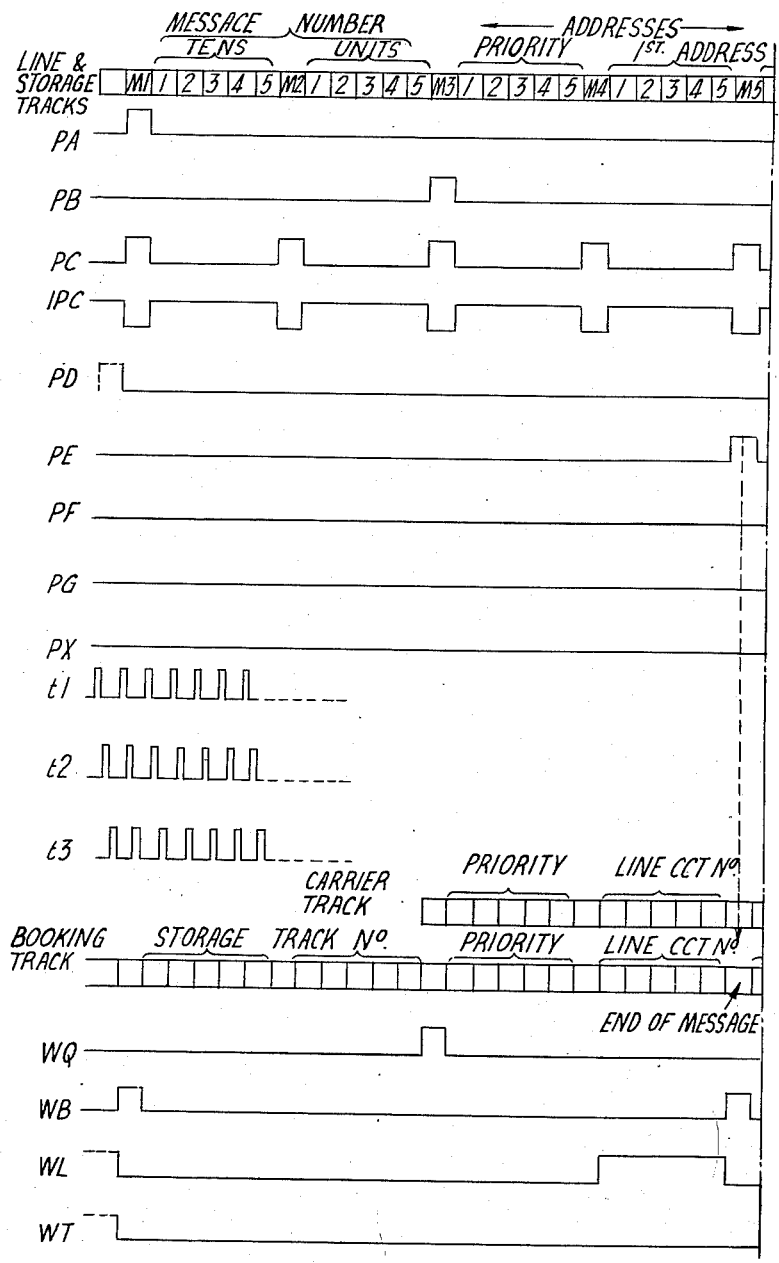

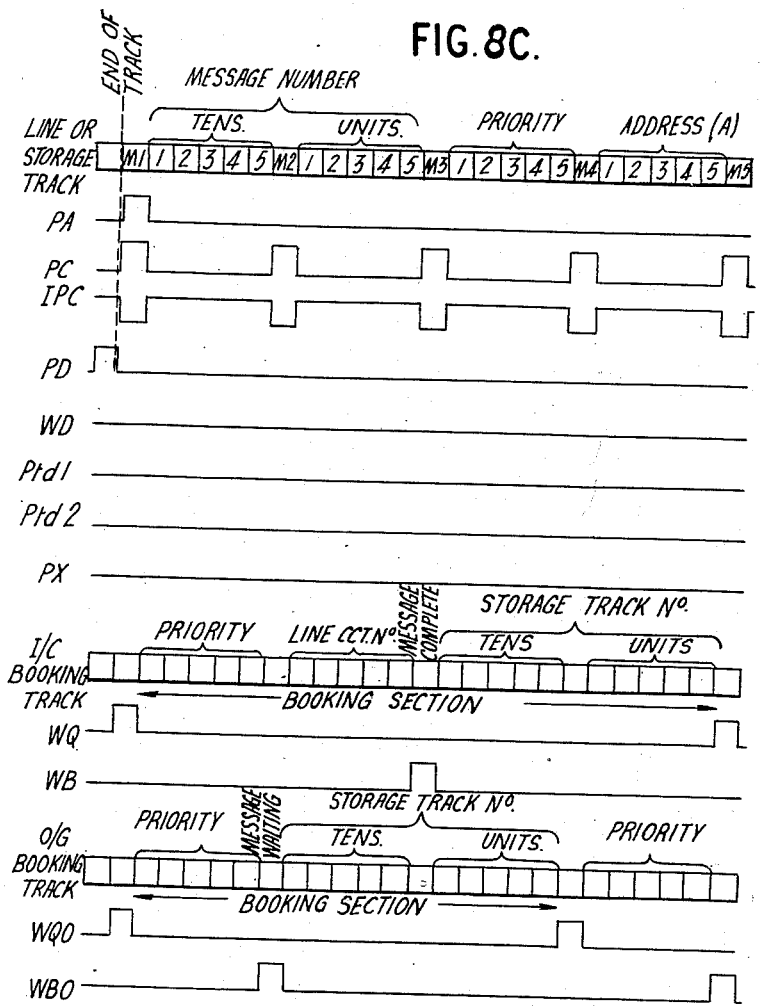

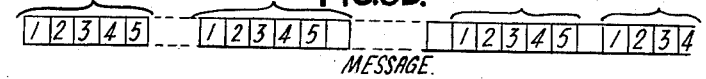
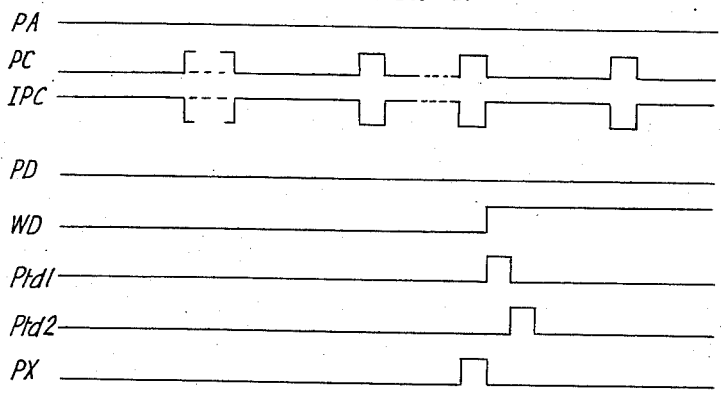
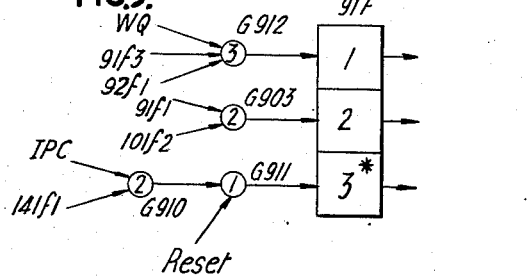
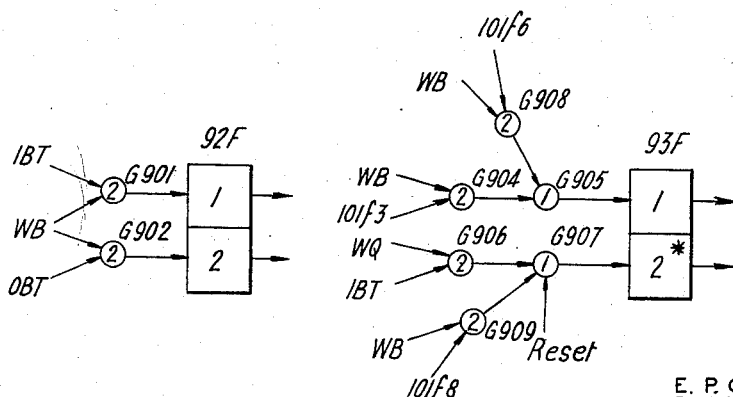

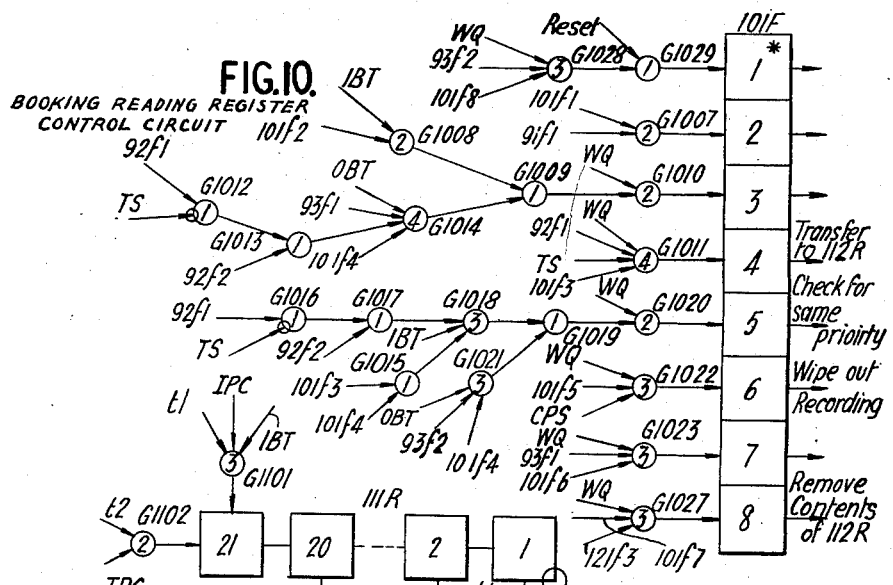
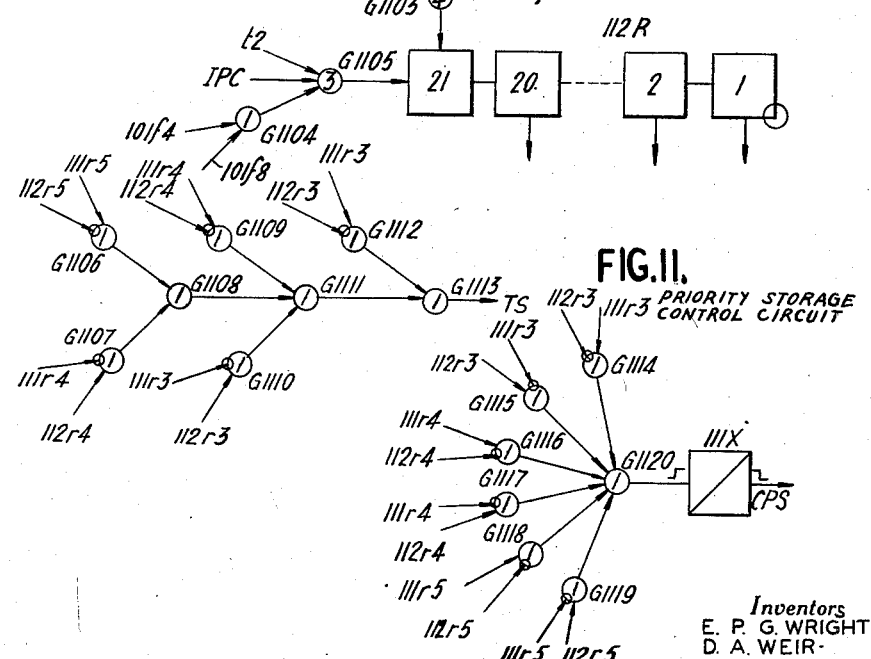

April 25, 1961    E. P. G. WRIGHT ET AL    2,981,789
ELECTRIC SIGNALLING SYSTEMS
Filed Aug. 7, 1956    33 Sheets-Sheet 13
FIG.12.
BOOKING SEARCH CONTROL CIRCUIT
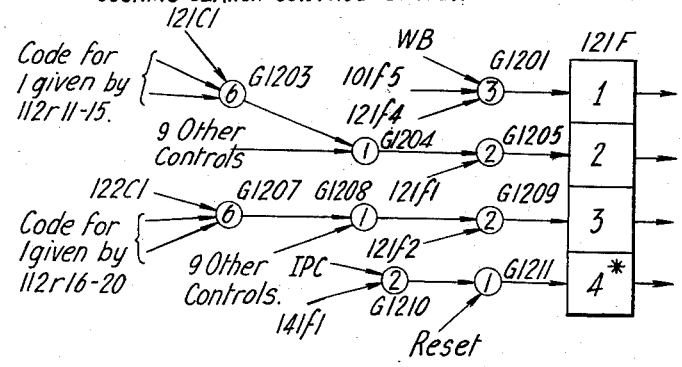
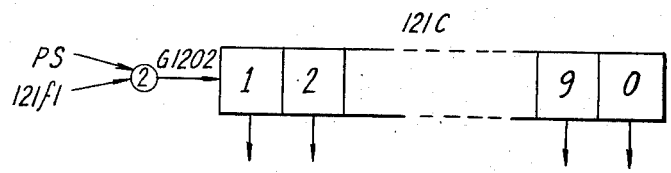
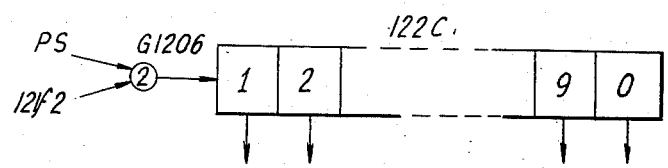
Inventors
E. P. G. WRIGHT-
D. A. WEIR-
J. RICE
By
Attorney April 25, 1961  E. P. G. WRIGHT ET AL  2,981,789
ELECTRIC SIGNALLING SYSTEMS
Filed Aug. 7, 1956  33 Sheets-Sheet 14
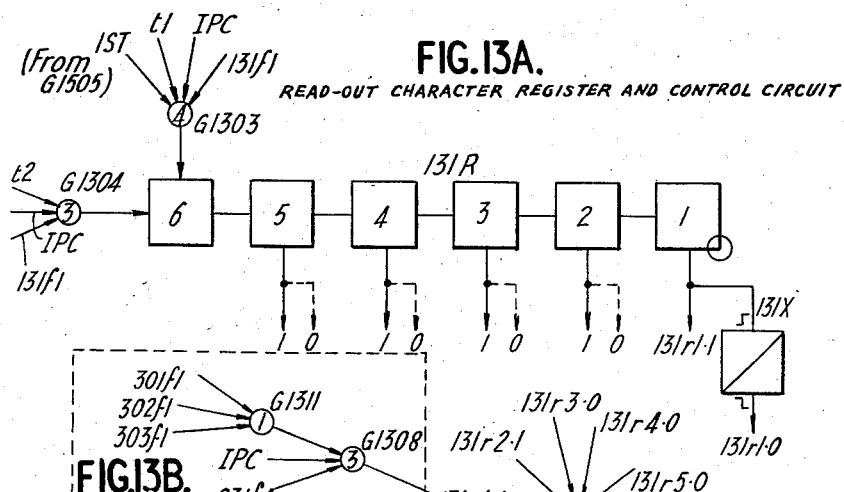
FIG.13A.
READ-OUT CHARACTER REGISTER AND CONTROL CIRCUIT
FIG.13B.
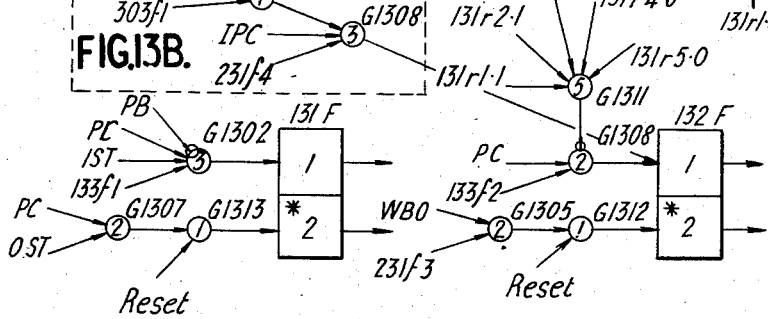
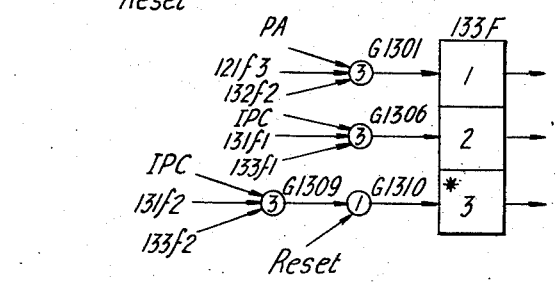
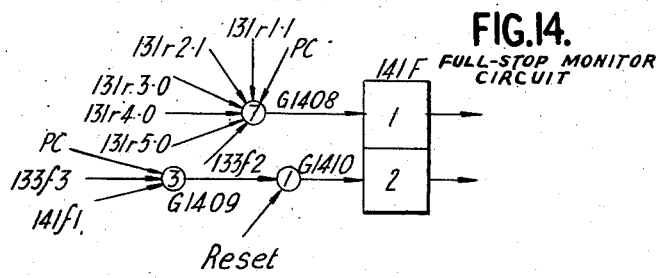
FIG.14.
FULL-STOP MONITOR CIRCUIT
Inventors
E. P. G. WRIGHT-
D. A. WEIR-
J. RICE
By
Attorney April 25, 1961  E. P. G. WRIGHT ET AL  2,981,789
ELECTRIC SIGNALLING SYSTEMS
Filed Aug. 7, 1956  33 Sheets-Sheet 17
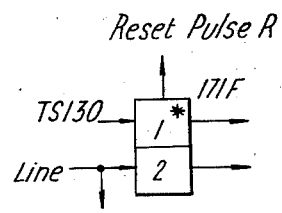
FIG.17.
INCOMING CODE RECEIVER
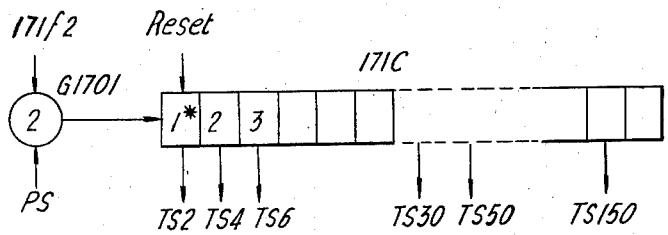
FIG.18.
TRANSFER STORAGE REGISTER CIRCUIT
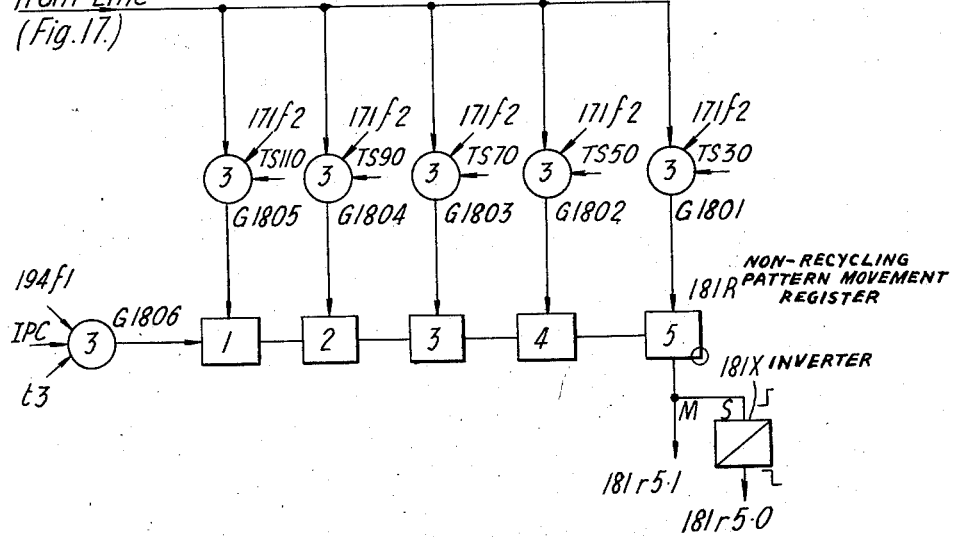
Inventors
E. P. G. WRIGHT-
D. A. WEIR-
J. RICE
By
Attorney April 25, 1961    E. P. G. WRIGHT ET AL    2,981,789
ELECTRIC SIGNALLING SYSTEMS
Filed Aug. 7, 1956    33 Sheets-Sheet 18

MEMORY-STORE TRANSFER CONTROL CIRCUIT

MEMORY-STORE RECORDING CONTROL CIRCUIT

Inventors
E. P. G. WRIGHT
D. A. WEIR
J. RICE
By
Attorney

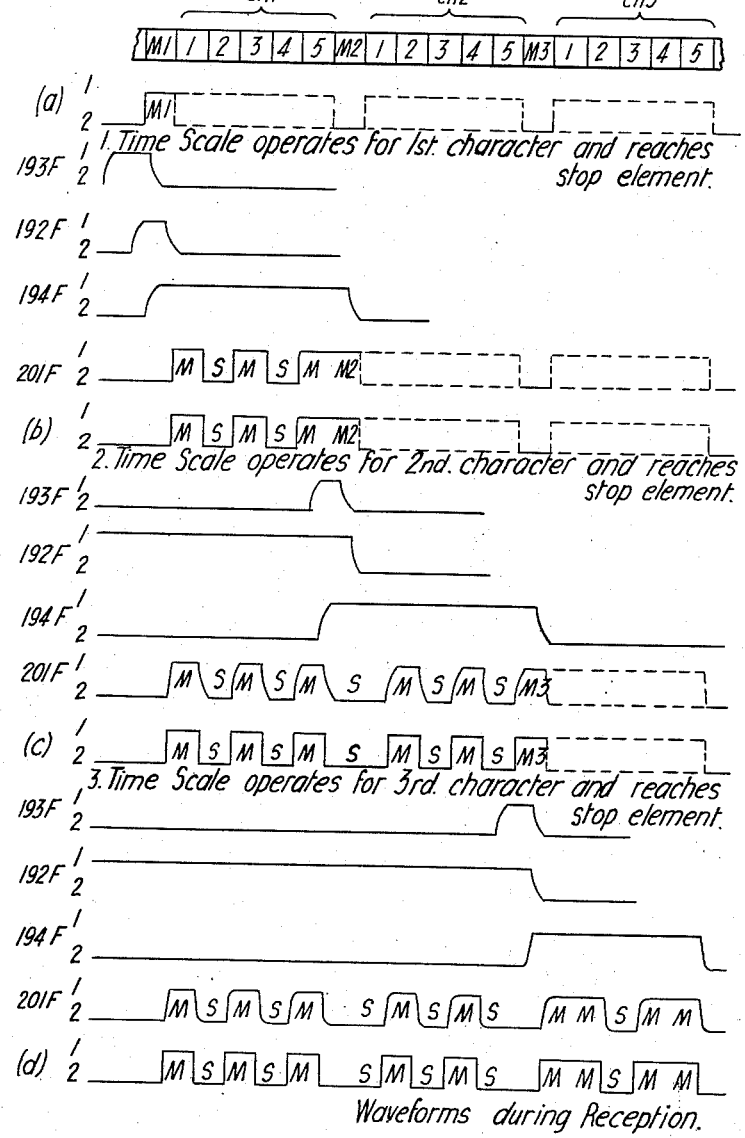
FIG. 21. CHART OF REGISTER OPERATIONS DURING CODE RECEPTION AND STORAGE
Waveforms during Reception.

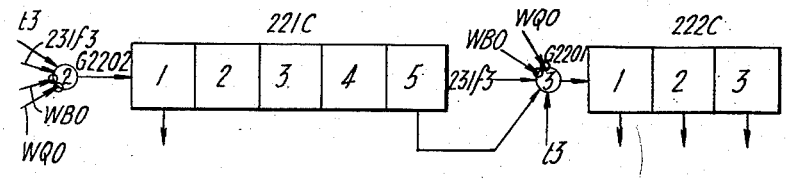

OUTGOING BOOKING TRACK ADDRESS CONTROL CIRCUIT

OUTGOING ADDRESS CONCENTRATOR CIRCUIT

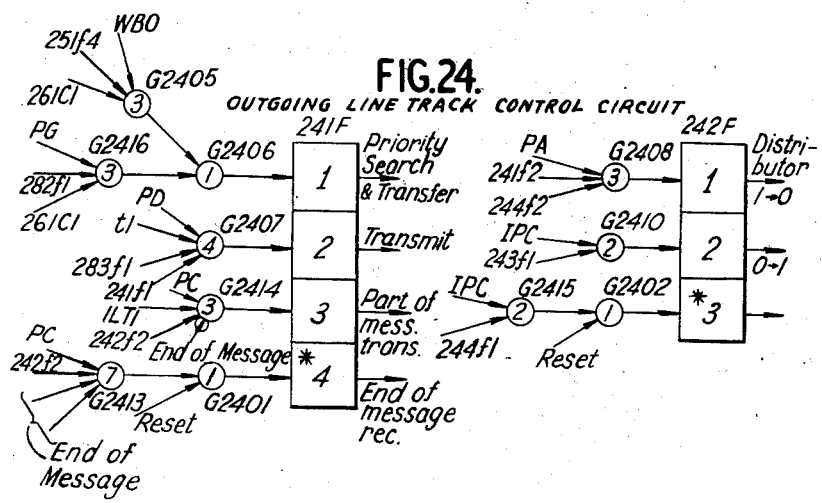
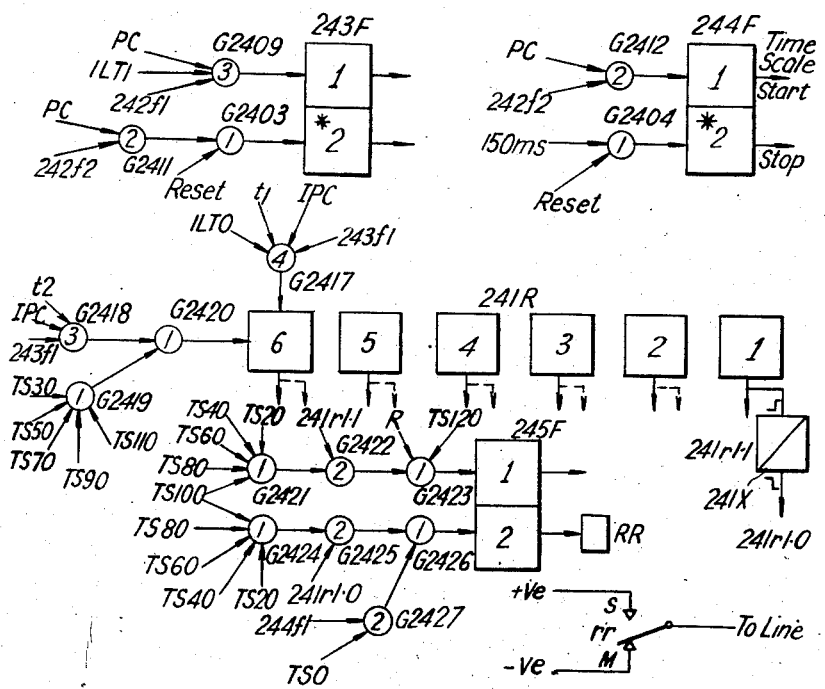
FIG.24. OUTGOING LINE TRACK CONTROL CIRCUIT

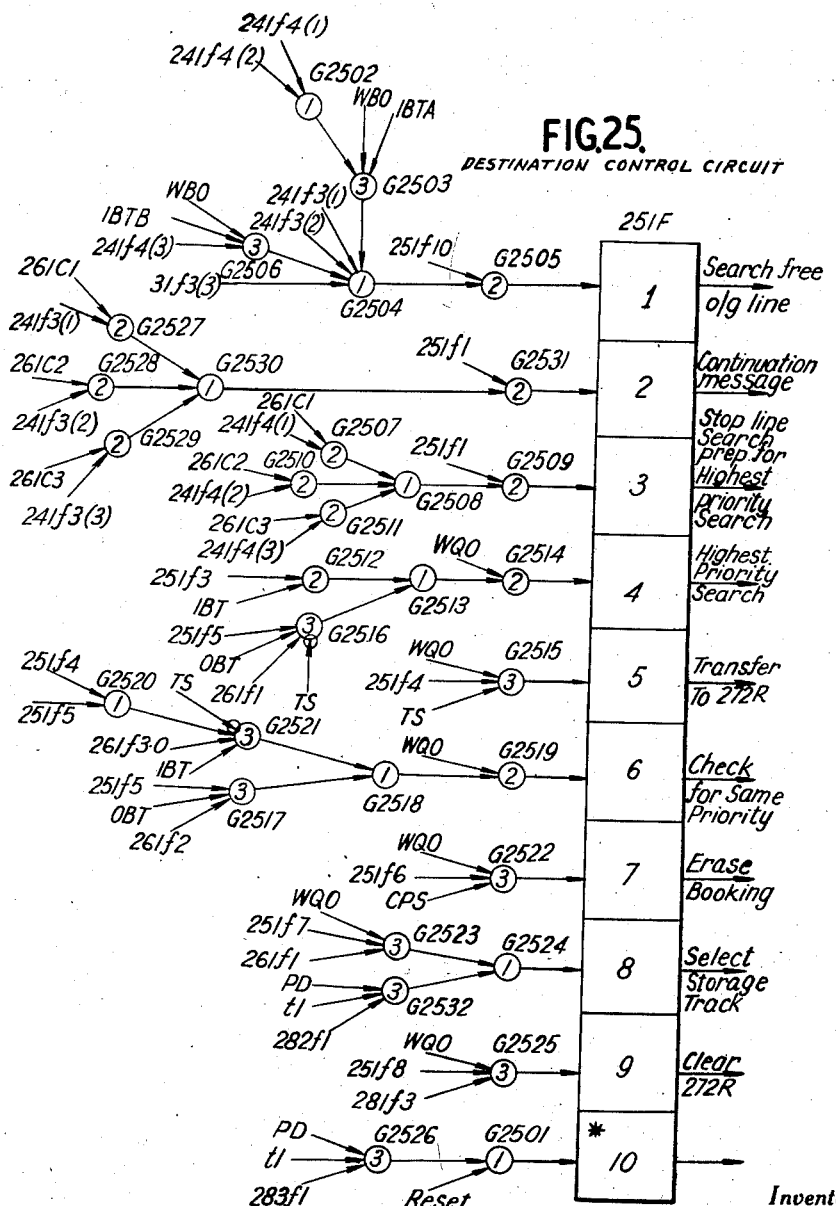

FIG. 26.
DESTINATION CONTROL CIRCUIT
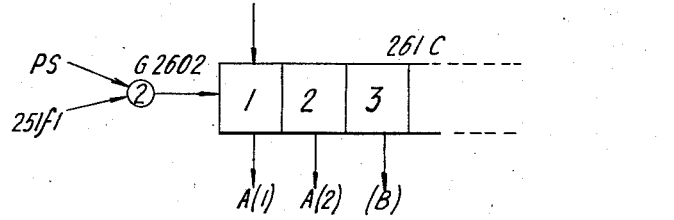
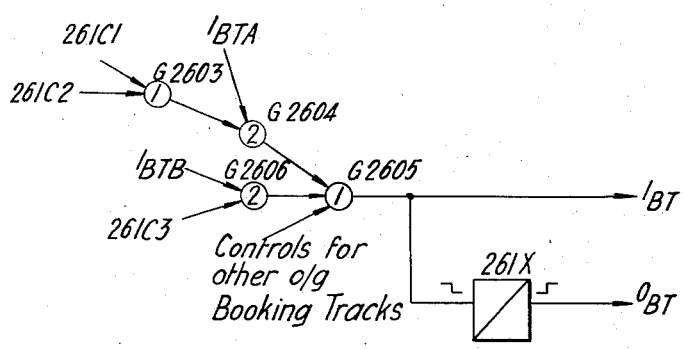
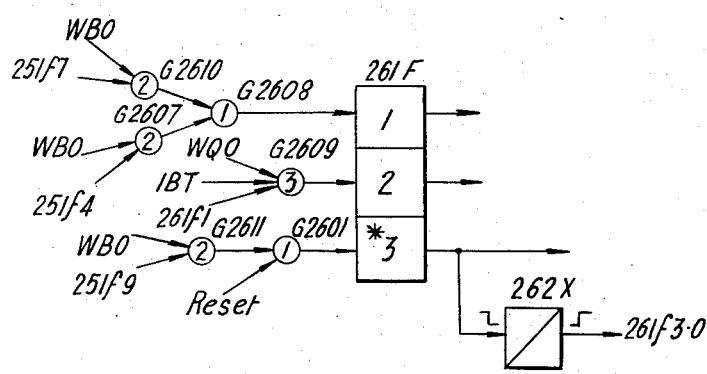

OUTGOING BOOKING PRIORITY CIRCUIT

Inventors
E. P. G. WRIGHT·
D. A. WEIR·
J. RICE

April 25, 1961  E. P. G. WRIGHT ET AL  2,981,789
ELECTRIC SIGNALLING SYSTEMS
Filed Aug. 7, 1956
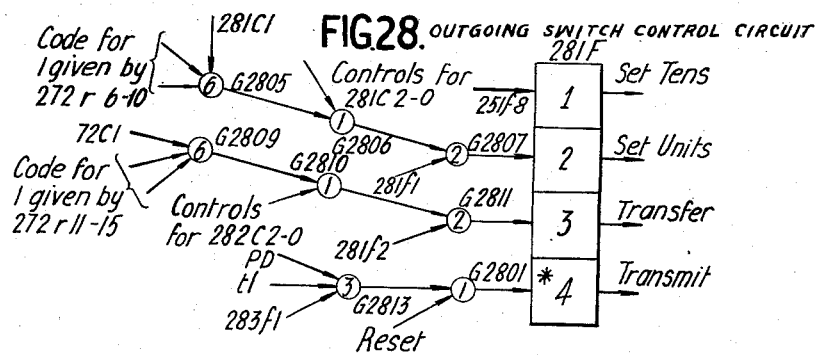
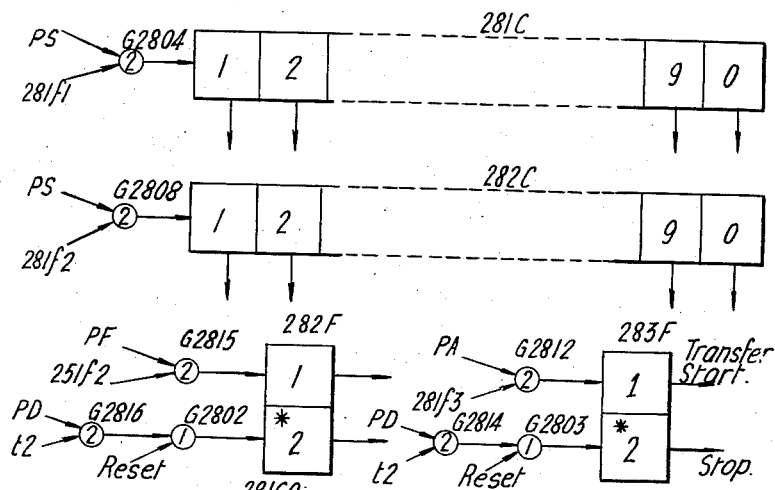
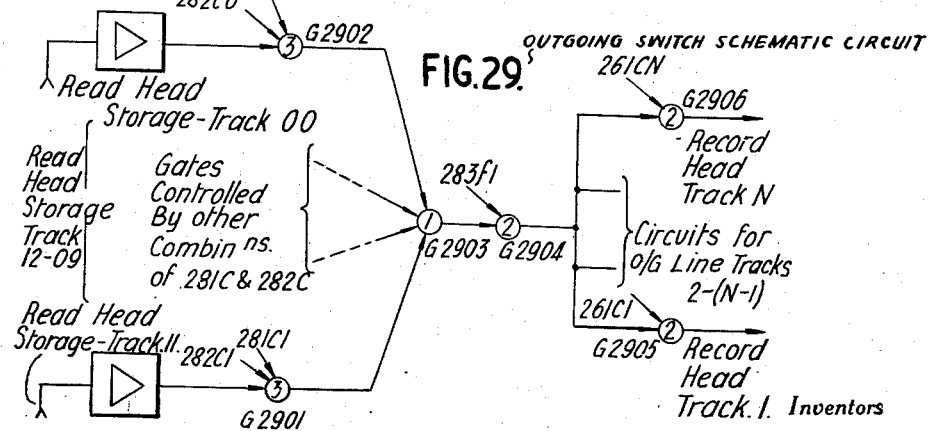
Inventors
E. P. G. WRIGHT
D. A. WEIR  J. RICE
By Robert Harding Jr.
Attorney

LINE-TO-STORE

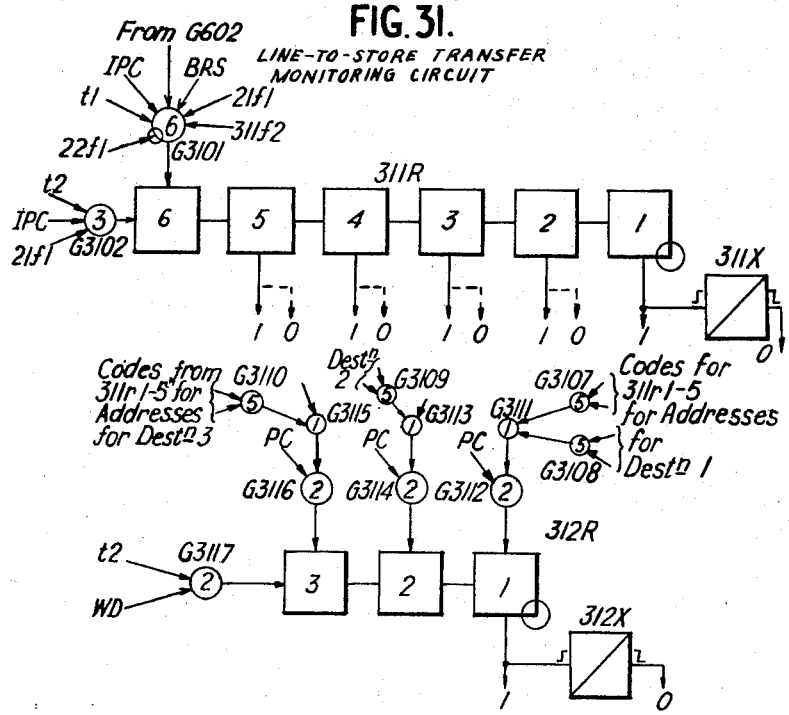
FIG. 31.
LINE-TO-STORE TRANSFER MONITORING CIRCUIT
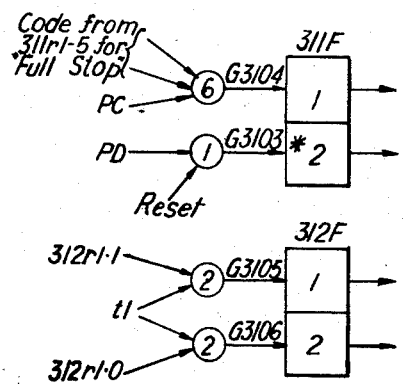

SCHEMATIC OF ADDRESS CODE CONCENTRATION AND GENERATION

April 25, 1961  E. P. G. WRIGHT ET AL  2,981,789
ELECTRIC SIGNALLING SYSTEMS
Filed Aug. 7, 1956  33 Sheets-Sheet 33
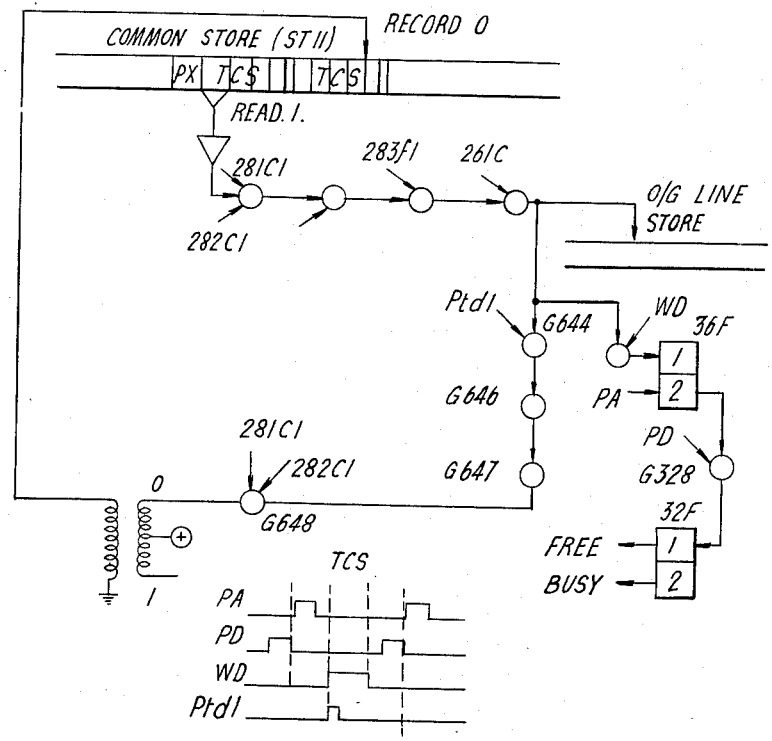
FIG.35. SCHEMATIC OF CODE CONTROL AND TRACK CIRCUITS
Inventors
E. P. G. WRIGHT·
D. A. WEIR·
J. RICE
By Robert Harding Jr
Attorney

United States Patent Office 2,981,789
Patented Apr. 25, 1961

2,981,789
ELECTRIC SIGNALLING SYSTEMS
Esmond Philip Goodwin Wright, Donald Adams Weir, and Joseph Rice, London, England, assignors to International Standard Electric Corporation, New York, N.Y.

Filed Aug. 7, 1956, Ser. No. 602,608
Claims priority, application Great Britain Sept. 27, 1955
39 Claims. (Cl. 178—2)

This invention relates to a telecommunication exchange for the storage and retransmission of intelligence.

In prior U.S. application Serial No. 433,742, filed June 1, 1954 a description was given of a telegraph switching system using magnetic drum technique but which was only semi-automatic in character, requiring the intervention of an operator to direct telegraph messages received at a switching-centre to the appropriate outgoing direction or directions, under the control of an outgoing booking made by the operator in a booking register appropriate to such direction or directions.

In certain classes of telegraph switching practice, the intervention of an operator to direct the message is a very necessary feature, where, for example, priorities are an important consideration, or individual addressees must first be located. An operator, however, is not an essential feature of a telegraph switching system, and an operator's switching function may be readily carried out automatically by the provision of suitable controls and tests.

The present invention provides the additional features and makes the modifications necessary to the previously described semi-automatic system to render it fully automatic, and capable of receiving and storing incoming messages and retransmitting them in one or more directions according to coded instructions contained in the messages.

According to the invention, therefore, there is provided a telecommunication exchange which is capable of automatically storing incoming messages and of automatically retransmitting stored messages in accordance with destination information carried by each message, and in which each received message is automatically directed into storage equipment from which it is automatically transmitted over an outgoing channel.

In a practical switching system, it is possible that the number of addressees for delivery of the message is not necessarily the same as the number of outgoing bookings which need be made, that is to say, a message transmitted on one particular outgoing trunk might serve for two or more of the addressees, a further selection of addressees being made at the next switching centre. With operator intervention, this presents no problems, for, upon seeing the "first line" of the message, an operator would be able to decide how many and which bookings have to be made in the outgoing direction. In the automatic preparation of outgoing bookings, other arrangements are needed to cope with such a situation.

Further, arrangements are also now described for freeing a central store for further use when the contents of the store have been transmitted to the necessary number of destinations.

In spite, however, of the remarks made above regarding concentration of addressees for one destination, it is proposed to describe first the alternative arrangement, wherein each addressee is dealt with on an individual basis, and addressees accessible through the same destination are not concentrated, that is to say, as many bookings are made as there are addressees, regardless of their location.

Further, arrangements will also be described for providing a Track Clearing Signal, the existence of which was previously referred to, which is a necessary feature in a fully automatic system for indicating when a message stored in a central storage track has been fully transmitted to all indicated addressees, so that the store may be marked free for further use.

A wide variety of storage devices of "non-expendible" character is now coming into use in which intelligence can be recorded by creating internal strains in the material of the store, and in which stored intelligence or predetermined portions thereof can be detected by detecting the state of strain in the material or in corresponding portions thereof, without destruction or exhaustion of the material of the store.

Examples of inernal strains which are used to store intelligence are magnetisations of either one of two polarities, as in the magnetic drum, tape or wire, or in the static magnetic matrix, electrifications of either one or two polarities, as in the ferro-electric storage matrix, electric charges of either one of two polarities, as in the cathode ray tube storage device, and compression waves as in acoustic delay lines and magnetostrictive delay lines.

The term store, or "non-expendible store," as used in the present specification and in the claims appended thereto should therefore be interpreted to include any device falling within the terms of this definition, and capable of storing a number of binary digits, each portion of a store capable of storing one binary digit (or telegraph character element) being called a storage element, and in any case includes al the examples listed in the preceding paragraph, but excludes mechanical types of storage such as paper tapes.

In the embodiment of the invention about to be described, the form of temporary storage used is a magnetic drum or disc such as has been used in electrical computers as a storage device.

The invention will be described with reference to the accompanying drawings illustrating a completely automatic system embodying the features just referred to.

In the accompanying drawings:

Figs. 1–7 are control circuits used in transferring a message received on a line terminating store to a common store, and in making a booking entry relative to the message transferred. Of these figures, Fig. 3 includes the modifications necessary to provide a Track Clearing Signal, shown in the prior specification as a signal TCS of undisclosed origin: this is a necessary feature in a fully automatic system; and Fig. 6 includes further modifications associated with the provision of Track Clearing Signals.

Figure 8B:
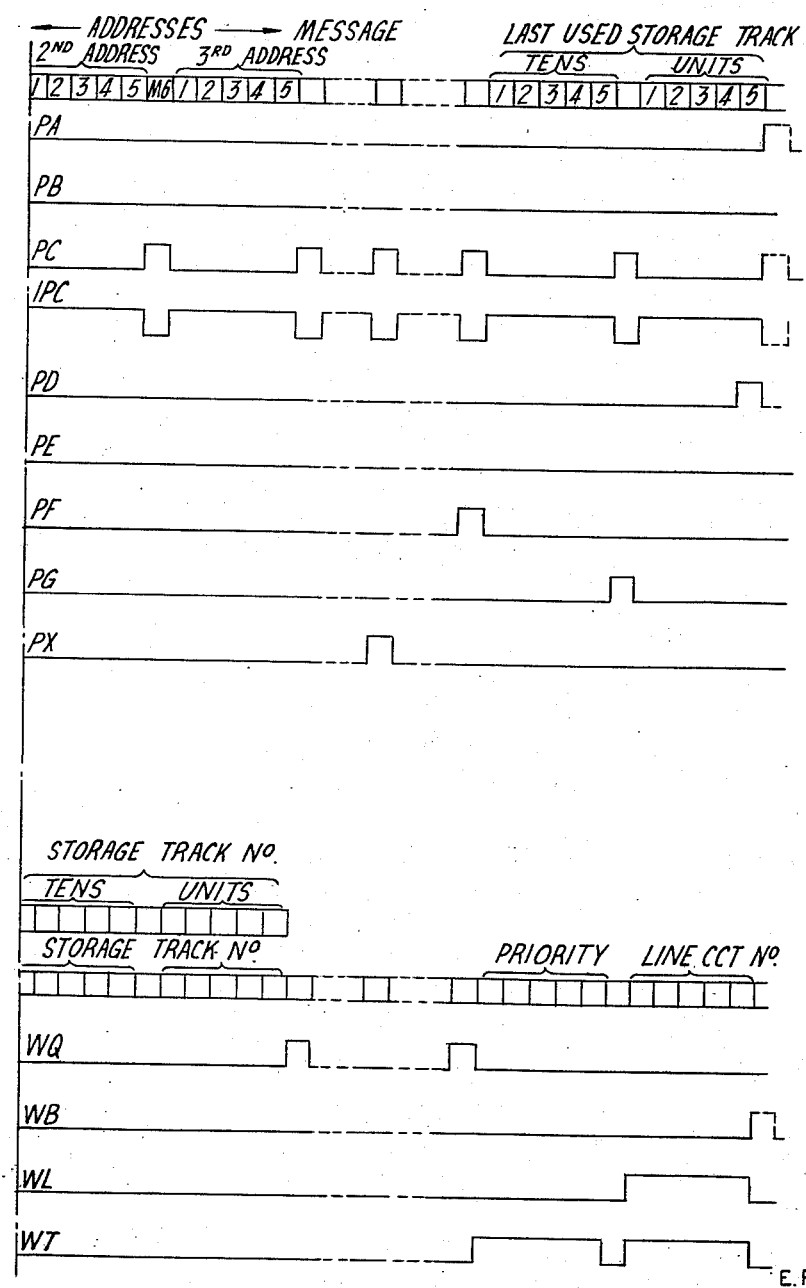

Fig. 8, in four parts shown as A–D, shows various controlling waveforms and pulse trains together with a representation of sections of a magnetic drum storage track used for line storage, common storage, and message booking. Figs. 8A and 8B show a common storage track, and an incoming message booking track and a so-called "carrier track" for assembling booking entries into the correct sequence, while Figs. 8C and 8D repeat some of the detail of Figs. 8A and 8B but add new wave-forms and a representation of an outgoing booking track, and are specifically directed to showing the modifications necessary for address concentration and the use of track clearing signals.

Figs. 9–15 are control circuits used in determining the highest priority of all messages in the common store.

Figure 16:
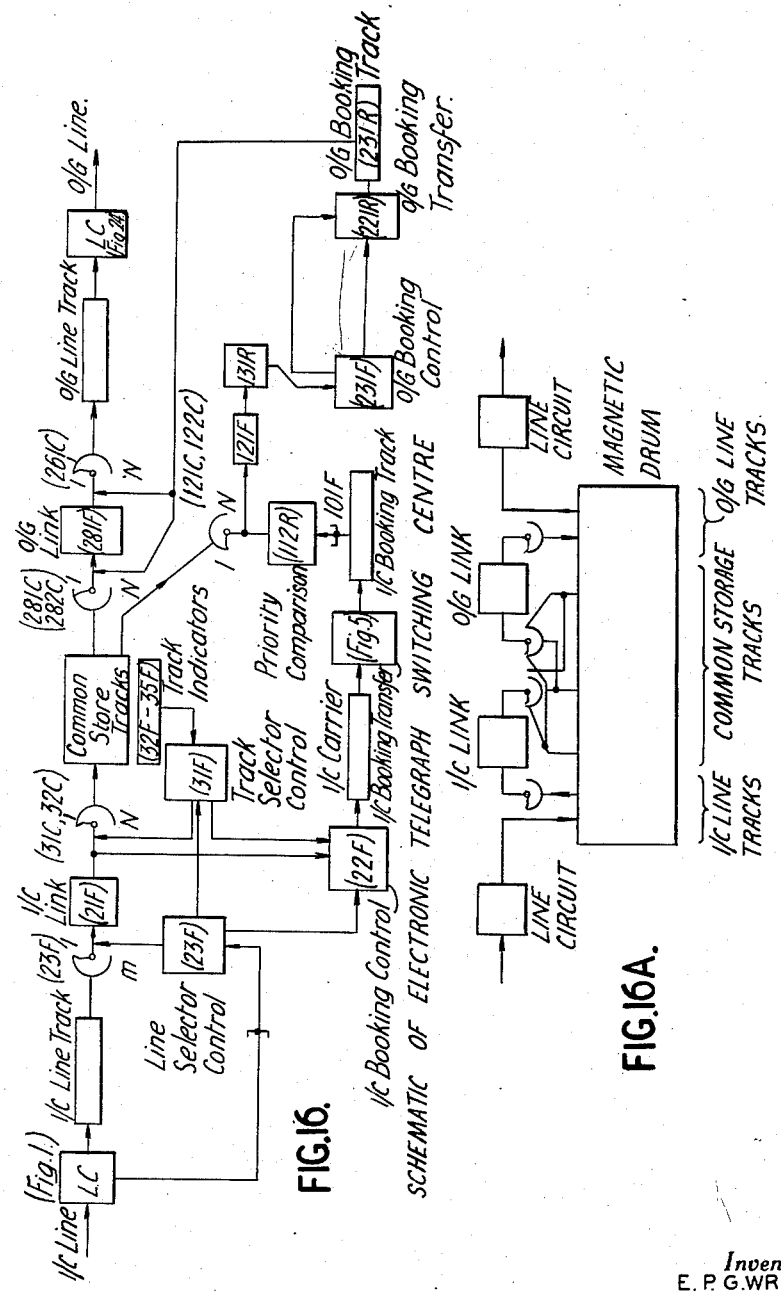

Figs. 16 and 16A comprise an overall block schematic of an electronic teleprinter exchange, and are supplemented by Figs. 32–35 which analyse specific functions to be described.

Figure 23A:
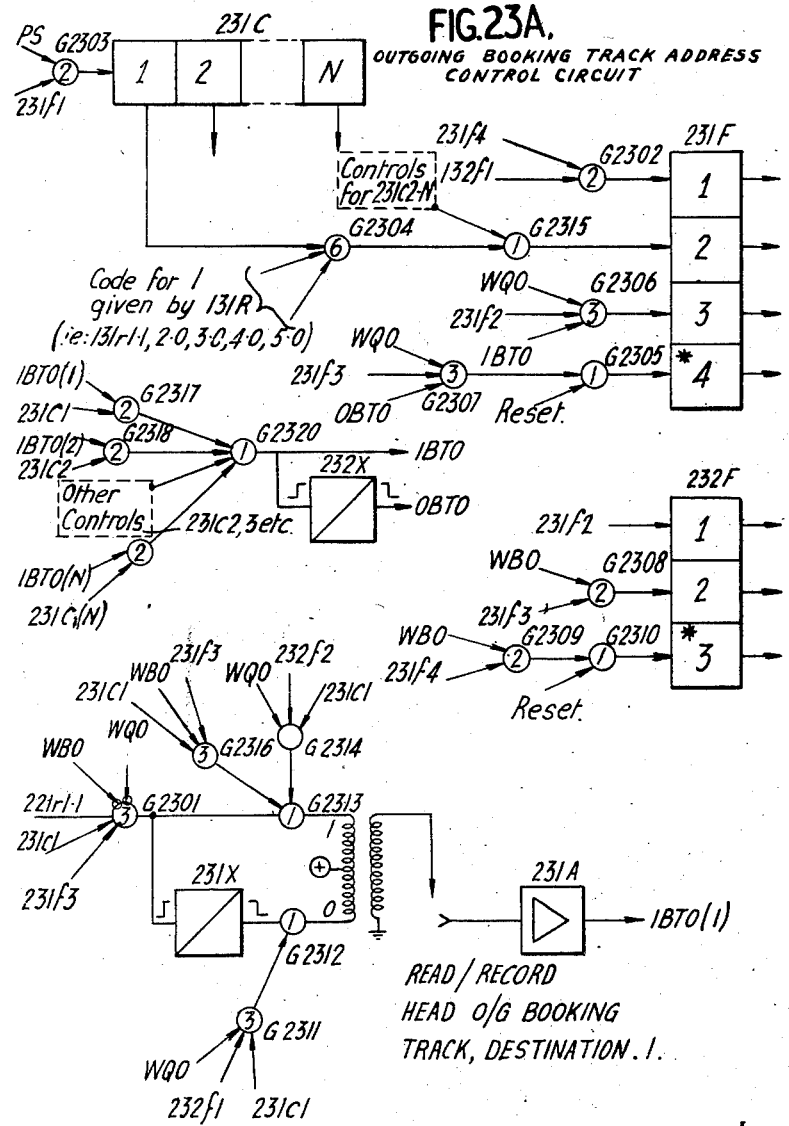
Figure 23B:
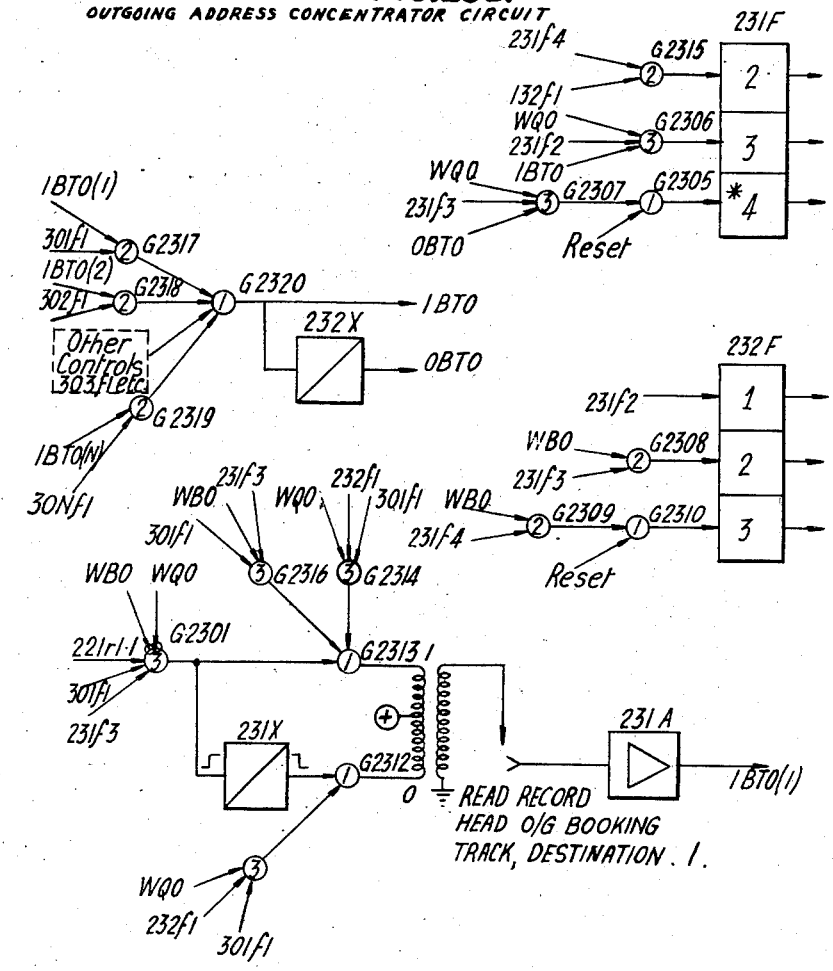
Figure 27:
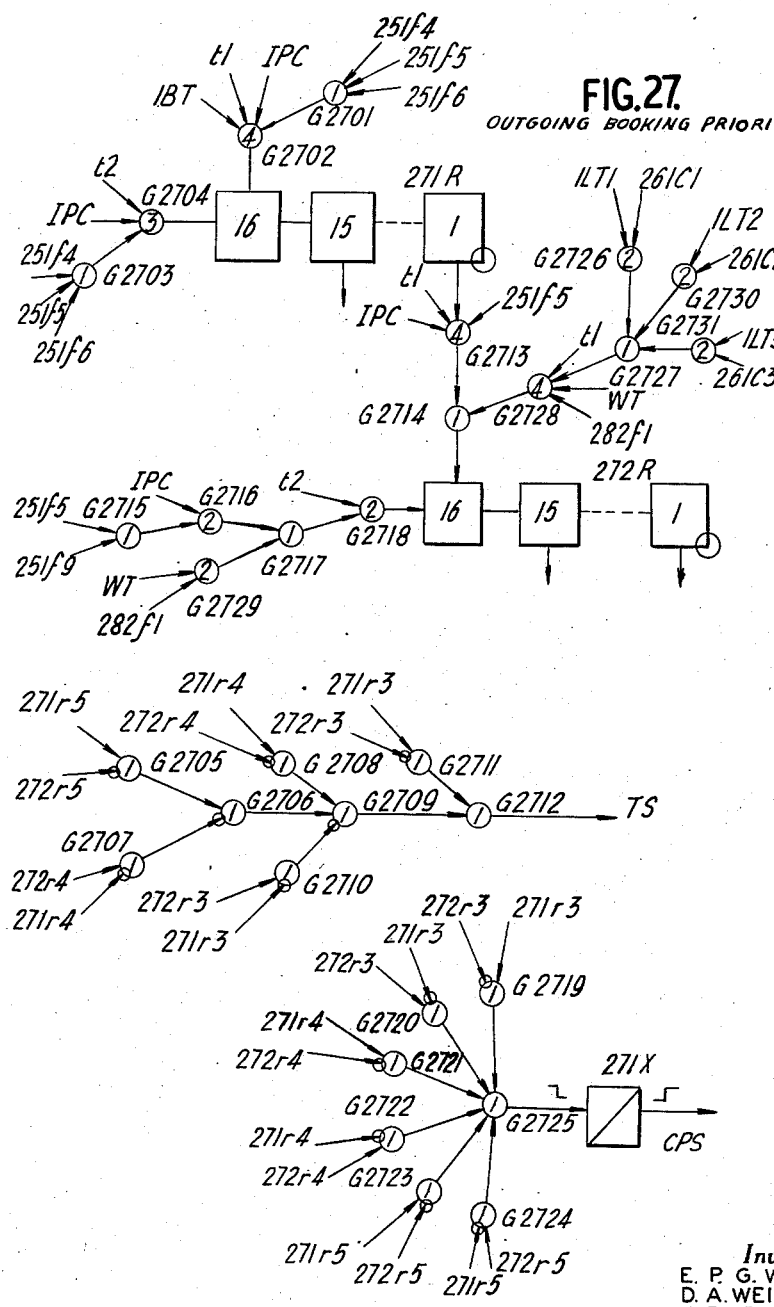
Figure 30:
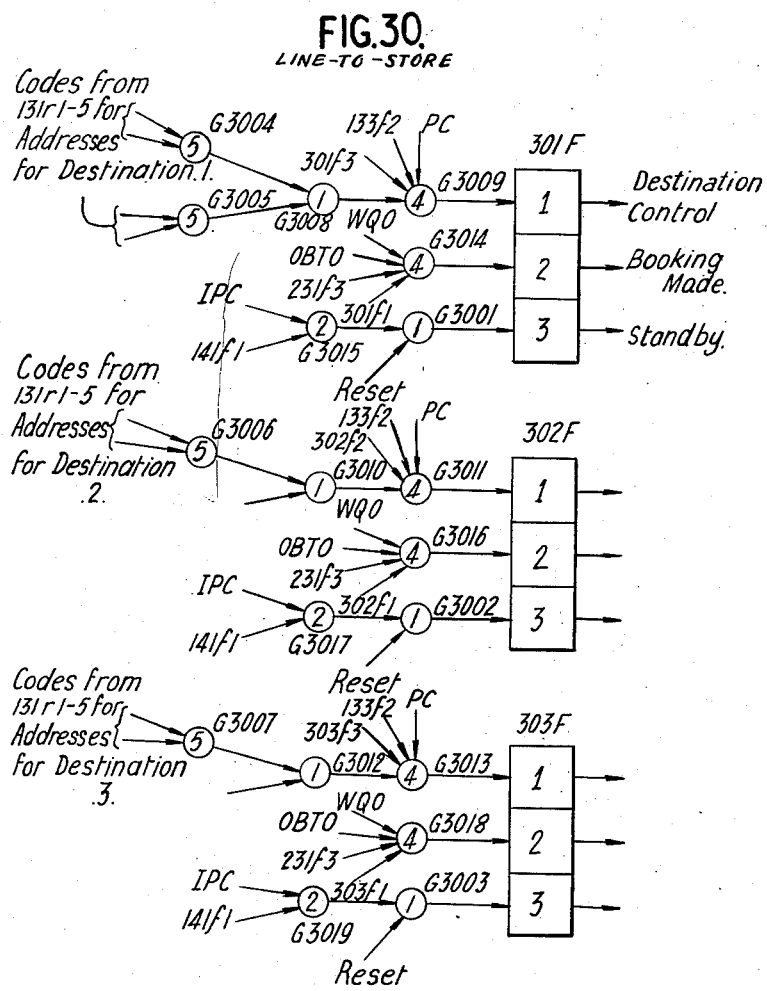

Figs. 17–20 comprise circuits for receiving teleprinter signals from an incoming line, while Fig. 21 shows illustrative waveforms and register operations encountered in the reception of a 3-character message;

Figs. 22–31 are circuits used in the disposal of a stored message, and since operator-intervention is eliminated according to the present description, Figs. 22 and 23 provide for the automatic setting up of outgoing booking information, and Figs. 23A and 23B provide for the automatic booking itself for outgoing messages without (Fig. 23A) and with (Fig. 23B) outgoing address concentration. Fig. 30 shows the extra equipment required for the complete automatic system based on the use of an outgoing address concentrator while Fig. 31 shows an alternative address concentrator for generating destination code signals from incoming messages in the process of transfer to common storage, and used particularly for the track-freeing arrangements.

Figure 32:
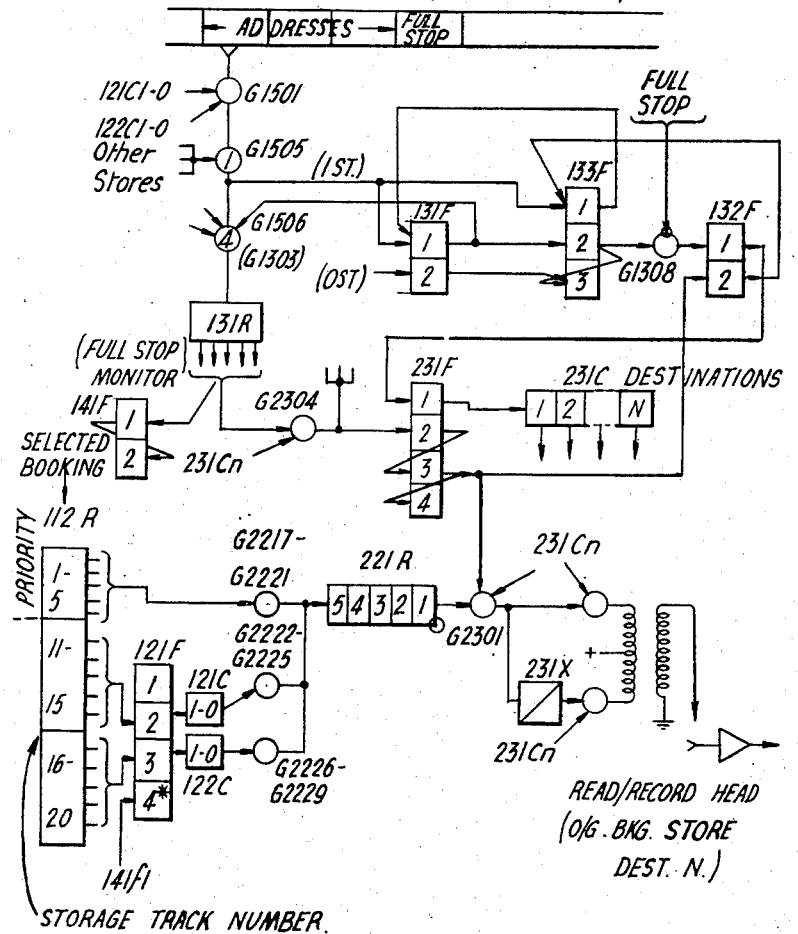
Figure 33:
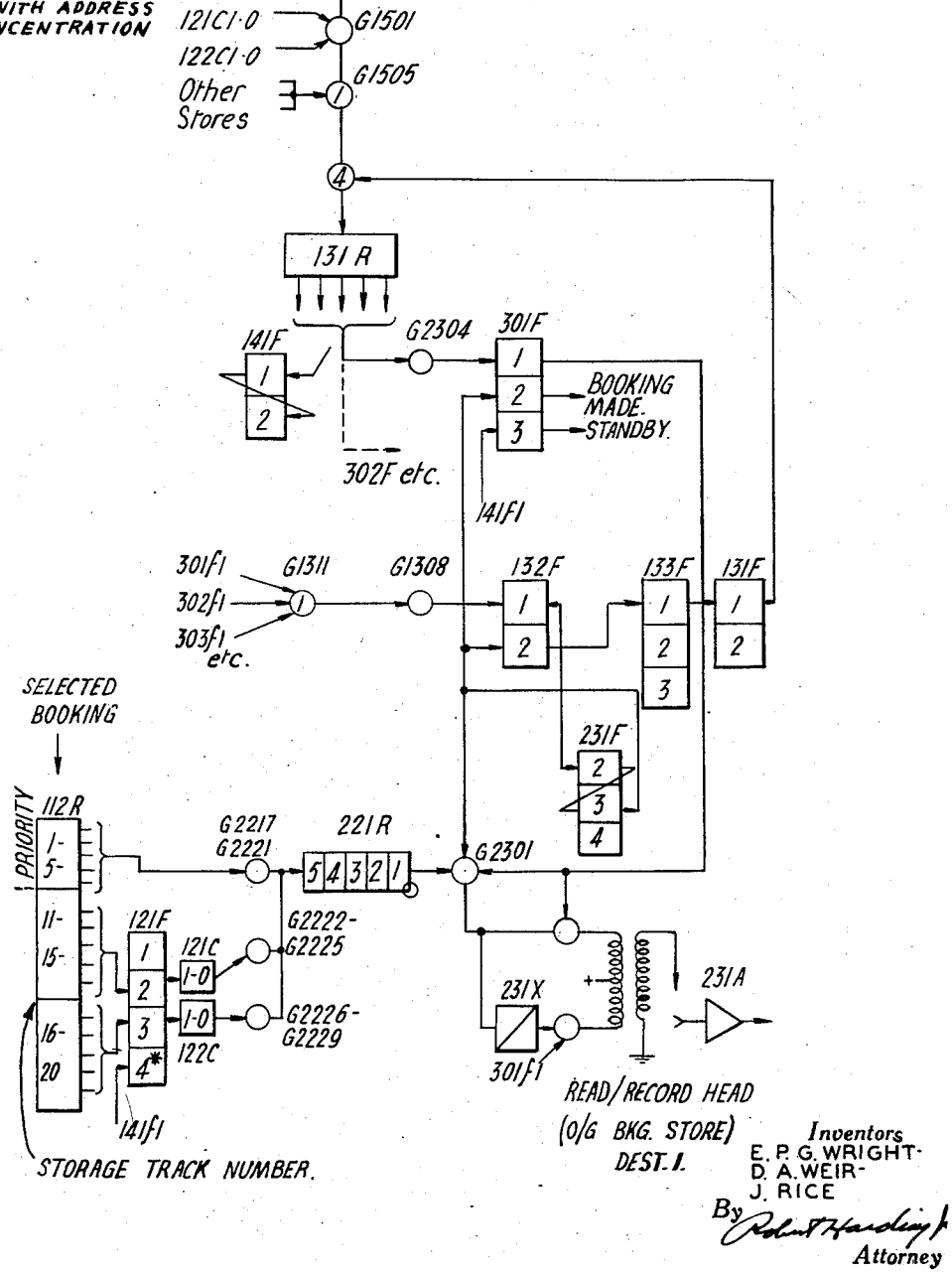
Figure 34:
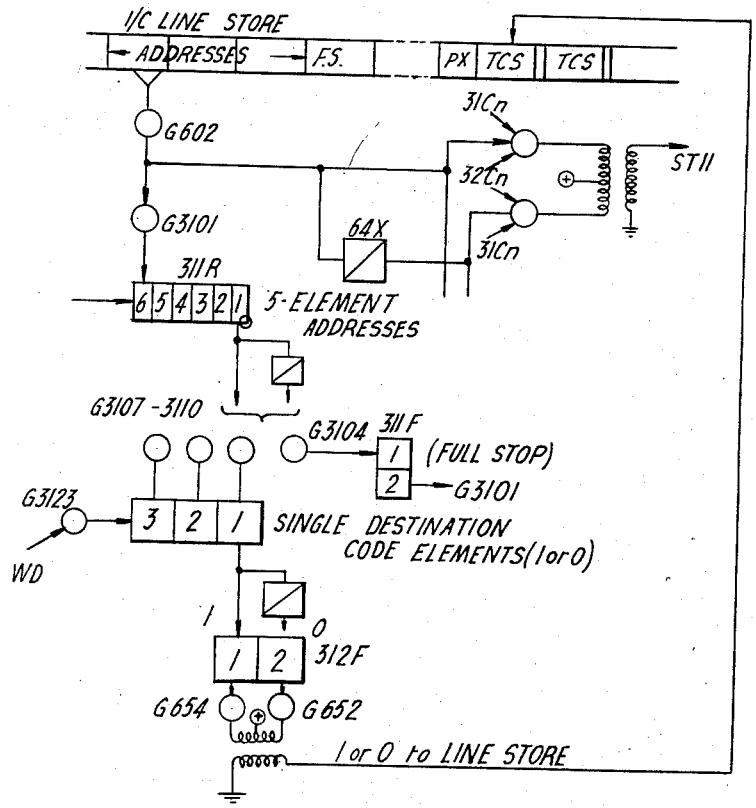

Figs 32–35 are additional simplified schematics in block form provided to assist in understanding certain specified procedures or features covered by other figures, and are intended to be followed in association with the individual figures and descriptive passages relevant to these features or procedures. These specific procedures or features are as follows for the several figures:

Fig. 32 illustrates automatic booking of stored messages in the required outgoing booking stores, without address concentration (i.e. Section (*g*)—q.v.), in accordance with Fig. 23A, while Fig. 33 illustrates the same thing but with address concentration, effected at the outgoing side, (i.e. Section (*h*)—q.v.), in accordance with Figs. 23B and 30;

Fig. 34 illustrates address concentration and generation of corresponding destination code elements at the input of the messages to store, (i.e. Section (*l*)—q.v.), in accordance with Fig. 31, and Fig. 35 illustrates the use of these destination code elements for controlling the state of the track indicators 32F—35F (Section (*m*)—q.v.).

Before passing on to a detailed description of the circuitry involved, it is desirable to explain the electronic tools used and the drawing conventions employed to express these tools and to render the drawings functionally clear without irrelevant circuit detail.

The equipment operates under the control of pulse trains derived from the magnetic drum itself, and is thus self-synchronous. Additional to the tracks on which intelligence is stored there is a track having a recording per element position of all storage tracks. Associated with this track, known as the element "or clock" track, there is a reading head known as the "clock" head from which there is derived a pulse per element position. By means of delay circuits, this clock pulse cycle is used to derive a set of three time-spaced, narrow pulses per element pulse. These are known as the $t1$, $t2$, $t3$ pulses, and are shown in Fig. 8A.

Fig. 8 in its several parts, also includes a range of independent waveforms and pulse trains (W . . . and P . . . respectively) used for controlling purposes and which arise at specific points in the storage or booking tracks to exercise a controlling function at that point. These may be derived in a variety of ways, e.g. by providing an individual prepared track and a recording head for each train, or by means of a set of counters driven by the clock pulses and from which output pulses are taken at the appropriate places.

Part of the controlling function exerted by such waveforms or pulse trains is in identification of a particular track or section of track by a coincidence between the pulse train and a signal arising from the track. Thus, in Fig. 1, a coincidence is sought in G115 between PX and a "1" arising from line track 1, i.e. "1LT1," the line track having a "1" at its PX position being the track sought. Similarly, in Fig. 5, the booking track (q.v.) section having a "1" in its WQ position is sought by a coincidence in G506. There are numerous examples, all having a similar significance.

In Fig. 8A–D, the top line shows the section of the drum associated with a particular recording from an incoming line. This section is divided into a number of elements which are grouped into blocks of five by means of the intervening elements M1, M2, M3, etc. which provide a distributor operation for both the reception and retransmission of the message. In the initial state M1 is a "1" and M2, M3, etc. are "0." With M1 in the "1" state, the first received character is stored in the five elements following M1 and, as the character is stored, M1 becomes "0" and M2 becomes "1" so that the second received character will be stored in the five elements following M2. This action proceeds until eventually M1, M2, M3, etc. will all be "0" showing that the message is fully received. When the first character passes from the drum store M1 is made "1." Similarly as the other characters are read out from the drum the respective M*n* are made "1" so that, when the complete message has been retransmitted, M1, M2, M3, etc. will all be "1." M2, M3, etc. are changed to "0" but M1 remains "1" and the record will be back to the initial condition.

The elements 1–5 in each group of 5 following the M element are associated with the 5 variable elements of a telegraph signal in standard 5-unit constant total permutation code, the first variable element being stored in 1, the second in 2, etc. It should be noted that there is no necessity to provide storage for the start and stop elements as these can be added at the time of final retransmission.

The waveforms and pulses used in the circuit for the initial recording operation are as follows:

PC is a pulse which becomes positive for each of the M*n* elements.

IPC is a waveform which becomes positive for the sections of the drum which are used to store the telegraph elements.

$t1$, $t2$ and $t3$ are the pulses previously mentioned, which occur for each element, $t1$ coinciding with the beginning of an element and $t2$ and $t3$ being progressively delayed.

Not shown in Fig. 8 but used in the circuit arrangement, are PS pulses. These pulses are intended to occur at a rate of 1 in 2 m.secs, i.e. 500 cycles/sec. In the description to follow it will be assumed that the rotation time of the magnetic drum is 50 m.secs, so that, by having a clock track arranged to give 25 pulses in each revolution, the necessary PS pulses may be provided. As will be seen from Fig. 17, a time scale operating on a ratchet start principle utilises these pulses. This time scale is used, inter alia, for sampling the incoming teleprinter character elements (of 20 m.s. duration) and if it is considered that a possible starting error (in sampling) of up to 2 m.secs is too great, the rate of these pulses could be increased accordingly by suitably modifying the clock track and adding further dividing stages in the time scale.

The circuits are shown throughout in functional form, a convenient arrangement for description since the basic electronic elements used are few in number and comparatively simple in operation, and readily joined together to give a composite circuit arrangement.

Electronic coincidence gates, well-known per se, are shown as circles with incoming controls shown as radial leads with arrow-heads touching the circle. Examples of such gates are described in U.S. Patent No. 2,653,996, issued September 29, 1953. The output control is shown with a radial lead with the arrow-head pointing radially outwards. The number inside the circle indicates the total number of controls which must be energised for the gate to deliver an output; for instance, if there are four controls, and the number in the circle is 2, then the gate will deliver an output when any two of its controls are energised. Gates are indicated by the letter G followed by a reference letter. A small circle around the tip of an input control denotes that that control is of an inhibitory nature, i.e. its presence will prevent the gate opening in any circumstances. It is generally realised in practice as a positive control passed through a phase inverter circuit (q.v.) so that "positive" and "zero" (presence and absence) of the control are interchanged. An example of such a gate is shown by G116 of Fig. 1.

A counter comprising a number of single-component stages each of which is capable of assuming one of two conditions, on or off, is shown as a series of rectangles drawn in linear array, e.g. 31C or 32C, Fig. 3. The counters may take the form shown in U.S. Patent No. 2,787,657, issued April 2, 1957. The counters shown all count to the end of their cycle and then reset during ordinary operation. Indication is by the letter C preceded by a reference number and individual elements of the counter by a further reference figure following the letter C. In the case of a counter used as a time-scale, individual outputs are given TS numbers, to indicate their timing from the starting point (in milliseconds).

A register of the bi-stable type (or 2-position register) has two elements, or positions, and stands always in one or other position, change from one to the other being effected by a suitable control applied to the non-energised position. Such 2-position registers may comprise well-known flip-flop circuits and are shown similarly to a counter, but using F or $f$ for C or $c$.

A pattern movement register is shown as a horizontal row of separated rectangles linked together, with an input or controlling gate at the left, outputs being shown from any one or more of the separate elements. Inputs to individual elements may also be indicated by arrows. Such pattern registers are disclosed, for example, in U.S. Patent No. 2,649,502, issued August 18, 1953. The usual indication is by means of an R and a preceding reference number, e.g. 41R, Fig. 4, with a succeeding number for the individual sections, and a lower case $r$ for the individual outputs as controls. A small circle at one corner of the right-hand element denotes that the register is non-recycling.

The phase inverter, shown as 41X in Fig. 4, is used to give a positive output in response to zero input, and vice versa, and is described and claimed in U.S. Patent No. 2,688,695, issued September 7, 1954. This device is useful when a positive output from an element is required, whatever its state, as in 41R1, Fig. 4. Thus $41r1.1$ is a normally positive control, but $41r1.0$ is normally zero, i.e. ineffective. By interposing the inverter, however, it becomes a positive control for zero, but zero for the normal output.

So far as possible, the various items in the separate figures are given reference numbers which indicate in the first portion the figure number, and in the last portion the identifying number of the item. For gates, which are numerous, the latter occupies the tens and units positions, while for other items the units digit only is used. Thus, G302 is a gate (02) in Fig. 3, whereas 302F is a (3-position) register (2) in Fig. 30.

The description of the system will be given in several distinct stages, comprising ($a$) reception of incoming 7½-unit code teleprinter signals and their transfer to a track on a magnetic drum (the line track); ($b$) transfer of incoming message from line track to a storage track in a common store; ($c$) use of extension tracks in the common store; ($d$) booking of incoming messages (single storage track); ($e$) booking of incoming messages (involving extension storage tracks); ($f$) selecting the highest priority incoming booking of completed messages; ($g$) use of highest priority booking selected in ($f$) to make outgoing bookings according to addresses in the first line of the selected stored message (without address concentration); ($h$) as in ($g$), but with suppression of bookings for addresses accessible via a single destination (address concentration); ($i$) determination by the equipment of the highest priority message awaiting transmission in any particular direction; ($j$) automatic establishment of an outgoing link between the common storage track containing the message (or its first portion) selected for transmission and the outgoing line track, and transfer of message thereto; ($k$) transmission of message to line; ($l$) generation of track clearing signals-provision of address concentrator at input to storage; ($m$) freeing of storage tracks after complete transmission of message; and ($n$) use of incoming address concentrator in making outgoing bookings.

To pass now to the description of the first stage, ($a$) the reception of incoming teleprinter code signals, Fig. 17 shows the receiving circuit and a time scale for controlling the reception of the signals and their transfer to a track on a magnetic drum via a transfer storage register in Fig. 18.

The time scale consists of two stages of counters in tandem, shown in Fig. 17 as a single block 171C, the first stage (of 10 positions) stepping, when operated, at a rate of 1 step for each PS pulse, i.e. 1 step in 2 m.secs, and the second controlled from the first and stepping once for each complete count of the first, i.e. 1 step in 20 m.secs. These stages may each be realized as 10-position counters although the circuit arrangement for the second makes use of 8 positions only; this is simply due to the fact that a 10-position multi-cathode gas discharge tube would provide a suitable practical realisation. A suitable counter is fully described in British Patent No. 762,094, accepted March 13, 1957. Any other arrangement using individual gas tubes would be suitable.

The outputs of 171C are shown as TS numbers which indicate their position in milliseconds on the time scale.

As will be seen later, the time scale is returned to its rest position when 7½ uniperiods have elapsed from the commencement of the start element during reception (i.e. after 150 m.sec.), the latter time being in agreement with normal teleprinter practice in which 7½ unit transmission is used.

The time scale is controlled by means of a start-stop pair 171F during reception of a message from a teleprinter.

The register 181R is a pattern movement of the type described in U.S. Patent No. 2,649,502, issued August 18, 1953. Gates G1801–G1805 are used for inserting information into the register when signals are being received from the line. When the five variable elements of a character have been stored, the pattern set up in 181R is stepped at high speed by means of G1806, and the output of 181R5 is read off into the drum store for each step. The register 181R may thus be regarded as a "speed changing device" for accepting signals from the line at low speed and storing them subsequently at high (transmission) speed. To provide positive information for both a "1" and a "0" stored in 181R5, an inverter, 181X, is incorporated so that for a "1," $181r5.1$ is positive and $181r5.0$ is zero and for a "0," $181r5.1$ is zero and $181r5.0$ is positive. This has been referred to previously. For convenience, it has been assumed that for a mark variable element, $181r5.1$ will be positive and for a space variable element, $181r5.0$ will be positive.

Figure 19:
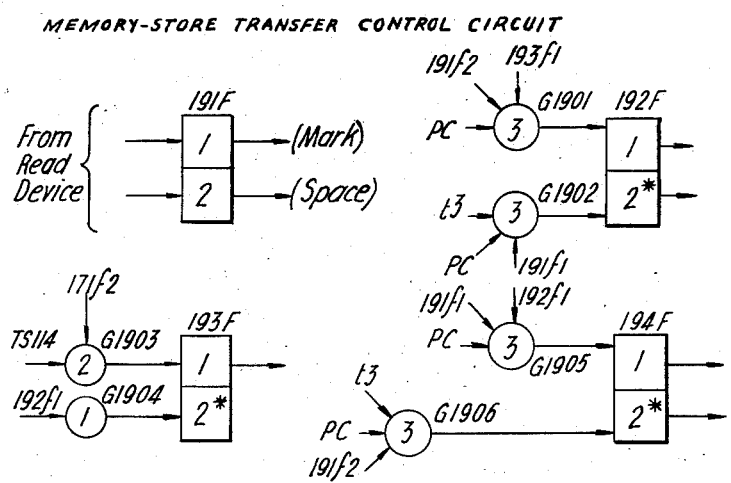

Passing now to the control circuit of Fig. 19, 191F is a 2-position register used for staticising, element by element, information taken from the drum by the reading device. By "staticising" is meant that the transient signals derived from the drum are given a steady character as the output of a bi-stable register. The arrangement is such that $191f1$ is energised for a "1" read from the memory and $191f2$ is energised for a "0."

192F and 193F are 2-position registers which are used to note that information is to be passed to the memory, 193f1 energised denoting that the character elements have been received and may be passed to the store. In the initial state 192f2 is energised but when the time scale passes to the stop uniperiods, during reception of a character, G1901 opens under control of 193f1 causing 192f1 to be energised. G1902 is used to return 192F to the state with 192f2 energised and 192f1 energised returns 193F to position 2 energised.

194F is the 2-position register which allows information stored in the register 181R, to pass to the appropriate character storage section of the memory store. This is accomplished by energising 194F via G1905, when the correct distributor "M" element is encountered. G1906 is used to reset to 194f2 energised when the end of the appropriate section is reached.

Figure 20:
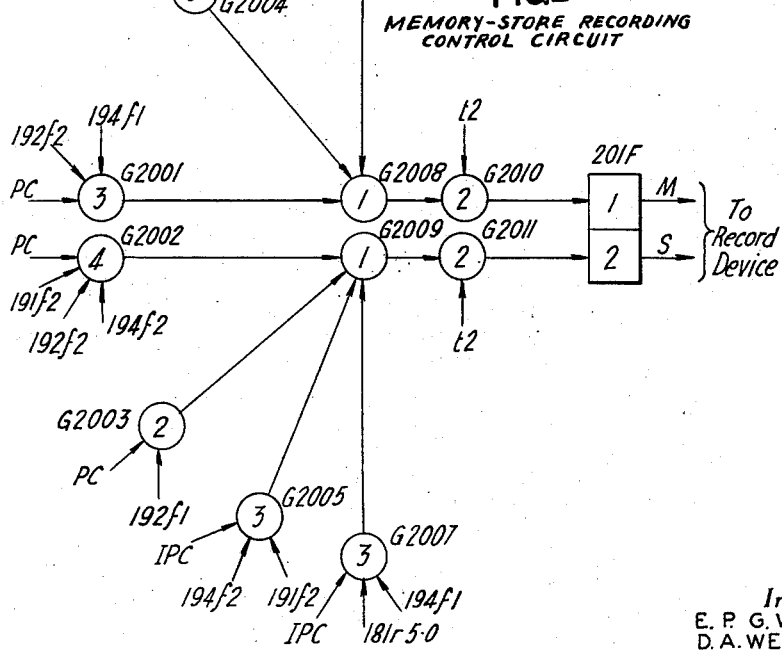

In the recording unit of Fig. 20, 201F is a 2-position register the output of which is associated with the recording device to permit the wanted recording to take place.

G2001–G2003 are used in connection with elements M1, M2, M3, etc., the multiplicity of gates being necessary to provide the distributor requirements, previously described.

G2004–G2007 are used in connection with the recording of the variable elements of the telegraph characters, G2004 and G2005 being used to re-insert unchanged a character as read by 191F (Fig. 19), and G2006 and G2007 being used to insert a new character.

The outputs of 201F are such that when a mark telegraph element is to be recorded, 201f1 is energised to record a "1" and when a space telegraph element is to be recorded, 201f2 is energised to record a "0."

With this introduction, it is possible to pass to the detailed description of (a).

The detailed description of the circuit operation will be given in conjunction with Fig. 21, which illustrates the essential changes for each stage of the reception. For illustrative purposes, the receipt of the first three characters only of a message is described, the five variable elements of these characters being assumed to be:

(1) Mark Space Mark Space Mark (MSMSM)
(2) Space Mark Space Mark Space (SMSMS)
(3) Mark Mark Space Mark Mark (MMSMM).

In the initial state the 2-position registers are for the most part in the "2" position, shown by an asterisk. No section of 181R is energised.

The condition of 191F is dependent upon the condition of the record already on the drum, that is, M1 is a "1," M2, M3, etc., are "0" and the character storage sections will be in the condition left from the previous recording. Fig. 21(a) illustrates the initial condition of the track section.

The condition of 201F is dependent upon the condition of 191F, for, in the initial state, G2002, G2004, G2005, G2008–G2011 are the only gates which may open and it can be seen that 201F will be set at time t2 according to the setting of 191F at that time.

When the first character is received, the line (Fig. 17) changes to space and in so doing energises 171f2. The next PS pulse to arrive will open G1701 and 171C will step under control of the PS pulses. When 171C reaches TS30, i.e. 30 m.secs. from the beginning of the start element, a time coincident with the centre of the first variable element, the condition of the send line is examined by G1801. This element is assumed to be mark and so G1801 will open and 181R5 will be energised.

At the time TS50, i.e. 50 m.secs. from the beginning of the start element, the line is again examined, this time by G1802. Since the second variable element is assumed to be space, G1802 will remain closed and 181R4 will remain non-energised. The time scale continues to step and subsequent elements are examined by G1803, G1804 and G1805 in turn. With the assumed first character (MSMSM), the register 181R will be set with 181R5, 181R3 and 181R1 energised, 181R4 and 181R2 non-energised.

The information thus stored in 181R is to be transferred to the line track (line store) in the correct place, i.e. following the M element which is 1 at some time between the end of the character in question (i.e. at TS130) and the examination of the first information element (at TS30) of the next, a total period of time (for 7½ unit code) of 60 m.secs. Since the drum revolution period postulated is 50 m.secs, this provides ample time even in the worst case, when M1 is just missed in the current revolution.

At time TS114, i.e. soon after the completion of the examination and transfer to 181R of the last information element, and 171F being still at 171f2, G1903 opens, and 193F is energised to 193f1. At the next pulse of the PC pulse train corresponding with 0 in an M element, 191F is at 191f2, so that G1901 opens and 192F passes to 192f1, followed by the return of 193F to 193f2. At some convenient later time in the cycle, e.g. at TS150, during the stop period of the character, 171F is energised to 171f1, thus causing a reset signal R to be applied to 171C1, and the time scale is restored to position 1 energised.

The PC pulse which coincides with the succeeding M1 pulse (at 1) will open G1905 and 194f1 will be energised: since M1 is a "1," 191f1 will be energised at this time and 192f1 has been prepared previously. The operation of 192f1 closed G2001 and G2002 (Fig. 20) but opened G2003 for the PC pulses so that at time t2 in each succeeding PC pulse, G2011 opens causing 201f2 to be energised and "0" will be recorded for all M elements, including M1. At time t3 in the PC pulse for M1, G1902 (Fig. 19) opens and 192f2 is re-energised, closing G2003. These operations are charted in Fig. 21.

When the waveform IPC coincident with the first recording section appears, both G2004 and G2005 (Fig. 20) are closed since 194f2 is no longer operative. However, G2006 and G2007 are partially prepared by IPC and 194f1. At time t2 coincident with the first recorded element of character 1, 181r5.1 (Fig. 18) will be positive so that G2006 and G2010 open and 201f1 will operate causing "1," i.e. a mark, to be recorded for the first element. At time t3, G1806 (Fig. 18) opens and the pattern in 181R will be stepped one position to the right so that now 181r5 will record the second variable element, and, since this is a space, 181r5.0 and not 181r5.1 is positive. Thus for the second element, read at t2, G2007 and G2011 (Fig. 20) will open and 201f2 will be energised causing "0" to be recorded. Again the pattern in 181R is stepped via G1806; the process is repeated for the following variable elements so that 201F will have recorded the original contents of 181R. The last step causes the register to be cleared with no positions energised.

For the PC pulse coinciding with M2 (at 0), 191f2 is energised but G2002 remains closed in the absence of 194f2 which is still non-energised; G2001, however, is opened by 192f2 and 194f1, left energise after M1. At time t2, G2010 opens, 201f1 is energised and a "1" is recorded for the M2 element. 194f1 thus stores the "1" from M1 for use at M2. At time t3 during this PC pulse, G1906 will open and 194f2 will be re-energised. In consequence the elements in CH2 will be recorded as read by 191F using G2004 and G2005 (Fig. 20), although at this time this is of no consequence for these elements will have been left over from the previous recording. G2002 causes M3 to be recorded as "0" and CH3 is reproduced by means of G2004 and G2005. The state of the recording is now as shown in Fig. 21(b).

It should be understood that the transfer of the first character takes place in the total inter-character period of 60 m.secs. and no further character will be passing from the teleprinter to 181R at this time. (The full period is actually 66 m.secs., taking into account that transfer is initiated at TS114—see G1903.)

The second character is now sent from the teleprinter and, as for the first character, is passed by means of the time scale into the register 181R. Whilst this is taking place the previous recording (Fig. 21(b)) will be read by 191F (Fig. 19) and re-recorded by 201F (Fig. 20) exactly as read. Again when the time scale reaches TS114, denoting that the variable elements have been received, G1901 opens with a pulse PC and 192f1 (Fig. 19) is energised. Since M1 is now a "0," the first PC pulse after this does not open G1905. However, M2 is now a "1," so that the PC pulse coinciding with M2 opens G1905 and 194f1 is energised. (See 2, Fig. 21). This causes the contents of 181R, i.e. SMSMS, to be recorded by 201F in the element positions in CH2. Also because 192f2 is not re-energised until time t3 of the PC pulse coinciding with M2, both M1 and M2 will be recorded as "0" by means of G2003 (Fig. 20). Until time t3 of the PC pulse coinciding with M3, 194f1 remains energised so that a "1" is recorded for element M3 by means of G2001. The elements in CH3 will be recorded by 201F as read by 191F. The recording on the line track now contains the first two characters, as shown in Fig. 21(c), and remains the same until the next character is transferred.

The third character is now passed as previously described from the line into the register. Again when the stop element is reached (see 3, Fig. 21) 192f1 is energised. The first "1" coinciding with a PC pulse occurs for M3. The elements prior to M3 will be recorded as read by means of G2003 (Fig. 20) for M1 and M2 and by means of G2004 and G2005 for CH1 and CH2. For M3, 192f1 will be energised and, in consequence, M3 will be recorded as "0" by means of G2003. Also the PC pulse opens G1905 (Fig. 19) and causes 194f1 to be energised. At time t3 of the M3 element, G1902 opens and 192f2 is re-energised. The fact that 194f1 is energised during the CH3 element positions causes the contents of 181R (Fig. 18), i.e. MMSMM, to be recorded by 201F. The recording is now as shown in Fig. 21(d) and for further cycles of the drum, this record will be read by 191F and re-recorded by 201F.

Having described one possible process by which an incoming teleprinter message may be recorded on a magnetic drum, a process will be described for effecting transfer of the message to a common store, as well as a process for making a "booking" entry on a special booking drum track of particulars relating to the message for facilitating its further disposal. These constitute items (b) to (e) referred to earlier, and although there is considerable overlap among these items, yet it will be convenient to treat them under separate heads, making cross-references where necessary.

First, however, Fig. 16, the overall schematic of a switching centre will be described, and also Fig. 8, in greater detail than previously.

Fig. 16 shows an incoming line connected to an incoming line track via a line circuit LC which is not the same as that just described, but which exercises a line finder control in association with the block "Line Selector Control" (23F) and the 23F$_m^1$ finder arc for finding the track, or a track which has a message ready for transfer.

The identification of such a track by 23F initiates the search by a 100-line selector 31C, 32C (10×10 electronic counters) for a free common store track, under the control of 31F, and when one is found, the incoming link, shown as 21F which, in fact, is a purely electronic link (drum cycle control), initiates transfer from the line track to the selected track. The track indicators, 32F—35F, are individual to the common store tracks, and comprise bistable registers which exercise a selector controlling function via 31F.

A subsidiary feature of this, not shown in the figure, is the mechanism for selecting continuation tracks in the common store, for use by long messages, and for recording the identities of the several tracks.

Parallel to the transfer operation there is provided a booking operation for each incoming message. The booking information comprises the identity of the incoming line and the indicated priority of the message, together with the identity of the common storage track used, or, if more than one is used, of the first one, and also whether or not the booking relates to a completed message.

The various items of information are selected by the incoming booking control, 22F, and assembled in correct order on a track of the drum styled a "carrier," as its function is to carry the booking information around the drum (by continued transfer along its track) until it coincides in position with the first free space (next booking position) on the booking track. The information is then transferred (Fig. 5 block) to this position, and the carrier track freed for another booking operation.

At this point, the message is disposed of automatically in accordance with its priority and address(es), or it may be dealt with by an operator, as in conventional tape relay systems. This latter process has already been described in a prior application, and only the automatic system will be described herein.

As shown, the various tracks and stores are all separated, but may in practice constitute different sections of a single magnetic drum, as indicated in Fig. 16A.

Fig. 8, in four parts A to D, shows the various pulse trains and waveforms used for controlling purposes, and these will be referred to in due course as their function appears. One or two, such as PC and IPC, have been referred to already in the earlier description.

The line track and common store tracks, where incoming messages appear in identical form, are shown at the top of the figure, while lower down the booking and carrier tracks are shown, with their associated wave forms below.

The arrangement now to be described with reference to Figs. 1–7 is one in which each line circuit has an associated track for recording incoming messages and, as the line track is filled or messages are completed, the contents are transferred to a common group of storage tracks. According to the length of an individual message, one or several transfers may have to take place. Although, in general, the operation during a transfer is the same irrespective of the number of transfers which have to be made for each message, slight variations occur dependent upon whether or not the end of message character has initiated the transfer. Variations due to this cause occur also in respect of the booking operation described hereafter.

*(b) Transfer of a message requiring one track*

A message incoming on a line circuit is recorded on the associated line track in the manner described herein. For the case in which a message is less than the capacity of the line track, the end of message character will be received before the track is completely filled. Since it is possible that, in a coded message, a character may simulate the true end of message character, and in order therefore to provide a safeguard against false operation, it will be further assumed that space is included in the stop element of the true end of message character. For an example, the end of message character is assumed to be SMSMM followed by a space in the stop element. The multistable register 12F is used as a means of detecting the required character in association with the pulses TS30 . . . TS110 obtained from the time-scale. It should be noted that G104 and G106 are arranged to open for elements of opposite polarity to those assumed for the end of message character so that 12f4 will be energised for any received character other than the end of message character.

The equipment in Fig. 1 is particular to line circuit 1, it being assumed there is similar equipment for the other line circuits.

Initially the positions of multi-stable registers such as 11F, 12F, having an associated reset signal will be in an energised condition denoted by an asterisk. As the message is received in the line circuit, the character elements are examined and directed, according to whether they are mark or space, to G104 and G106 respectively. The timing elements TS30–TS130 are distributed between G103 and G105 according to the inverse of the selected end of message character. For any character other than the end of message character, 12f4 will be energised by the opening of one of the examining gates so that, at TS132, for every such character, G108 will remain closed and 12f2 will not be energised. When the time scale returns to its rest condition, TS0 energised, G109 and G102 will open and 12f1 will be re-energised. This operation continues until the end of message character is received. For this character, neither G104 nor G106 will open and 12f1 will remain energised so that at TS132, G108 will open to energise 12f2. 12f2, in combination with 11f4, opens G110 and G111 to energise 11f1. The latter opens G120 causing SRS, Storage Required Signal, for this particular line circuit to become positive to indicate to the common equipment that the message on the associated line track is ready for transfer to a free storage track in the common pool. For other line circuits, not active, G120 will remain closed, SRS will be at zero, and NSRS will be positive.

At this time, the common equipment may already be engaged in a transfer for another line track and the new transfer will have to wait for the other to be completed. To allow for this waiting time, sufficient time must be allowed between the end of one message and the commencement of the next message. This time will be comparatively short for, as will be seen, the maximum time the common equipment is engaged in a transfer operation is three revolutions of the drum store. Thus, even if one considers ten line tracks requiring transfer at the same time, the delay time involved even for the worst case would be thirty revolutions only which, with a drum revolution time of, say, 50 milliseconds would be 1.5 seconds only, equivalent to approximately 10 characters at 50 baud.

The indication that the common equipment is already engaged is given by the fact that 23f11.1 is at zero potential, i.e. the multi-stable register 23F is off its rest condition. This multi-stable register has a position associated with each line track, 23f1–23f10 for the assumed ten line circuits, and one position, 23f11, indicating the "line track selector free" condition. As can be seen, the combination of gates G212–G220 includes the control 23f11.1, so that none of the gates can open when 23f11.1 is at zero potential, so preventing 23F from being moved to another position until a current transfer has been completed. When 23f11.1 becomes positive once again, indicating that the common equipment is in readiness for carrying out a further transfer, the gating arrangement G212–G220 is prepared for a new request.

Assume that line tracks 2 and 3 make a simultaneous request for transfer, no other line tracks making requests. G212 will remain closed but G213 will be open, for SRS(1) will be at zero potential and NSRS(1) will be positive. (N.B. A number in brackets after a reference indicates that there is a plurality of such references one to each line, the number indicating the particular line.) However for line track 2, which is making a request, SRS(2) is positive and NSRS(2) is at earth potential so that G214 is opened and G215 is closed. Although SRS(3) is positive, the absence of a control from G215 prevents G216 from opening, and NSRS (3) being at zero potential closes all the gates G217–G220 irrespective of other requests.

Thus, one only of the requests can cause the common equipment to become associated with a line track even for simultaneous requests. For the example given, G214 will energise 23f2, showing that the next transfer will be from line track 2; 23f11.1 will be at zero potential preventing further seizure of the equipment until the transfer indicated is completed.

The next requirement is to select a free storage track from the common pool, utilising 31C and 32C which act as a tens and units selector hunting for a free outgoing link to the common pool.

With 23f11.0 at a positive potential, G302 opens to energise 31f1 ("tens hunt") which, in its turn, opens G303. The PS pulses applied to G304 and G312 are stepping pulses which may be of any suitable repetition rate commensurate with stepping 31C and 32C to a free storage track position in a time slightly less than one revolution time of the drum. This rate is determined by the fact that it may be necessary to step 31C and 32C to a required position in the time which elapses between the PD pulse (end of one track revolution) and the beginning of the WT waveform (near the end of the next—see Fig. 8). Since the maximum number of steps to be made is 9 by 31C and 9 by 32C, i.e. 18 maximum, and the time of one revolution of the drum is taken to be 50 ms., the repetition rate of PS should be >360 c./s., and may, in fact, be the 500 c.p.s. pulse set used for stepping the time scale in Fig. 17, or they may be a set at higher frequency, up to 10 kc./s., for giving economy in searching time. With G303 open, 31C will step under control of the PS pulse applied to G304.

Each common storage track has associated with it a "track indicator" bistable register, of which 32F—35F are representative samples, which is used to indicate whether or not the track is free for use. In view of the decimal arrangement of the search by 31C and 32C, the track indicators are shown (or indicated) in accordance with standard bank numbering, i.e. bank level 11—10 at the bottom (11, 12, 13 . . . 18, 19, 10), then 21—20 and 80 on up to 91—90, and finally 01—00 at the top. Only four indicators are actually shown, namely those for positions 11, 10, 01, 00, the remainder being indicated by references.

Each indicator denotes "free" when it is in its 1 position, and "busy" when it is in its 2 position, and the "free" indications for each level are gathered together as ten controls on a single-control gate, of which two examples only are shown, namely G305, for level 1 (tracks 11—10) and G306 for level 0 (tracks 01—00). The single output of each gate is given a TS number, namely 1TS, 2TS etc. up to 10TS, and a positive output from any one of these gates indicates the presence of at least one free track within the corresponding level. A further selecting operation is then necessary to identify the first (if more than one) of the free tracks.

Each track indicator is brought to the "free" position by the generation of a Track Clearing Signal, TCS, bearing a subscript identifying the individual track, and comprising the positive output in position 2 of a bistable register, e.g. 36F, individual to the track and which tests the track continually for unfulfilled destinations, i.e. destinations still requiring a transmission of the message contained in the track. When such exist, the examination of the track by 36F will leave it in position 1, and so unable to trigger its corresponding track indicator to position 1 ("free").

Only one such track examining register is shown, namely 36F associated with 32F for track 11; for the remaining track indicators shown, the control generated by the corresponding indicator to 36F is shown as a single TCS control.

The control of the 36F registers and the whole process of generation of the Track Clearing Signals will be described more fully in a more suitable place hereafter.

To resume now the description of the hunting process, initiated by 31F being triggered to position 31f1 and starting 31C in its hunt for a free "tens" group: gates G307, G308 and other equivalent gates are used for testing purposes and are so arranged that when 31C steps to a position the group (TS) signal of which is positive, G309 opens, so opening G310 and causing 31f2 to be energised. G303 is thus closed and 31C no longer steps but G311 is opened and 32C will step to select a free track in the tens group indicated by 31C. For each tens group there will be a combination of ten gates such as G313, a single combining gate G314 and single outlet gate G315, having a single 31C control, it being understood that G313 is a representative of one hundred such gates, each having one position of 32C as a control. G316 is a single combining gate gathering together the ten groups of ten gates. 32C1 is associated with the track indicators 11, 21 . . . 01, 32C2 with track indicators 12, 22 . . . 02, etc.; 31C1 is associated with the group 11, 12 . . . 10, 31C2 with the group 21, 22 . . . 20, etc.

When 32C steps to the position of a free track in the group indicated by 31C, G316 and G317 open causing 31f3 to be energised, so closing G311 and stopping the movement of 32C. The positions of 31C and 32C indicate, on a ten-by-ten basis, the number of the free track selected for receiving the message from the line track already indicated by 23F. The same selection of 31C, 32C, controls which open G317 also open the gate equivalent to G318–G321 of the track indicator of the selected track, so marking this track as busy. The indicator will remain in the busy condition until the pertinent track clear signal, TCS, has been generated, when it will be reset to its free condition.

In transferring the message, it is necessary that transfer should start at the beginning of the message, continue for a complete revolution of the drum and then cease. This is accomplished by means of 21F which controls the transfer between the indicated line reading head and the selected storage track record head. The PA pulse, which arises at the beginning of the message in position M1, opens G204, as soon as 31f3 has been made positive to indicate that a free track has been selected, and causes 21f1 to be energised. 21f1 opens G630, G628 and G603, so that the message from the line track denoted by the energised position of 23F passes via one of the gates G601, G604 or equivalent gate, G602, G603 and one of the gates G605–G608 or equivalent, as indicated by settings of 31C and 32C, to the record head of the selected track. It should be noted that G630 and, hence, G603 are closed during the WT waveform, the reason for this being indicated in the later description for a message requiring several storage tracks.

When the drum has made a complete revolution from the commencement of the message, the PD pulse opens G201 to re-energise 21f2 so cutting off the transfer circuit. The same pulse also opens G322 to energise 31f4 so preventing the following PA pulse from energising 21f1 again. 31f4 is included so that, although 23F is still off its rest position, 31f1 cannot be energised to cause further search for a free storage track, at the same time preventing G204 from opening, as indicated above. Also, for a completed message, 12F has been left in 12f2, and on the occurrence of PB, a waveform associated with booking, G112 will have opened, causing 12F to pass to 12f3. This control inhibits G116, so that for a completed message, 11F is prevented from passing to 11f3 on the occurrence of PD. (Note differences from section (c)—infra.)

The booking of the message (infra) will have been taking place meanwhile and as soon as the booking has been recorded in the appropriate part of the booking track 52f2 and 53f3 will be positive. No changes will have taken place in 71f so that the next PC pulse will open G221 to energise 23f11, 23f11 energised causing G323 to open and 31f5 to be energised, and the circuit is ready for further transfer, the message just transferred being ready for further transfer to an outgoing line track in due course. The latter operation will be initiated when the booking for this message is subsequently selected by an automatic comparator as being that of all stored messages with the highest priority. These closing stages will be described in more detail in connection with "booking."

(c) *Transfer of a message requiring several tracks*

When a transfer is to be made from a line track, the free storage track selector allocates any free track to take the message. Thus, if a message is longer than one track capacity, the message will be stored in sections disposed more or less at random in the store. Of course it is possible to divide the storage tracks into groups, each group being capable of taking the longest possible message. However, apart from the fact that it is difficult to arrange that there is a maximum length to a message, this solution would represent uneconomic usage of tracks as compared to a method in which tracks are free for use by any message.

A solution for carrying out this process is to arrange that a record is made at the end of one storage track to indicate where the next section of message can be found. In the system to be described, the number of the storage track just used is recorded temporarily on the line track, in two predetermined character positions, this information being available for causing the extension track number (new track) to be recorded, when the next transfer is made, on the track indicated as a special operation. This process may be carried out no matter how many extension tracks are required, each track having recorded on it the number of the track which holds the next part of the message.

To give an example, suppose that the storage track allocated for the first part of the message is A. After transfer has taken place, the identity of A is recorded at the end of the line track for convenience. The next transfer is made to track B and, at the end of transfer, A is read off from the line track and transferred to a temporary register so that the identity of B can be recorded in place of A. The register containing A then causes the track selector to reconnect to A and the identity of B is recorded on track A. If the last part of the message passes to C, although no further extensions are required, C is recorded on the line track for circuit convenience and information after B has been read off the line track and registered. The temporary register, now containing B, causes the track selector to move to B, and C is then recorded on track B. Thus, when the message is passed to an outgoing line the sequence of stores recording the sections of the message is determinable and transmission can take place in the correct order. It is possible to use the booking register 41R (q.v.) for registering the current storage track number preparatory to recording it on the line track, for this register is not in use for any other purpose at the time the storage track number has to be recorded. However, a separate register is required for receiving this same information when it is read off during the next transfer. The permanent record of track A is, of course, made in the booking register.

As described in the section dealing with the booking operation, if the end of message character is not received before a predetermined position (PX) of the line track distributor 11F is still in 11f4 and pulse PX causes G115 to open and 11f1 to be energised. As previously, 11f1 opens G120 causing STS to become positive so that, when the common equipment is free, the position of 23F associated with the requesting line track is energised. Assuming that line track 1 made the request, G212 will open causing 23f1 to be energised, 23f11.1 to be at zero potential and 23f11.0 to be at a positive potential. As before G302 will open, 31f1 will be energised and search for a free storage track will be made. Eventually 31F will have 31f3 energised and the PA pulse will cause 21f1 to be energised so that transfer takes place from line track 1 via the read head, 61A, G601, G602, G603 and one of the gates G605–G608 or equivalent gate to the record head of the selected storage track. The PF pulse, which is generated in the element position preceding the line track section to be used for recording the tens group of the storage track in use, opens one of the gates G420, G421 or equivalent gate and the number indicated by the position of 31C is registered in telegraph code in 41R. This is described more fully in the booking section. Briefly, there are ten groups of gates like the two fan-like groups shown, each allocated to a digit, 1–0, and the ten terminating gates G403–G404 are each strapped via decoupling means (not shown) to one or more of the gates G405–G409 according to the arrangement of marks M in the telegraphic code of the number each represents. For instance, if 31c1 is to be registered (i.e. 1), then G420 and G403 open, and the coding for 1, say MMMSM, is transferred by permanent strapping of G403 to G405 G406 and G409, i.e. to 41R, 1, 2, 3 and 5 respectively, position 4 being omitted for the space S in the fourth position.

The WT waveform which follows opens G425, G413 follows, and G412 opens intermittently for the pattern in 41R to be stepped and read, element by element, by 41F. 41F reads 41r1 via G410 or G411 (for M or S as required) at time $t_1$, the pattern being stepped at time $t_2$ via G412. G631 and G651 open and close in accordance with the information read by 41f1 and 41f2 respectively, and, since it has been assumed that 23f1 is energised, the tens group information is recorded via G650 and G653 on line track 1 by means of G632 and G633, connections to other line track recording heads being shown as teed off in parallel.

The PG pulse, generated in the element position between the sections of track which record the tens group number and the units number, opens one of the gates G422, G423 or equivalent gate and the number indicated by the position of 32C is registered in telegraph code in 41R. Again 41F reads the information, element by element, and the recording is made by means of G631, G651, G632 and G633. The PD pulse at the end of transfer opens G201 to energise 21f2, G322 to energise 31f4 and G116 to energise 11f3, in contradistinction to the previous description (for a single-track message), where the receipt of the end-of-message signal causes 12F to pass to 12f3 the latter control inhibiting G116. As described above, as soon as the booking operation is complete, G221 opens to energise 23f11, followed by G323 which opens to energise 31f5, and the common equipment is ready to perform a further transfer operation.

Assume that the end of message character is still not received before the predetermined position (PX) of the distributor element for the next section of the message on the line track under consideration. When this position is reached, G117 opens, followed by G118, and 11f2 is energised, as before, the latter causing G120 to open and the SRS for this line track to become positive. A free storage track is again allotted for the message by the track selector, and transfer takes place. This time, because one of the gates G703, G704 or equivalent gate is now open to 11f2, PE opens G706 to energise 72f1. PE is more particularly concerned with the booking function, and coincides with one of the WB pulses used for recording "end of message." The new track information is recorded into the appropriate line track by means of 41R, 41F and the gating arrangement G631, G652, G632 and G633 but at the same time the previous track information is read into 71R by means of G707, the pattern being stepped by means of G708; 71R has one position more than the number of elements to be recorded, for there will be a stepping pulse after the last element has been read into 71R11, the final position being that the elements denoting the tens group of the track will be in 71R1–5 and the units in 71R6–10. It should be noted that, whilst the previous storage track information is being read off the line track, G630 and, hence, G603 will be closed by WT so that this information is not recorded on the new storage track. The PD pulse at the end of transfer, as previously described, causes 11f3, 21f2 and 31f4 to be energised but now, since 72f1 has been energised, G709 opens and 71f1 is energised. Although no booking operation will have taken place, the next PC pulse cannot open G221, 71f4 no longer being positive, and 23F remains at the position indicating the line track which has just had its contents transferred.

With 71f1 energised, G303 opens and 31C commences to step under control of the PS pulses. G710 is composed of a control from 31C1 together with five controls from 71R1–5, these five controls being the telegraph code of 1. For example, if 1 is MMMSM, the controls of G710 will be 31C1, 71r1.1, 71r2.1, 71r3.1, 71r4.0 and 71r5.1. There will be nine other such gates attached to G711 these gates being composed of the other positions of 31C and the corresponding telegraph codes. Thus, when 31C has stepped to the position indicated by the code given by 71R1–5, G711 followed by G712 will open to energise 71f2. G303 is closed and 31C no longer steps but G311 opens and 32C begins to step. G713 is similar to G710 but the controls are 32C1 and five controls from 71R6–10, these five controls being the telegraph code of 1. Nine other such gates are attached to G714 being composed of the other positions of 32C and the corresponding telegraph code controls from 71R6–10. When 32C has stepped to the position indicated, G714 followed by G715 open to energise 71f3 so closing G311 and stopping 32C. 31C and 32C will now indicate the position of the preceding track used to record the message being considered. The setting up of the selector will be complete before the next appearance of WT so that when the new storage track information on the line track is in a position for reading, the selector will have been set to the desired position, 23F being still in the correct position. The PB pulse in this revolution of the drum will open G702 to re-energise 72f2.

When the WT waveform is generated, G629 opens, opening G628 and G603, so that the number of the storage track just used in the transfer, and recorded on the line track during the previous revolution, is read from the correct line track via G602 and G603 and one of the gates G605–G608 or equivalent gate to the record head of the track indicated by the position of 31C and 32C, i.e. the storage track used for the preceding part of the message. The PD pulse following the recording opens G716 to energise 71f4 and the following PC pulse can now open G221 to energise 23f11, which opens G323 to energise 31f5, and the common equipment is now in readiness for dealing with a further transfer, and possible booking operation.

The operation just described continues for further extension tracks, including the transfer of the last part of the message, viz. the transfer initiated by the receipt of the end-of-message character. The number of the current storage track is registered in 41R and is passed via G631, G652 to the line track concerned. This information is then recorded on the preceding storage track, in the manner described above, by setting 31C and 32C to the correct position using 71F, 72F and 71R. At the completion of the recording, G716 is opened by PD to energise 71f4 and the following PC pulse then opens G221 to energise 23f11. 23f11 energised opens G323 to energise 31f5 and the circuit is in readiness for dealing with a further sequence of operations.

The time involved in a complete sequence of operations in connection with one transfer is three revolutions of the drum store in the worst possible case. The common equipment must be seized before transfer takes place and, since transfer always starts from a PA pulse, one revolution maximum is necessary before transfer commences. Transfer itself takes one revolution. When a booking is being made on the booking track, any required operation will be completed before the end of the revolution following that in which transfer takes place. Also in the same revolution, the recording of the number of the current storage track is made on the line track. Hence the maximum time required is three revolutions for the operations involved in transfer and booking. Earlier it was stated that even if 10 line tracks required transfer at the same time, the worst delay would be 30 revolutions. With the arrangement shown for 23F this is not strictly true for it is possible that line tracks already cleared could be ready for a further transfer before the later choices had been dealt with. However, this state of affairs could be obviated by an arrangement in which 23F did not search from line track 1 to line track 10 but searched from whatever position the last transfer was made.

To pass now to the booking operation, items (d) and (e), which takes place during the transfer operation. The incoming message may be less than one line track capacity, in which case, when the message is transferred from the line track to common storage, the complete booking may be made in one operation. Alternatively, for incoming messages which require several tracks, when the first part of the message is transferred, part only of the booking can be made but, when the "message end" is received and the final part of the message is transferred, the completion of the booking can be effected.

A complete booking contains the following information:
 (a) Priority of the message.
 (b) Line circuit on which the message is received.
 (c) Whether or not the booking relates to a completed message.
 (d) Identity of the common storage track holding the message, or the first part of the message.

The priority, which is included at the beginning of an incoming message, is inserted in the booking by reading off the pertinent information as the first section of the message is transferred.

The line circuit number is obtained from that part of the common equipment which determines which line circuit shall be allowed to transfer the contents of its line track to the common storage.

The message completion information is obtained from that part of the line circuit which is used to read characters of the incoming message to determine when the "end of message" character is received.

The identity of the storage track which receives the first part of the message is obtained from that part of the common equipment which allocates the free track to be used.

It should be understood that items (a), (b) and (d) may be recorded on the booking track when the first part of the message is transferred irrespective of the receipt of the end of message character; item (c) is inserted only when the message is complete. When the message is less than one line track capacity the completion may be inserted quite simply when the other items are recorded, but if the message takes several tracks, the completion data has to be inserted by searching for the initial booking made by the particular line track. Because of the two different methods by which completion of the booking must be carried out, it is necessary to include in each line circuit equipment means by which it can be recognised that a message has taken one or several storage tracks.

Before passing on to the detailed description, it is desirable to outline the principal functions of the intermediate register 41R, which plays a very important part in the booking operations.

Its functions are:
 (1) To assemble the incoming line circuit number, and the first storage track number, both tens and units, in parallel form, and to transmit them in serial form to the carrier track, previously referred to, for the booking operation;
 (2) To examine all bookings regarding a particular line so that a "message completed" mark can be added to all such bookings, in connection with messages requiring extension tracks;
 (3) To detect message track (store) number used, to allow this information to be added in the record of the line track.

This function is appropriate to the sections on transfer.

The method of dealing with the booking operation will be described in two parts. In the first it will be assumed that the incoming message takes one track only and in the second it will be assumed that the incoming message requires several storage tracks. Some amount of repetition of the previous description will inevitably be incurred.

(d) *Booking a message which takes one track*

For this case the end of message character will be received on the incoming line before the associated line track is full. The multi-stable register 12F, in the line equipment, is used to detect this particular character, which will be assumed to be SMSMM with the additional proviso that the stop element is a space. The latter is to ensure that even if a character in a coded message simulates the true end of message character, no false recognition can take place.

Initially, 11f4 and 12f1 in the line circuit will be energised. As the message arrives, the individual characters are examined by means of the timed pulses TS30, TS50 . . . TS130 which occur at the centre of the received elements. The gates G103 and G104 together, G105 and G106 together, are arranged to respond only to the opposites of the elements which compose the end of message character, so that for any other character whatever, 12f4 will be energised by at least one of the time scale examination pulses. At TS132, therefore, i.e. 132 ms. from the beginning of a character start element, 12f1 will not have been energised, G108 will remain closed and 12f2 will not be energised. When the time scale returns to its rest condition, TS0 energised, G109 and G102 will open to 12f4 and 12f1 will be re-energised. This operation continues until the end of message character is received; for this character, neither G104 nor G106 will open and 12f4 will not be energised so that 12F remains at position 1, and at TS132, G108 will open to energise 12f2.

With 12f2 energised, G110 and G111 are opened causing 11f1 to be energised. The latter indicates that the message contained in the associated line track has to be transferred to one of the free storage tracks and also that a booking has to be made, 12f2 indicating that the booking is for a completed message. As described previously in the sections dealing with the transfer operation, as soon as the common equipment is free, the requesting line energises an associated position of 23F, viz. 23f1 energised for line 1, 23f2 energised for line 2, etc., and the free storage track selector, 31C and 32C is caused to move to a position indicating a free track. When these functions are completed, 31f3 will be in an energised condition and, in consequence, when the next PA pulse, which indicates the beginning of a track, is generated, G204 is opened and 21f1 energised. 21f1 is the control which permits the message on the track indicated by 23F to pass to the storage track indicated by 31C, 32C.

Continuing with the booking operation, suppose that the line track which is going to transfer its contents is the track associated with line 1, i.e. 23f1 will have been energised. With 11f1 and 23f1 energised, G205 and G206 open causing the BRS control (Booking Required Signal) to become positive so that, as the message is being transferred via G601, G602, G603 and one of the gates G605—G608, G639—G641, the PB pulse, which occurs at the beginning of the storage section used for recording the message priority, opens G207 to energise 22f1, so opening G609. Thus, as the priority information is read off the line track, not only does it pass to the free storage track but also to a recording head for the "booking carrier track." This is a device for assembling the booking information relative to a particular channel before inserting it into the correct section (i.e. the next in order) of the booking register. A reading head is associated with the carrier track and is separated from the recording head of this track by the length of the section of track required for booking. When the booking information has been assembled into the carrier track, it is normally allowed to circulate from section to section around the track by a continuous process of reading and re-recording, for getting the information into a state of readiness for transfer to the booking track at the appropriate time, to be described hereafer. It should be noted that the normal carrier circulation of read and re-record via 63A, G616 and G614, G615 and G613 is cut off at G615 and G616, whilst G611 and G612 are opened, in each case by removal of 22f5. The PB pulse referred to also opens G112 to energise 12f3 in readiness for recording the completion of the message in the appropriate part of the booking. The reason for this further stage in 12F will be included in the description which deals with a message requiring more than one storage track.

The PC pulse following the priority section of the message opens G208 and energises 22f2, so closing G609. However, G617 is opened in readiness for recording the line circuit number in the booking. Here it will be explained how this item of information is registered in telegraph code in readiness for recording.

Gates equivalent to G401 and G402 are used for each of the outputs 23f1–23f10 and are connected to gates equivalent to G403–404, these gates representing the numbers 1–0. From G403, G404 and equivalent gates, connections are taken, as necessary, via decoupling elements, to G405–G409 in accordance with the telegraph codes of the numbers. For example, if the telegraph code for 1 is MMMSM, connections would be taken to G405, G406, G407 and G409, the connection to G408 being omitted because of the space in the fourth element position.

Since it was assumed in the foregoing that the contents of line track 1 are being transferred, i.e. 23f1 is energised, the PC pulse which energises 22f1 to 22f2 also opens G401 and the telegraph code for 1 is set up in 41R, i.e. 41r1, 41r2, 41r3 and 41r5 will be energised and 41r4 will be non-energised. The t1 pulses applied to G410 and G411 occur at the beginning of each element of the recording and the t2 pulses applied to G412 occur between the t1 pulses. Thus, when IPC waveform becomes positive, G410 will open since 41r1 is at mark, and 41r1.1 is positive, 41f1 will be energised and G618 will open, causing the first element of the line track number to be recorded via G610, G611, G613 and the carrier record head. Since G413 is open owing to 22f2, t2 will open G412 and the pattern in 41R will be stepped so that now 41r1, 41r2 and 41r4 will be energised and 41r3 and 41r5 non-energised.

The next t1 pulse opens G410 and 41f1 remains energised and the second element is recorded via G611 and G613. Again t2 steps the pattern so that 41r1 and 41r3 will be energised, the other positions being non-energised, and with 41r1 energised, G410 is again opened at t2, and 41f1 remains energised.

At the next stepping of 41R, however, 41r1 is non-energised, and the inverter 41X causes 41r1.0 to be positive, so that at t1, G411 is opened, 41F changes to position 2, and G618 does not open. The absence of signal from G610, however, is inverted to a positive signal in 61X, and passed by G612 and G614 to the carrier track recording head to record a space. In this way, the whole of the code for the line circuit number is recorded.

The PC pulse at the end of the line circuit number storage section opens G209 to energise 22f3. At the same time, one of the gates G414, G415 or equivalent gate opens so that the tens digit of the storage track allocated, denoted by the position of 31C, is registered in 41R.

Before this information is used, however, it is necessary to record the completion mark, which is accomplished by means of G619 and G620. The PE pulse is in the appropriate position—see Fig. 8a—for the recording to be made and, since 12f3 for line 1 (i.e. 12f3(1)) is energised, the control 12f3(1) is positive and, therefore, both G619 and G620 will open and the recording will be made via G610, G611, and G613. For the duration of the PE pulse, G618 will be closed so that the condition of 41F plays no part in the recording of the completion information.

During the next positive waveform IPC, the contents of 41R, which, as will be recalled, give the telegraph code of the tens digit of the storage track in use, are passed to the carrier track record head in a manner similar to that described for recording the line track number. For this new recording 22f3 opens G617 to allow the state of 41F to be recorded via G618. The PC pulse at the end of this item of information opens G210 to energise 22f4 and the same PC opens one of the gates G416, G417 or equivalent gate so that the telegraph code of the units digit of the storage track in use, denoted by 32C, is registered in 41R. As for the previous information, this information is recorded via G618, 22f4 being repsonsible for opening both G413 and G617.

The next PC pulse opens G211 and G202 to energise 22f5, so restoring 22F to its rest condition. 22f5 energised closes the gates G611 and G612 preventing further new information from passing to the carrier track but at the same time opening G615 and G616 so that the booking now recorded may circulate as previously referred to in synchronism with the storage sections of the booking track. The booking must now be passed from the carrier track to the booking section indicated on the booking track.

An element at the beginning of each booking storage section serves as a distributor for storing bookings in the received order. One only of these elements, namely the one at the beginning of the storage section to receive the next booking, is a 1, all others being 0. Thus, the booking on the carrier track must circulate until the storage section marked by 1 is reached, when transfer of the booking must take place. At the same time the 1 must be replaced by 0, to indicate that this section is not to be used for the next booking, and the 0 in the next distributor position changed to 1. This operation is included in the description of the transfer booking operation which follows.

When 22f1 was energised by the PB pulse, 51f1 was energised also to indicate that a new booking is being passed to the carrier track. When the 1 in the distributor position is read, coinciding with a WQ pulse, the control 1BT becomes positive so that G506 will open to energise 51f2, which in turn energises 52f1. The same WQ also opens G621, thus causing the 1 which is read from the booking track to be recorded as 0. At the end of the WQ pulse, G623 and G624 open so that the information from the read head of the carrier track passes via G623 and G625 or G624 and G622 to the correct storage section of the booking track.

Pulse 51f2 is a slowly rising pulse, to prevent it combining with the WQ pulse at this stage to open G507 and thus pass 51F straight into position 3. The next WQ pulse, however, i.e. at the end of this booking section, opens G507 which energises 51f3 and so closes G623 and G624. Also WQ opens G626 so that, although 0 is read for this distributor element position, 1 is recorded. The following WB pulse opens G508 to energise 52f2 and 51F and 52F are now back to their initial conditions. The booking has now been transferred and the distributor moved to the next storage section in readiness for completing a booking for a further incoming message.

12F is returned to 12f1 energised by the PD pulse at the end of the transfer revolution opening G113. The same PD pulse opens G114, all other controls on this gate being positive, to energise 11$f$4. PD also transfers 31F to 31$f$4 energised and, as soon as all operations including booking have been completed 23$f$11 will be energised and the circuit is in readiness to deal with a further transfer operation. In practice, the inter-dependence of the various re-setting controls just described may require the use of the staggered $t_1$, $t_2$, $t_3$ pulses to secure correct sequential action.

*(e) Booking of a message requiring several storage tracks*

In this case, the end of message character will not be received during the first line track portion of the message. Instead it is necessary to effect transfer before the track is completely filled. During the recording of a message on the line track, a distributor element is progressively made 1 to indicate the location for recording the next character. To ensure that the message length does not exceed the line track capacity before transfer takes place, an indication is given in advance that storage is required by arranging that a distributor element becomes 1 for a storage section which is a predetermined number of storage sections from the end of the available track space. The succeeding storage sections are capable of dealing with other received characters until transfer can take place. The pulse coinciding with the predetermined distributor element position is PX.

When the condition of 1 in this element position is satisfied, G115 will open to energise 11$f$1. As described above, 11$f$1 energised indicates that a transfer has to be made but, since 12$f$2 is non-energised, it is known that, although a booking is to be made, it is for an incomplete message. Operations whereby transfer takes place and the priority, line track and storage track information are passed to the carrier track occur as for the previous case. However, there is a variation in respect of the completion element. For the latter, when PE occurs, G619 and G620 remain closed so that this element is recorded as 0, not 1 as in the previous case.

The booking recorded on the carrier track will pass to the booking track, again as previously described.

A further variation occurs in the operation of 11F. When the PD pulse is generated at the end of the transfer revolution, 12$f$3 will not be in an energised condition so that G116, not G114, opens so causing 11$f$3 to be energised. Again 23F returns to 23$f$11 energised at the end of the operation.

It is appropriate at this stage to give the reason for the inclusion of G112 and 12$f$3. An interval can elapse between the time a line track applies for transfer and the time that the common equipment is free to perform the necessary operation, and it is possible for the end of message character to be received before transfer takes place. Should this character be received before the recording of the booking on the carrier track commences, 12$f$3 will be energised by PB so that a completion can be effected. Failing this, completion cannot be carried out until a further transfer operation during which 12$f$3 can be energised.

Carrying on with the description assuming that the end of message character has not been received at this stage, assume that a second line track section of the message is received. Once again the distributor element on the line track has moved to the predetermined position before receiving the end of message character. G117, not G115, opens and 11$f$2 is energised. 11$f$2 causes the common equipment, when free, to allocate a free storage track to permit transfer to take place but, since G112 and G207 remain closed, 22$f$1 is not energised and no changes take place in the booking circuits 51F, 52F and 41R. The PD pulse at the end of transfer opens G116 and 11$f$3 is energised once again.

The operation described continues for further line track sections of the message, transfer taking place but no changes being made in the booking arrangement, until eventually the end of message character is detected causing 12$f$2 to be energised. With 12$f$2 energised, G119 opens to energise 11$f$2 and again a free track is selected. 22$f$1 remains non-energised. Transfer is initiated by 11$f$2 and, when the PB pulse is generated, 12$f$3 is energised to indicate that the booking associated with the message undergoing transfer should have a completion mark. The booking previously passed to the booking track includes the line track number, so that it is unnecessary to make use of the carrier track; knowing the line track from which the message is passing to storage, it is sufficient to search the booking track for incoming bookings made by that line track and ensure that each has a completion mark entered in the appropriate element.

G509 (or one of the equivalent gates for the other line circuits) is opened and 53$f$1 energised. When the PD pulse is generated, G511 is opened and 53$f$2 energised, this stage being included to ensure that the search for the line track number starts at a definite place, carries on for one drum revolution and then ceases. The succeeding WQ pulse opens one of the gates G418, G419 or equivalent gate to register the line track number, given by 23F, in 41R. During the WL waveform, which coincides with the line track number storage section on the booking track, G424, G413 and G412 open and the pattern registered in 41R is stepped along, the elements being read in turn by 41F. (It should be noted that 41F will operate during the IPC waveform when WL is not present but no stepping or comparison takes place at times other than when WL is present to open gate G424.) G512 and G513 are arranged so that either of the gates will open when the output of 41F is opposite to that from the reading head via 64A of the booking track. Thus, G515 will open and 54$f$1 be energised when the line track number in the booking track is different from the line track number registered in 41R and for which search is being made. When the WB pulse occurs, if the booking line track number is not the correct one, 54$f$1 will be energised and G627 will remain closed. However, for the same line track number, G515 will not open and 54$f$2 will remain energised and, in consequence, the WB pulse will open G627 causing a completion mark to be inserted, irrespective of whether or not one was already present. The next WQ pulse again opens the gate of G418, etc., previously opened and the line track number is re-registered in 41R. Comparison again takes place for the next booking storage section and the completion mark entered, if necessary. The registering of the line track number in 41R, comparison by 54F of the contents of 41R and the output of the booking track reading head and control of the insertion of the completion mark for the remaining bookings takes place as described above.

When a complete revolution has been made by the drum, the PD pulse opens G516 to energise 53$f$3. In the meantime, the PD pulse at the end of the transfer revolution will have caused 11$f$4, 12$f$1 and 31$f$4 to be energised but no further transfer operation can have started because 23F is still off normal. When the booking operation is complete, i.e. 53$f$3 energised, the gate controlling 23$f$11 is opened, 23$f$11 is energised and the circuit is in readiness for dealing with further transfer and booking operations.

Arrangements having now been described whereby incoming teleprinter messages may be transferred to a common store, and a booking made of particulars relating to them, the necessity arises for the further disposal of the stored messages.

The features now to be described are those associated with retransmission of a stored message.

For convenience in the description of the required connecting link it will be assumed that the addressees are given in that part of the message which follows the priority designation and that the character following the addressees and dividing them from the text is a full-stop.

The addressees and full-stop part of the message is referred to as the "first line" in the following.

A brief description will first be given of the diagrams involved, comprising Figures 9-15, together with Figs. 8A-8D, which show the pulses and waveforms involved (not all of these are required in the current description) and also the allocation of elements on the storage, incoming and outgoing booking tracks.

In Fig. 9, 91F is a multi-stable register circuit forming part of the common equipments; 92F is a circuit used to determine whether a booking is for a completed message or a message which is still being received; 93F is a circuit which is used to indicate that the search for the highest priority booking is being carried out. Further use is made of 93F to give useful control arrangements for the operation of 101F.

In Fig. 10, 101F is a multi-stable register which is used in controlling the search for the highest priority booking and then in causing the selected booking to be erased from the booking track.

In Fig. 11, 111R is a pattern movement register which is used for temporarily storing the booking information so that a comparison can be made with the contents of 112R, a pattern movement register which is used to store the highest priority booking found during the search. TS is a signal which indicates that the priority of a booking contained in 112R is higher than that of the booking in 111R; CPS is a signal which indicates that the booking in 111R has the same priority as the booking in 112R.

In Fig. 12, 121F is a multi-stable register which is used to control the search for the storage track indicated by the selected booking. 121C and 122C are counters which in combination define the 100 storage tracks (cf. 31C and 32C of the previous description).

In Fig. 13A, 131R is a pattern movement register which is used to store the individual characters of the first line as they are read from the storage track and pending translation to an outgoing booking store. 131F is a circuit used to control the reading off of these characters; 132F is a bistable register used to note that a booking has been made for the address brought down in 131R. 133F is a circuit which is used to control the recording of the distributor element which denotes the next character to be read off the drum.

Fig. 13B, shown as an inset panel in Fig. 13A, provides a set of alternative controls for position 1 of 132F for use in the address-concentrator arrangement.

In Fig. 14, 141F is a circuit which checks each character as it is read off the drum, the object being to look for the full stop which occurs at the end of the first line ("Full-stop monitor").

Figure 15:
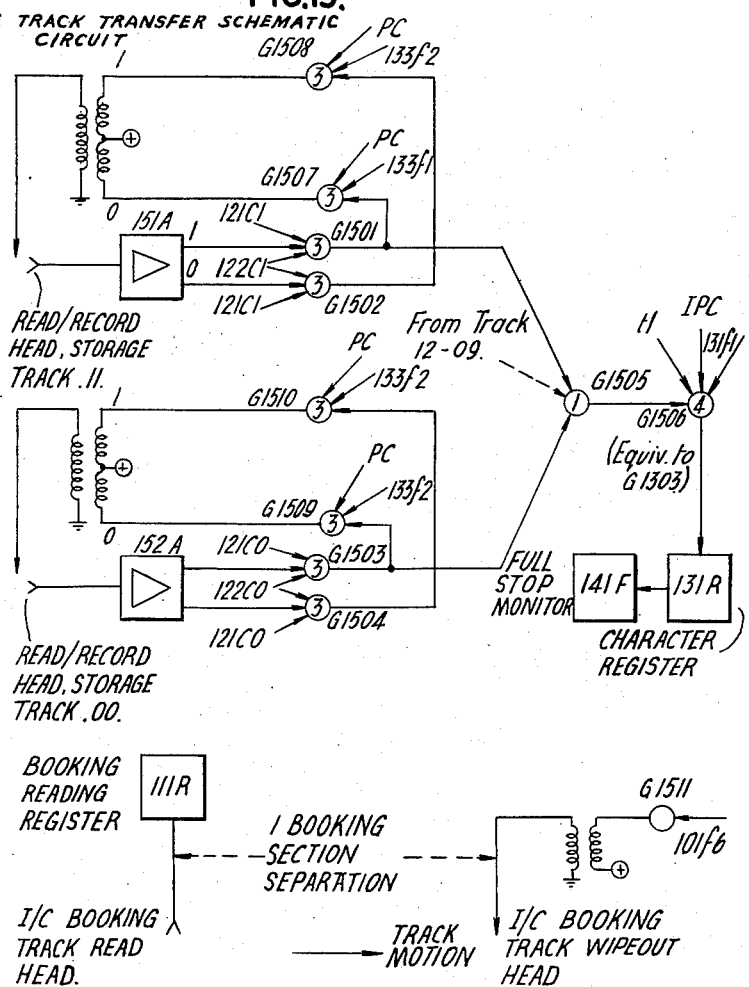

Fig. 15 illustrates the manner in which the first line of the selected storage track recording is passed via the track selector (gates controlled by 121C and 122C) to the character register, 131R, and the character check, 141F. The arrangement for changing the distributor elements as the characters are read from the storage track is included. Also illustrated is the association of 111R with the booking track together with the means for wiping out the selected booking.

*(f) Selecting the highest priority booking*

As will be remembered, when a message has been completely received the element corresponding to the WB pulse has a "1" recorded in it, the similar elements of incomplete messages or booking sections in which no entries have been made having a "0" recorded. Thus, until there is a booking requiring attention G901 cannot open to energise 92f1. However, when there are complete messages awaiting attention, G901 will open for the WB pulse of a completed message causing 92f1 to be energised. 92F is thus caused to examine all bookings for completeness or otherwise.

With a booking ready for attention, the succeeding WQ pulse opens G912 to energise 91f1. At this time 101f1 will be energised, so that G1007 will open, causing 101f2 to be energised. This opens G903 to energise 91f2, so removing the request for a booking to be found.

Now it is necessary to choose the booking of highest priority and the booking of that priority which has precedence due to its earlier time of arrival. In the section dealing with the incoming booking, it was explained that a distributor element WQ, being "1," denoted the booking section to take the next booking. Hence the next booking in rotation after this point will be the earliest booking made. (N.B. Bookings are made serially in time on the booking track, blank spaces due to removal of earlier bookings not being filled out of turn.) It should be understood that between the next section to receive a booking and the earliest made booking requiring attention there will be a number of sections still awaiting bookings. To give the correct precedence, the search for the highest priority booking must start at the WQ distributor element which is "1." When this is reached, G1008, G1009 and G1010 will open causing 101f3 to be energised. The WB pulse which follows the energising of 101f3 opens G904 and G905 causing 93f1 to be energised. The output of 93f1 is used to indicate that search for the highest priority booking has commenced and, as will be seen, is used in the further control of 101F.

Referring to Fig. 11, the information in the character positions of the booking track is constantly read into 111R via G1101, the pattern being stepped via G1102 so that, when a WQ pulse occurs, the information in 111R will be a complete booking. 111r1–5 give the priority, 111r6–10 give the line circuit number (not used in this part of the operation) and 111r11–15 and 111r16–20 give respectively the tens and units designation of the storage track which holds the first part of the message and hence the first line. The reading into and the stepping of 111R take place only during IPC; there is no necessity to store the intervening elements of a booking. The control 1BT applied to G1101 is the "1" information control from the booking track reading circuit 64A in Fig. 6.

For simplicity, it is assumed that the priority of messages is given in binary values, the higher the binary number the greater the priority. The least significant element will, during WQ, appear in 111r5. Since three binary elements will give up to 7 priorities, it will further be assumed that this number is sufficient so that 111r3–5 will give the required information. Of course the number of priorities could be increased to 31 using the five available elements. This would simply require an extension of the gating networks providing TS and CPS. The arrangement of gates G1106–G1113 giving TS is arranged so that when a priority registered in 111R is higher than a priority registered in 112R, TS will become positive. Similarly the gating arrangement G1114–G1120 and the inverter 111X is arranged so that when the priority registered in 111R is the same as the priority registered in 112R, CPS will become positive.

This is effected by means of the active and inhibitory controls respectively on the comparison gates G1106–G1112 for TS, and on the comparison gates G1114–G1119 for CPS, bearing in mind the significance indicated above of the elements 3 to 5 respectively of registers 111R and 112R respectively.

For CPS, which is simpler to understand, it is clear that, for equal priorities, every one of the comparison gates will be closed, either by absence of an active control (both elements 0) or by the presence of an inhibitory control (both elements 1), whereby no signal will be applied to G1120, and the absence of output therefrom will be inverted in 111X to a positive signal for CPS. For unequal priorities, one gate at least will open to give an output to G1120, which is inverted to zero for CPS. For example, if the r5 elements are unequal, 111r5 being 1, and 112r5 being 0, then G1119 remains closed, both by inhibition and by lack of active control, whereas G1118 opens to 111r5, 112r5 being 0.

The generation of a positive signal for TS is not quite so readily seen, but proceeds in somewhat similar manner. Starting at the right, with the most significant element (r3), if 111r3 is 1 and 112r3 is 0, then regardless of the state of the remaining elements, the number in 111R is indubitably higher than that in 112R, and G1112 and G1113 open to give a positive output to TS. Similarly, if 111r3 is 0 and 112r3 is 1, then the reverse is true, and G1111 is given an inhibitory control from G1110, G1112 is inevitably closed and TS is zero. For equal elements in r3, G1112 is closed, G1110 is closed, G1111 is not inhibited, and the generation of a signal depends on the state of r4, with similar considerations applying; and finally, on r5, for which only one gate is necessary, that giving a positive signal for a 1 in 111r5, and an 0 in 112r5.

Continuing with the circuit operation, if when the WQ pulse occurs, 111R contains a higher priority than 112R, as must be the case when the first booking at the commencement of a search is registered in 111R, TS will be positive. If 92f1 is energised, indicating that the booking is for a completed message, G1011 opens and 101f4 is energised. Should the booking be for an incomplete message, 92f1 will not be energised and G1011 could not open. However, for the first completed message G1011 will open and 101f4 will be energised. The latter prepares G1103 so that as the next booking is read into 111R, the information previously contained in 111R is read into 112R via G1103, the pattern being stepped by means of G1104, opened by 101f4, and G1105, so that, when the next WQ pulse occurs, a new booking will be stored in 111R, the one previously contained by 111R now being registered in 112R. Several different actions are now possible. The new booking in 111R may be a higher priority than the one in 112R, but may or may not be for a completed message or it may be for a lower priority, or again for either a completed or an incomplete message. The various actions when WQ occurs are summarised as follows (considering the priority in 111R). (N.B. In what follows, the statement that a certain gate is closed by such and such control implies the absence of such control used normally to open the gate. This must not be confused with an inhibitory control, the presence of which closes the gate in all circumstances):

(1) Higher priority, completed message booking. Neither G1012 nor G1013 can open due to the inhibition by TS and to 92f2 respectively, and 101f4 remains energised so that the new booking in 111R will pass to 112R replacing the one already in the latter.

(2) Higher priority, incomplete message booking (OBT on G1014). At this time 92f2 must be energised so that G1013 opens, 92f1 closes G1011, and 101f3 is energised once again.

(3) Lower priority, completed message booking. G1011 is closed by TS; the TS inhibition on G1012 is removed so that the latter gate opens and 101f3 is energised via G1012, G1013, etc.

(4) Lower priority, incomplete message booking. G1011 is closed by both TS and 92f1; G1013 is opened by 92f2 causing 101f3 to be energised.

In all the above cases 101f5 cannot be energised since G1018 and G1021 are closed by 1BT and 93f2 respectively.

From the above summarised conditions it can be seen that 101f4 will be (or will remain) energised only for completed message bookings of a higher priority than that contained in 112R. This occurs if either 101f3 or 101f4 was previously energised. The search continues as described until once again the WQ pulse occurs for the distributor element which is "1." This pulse opens G906 and G907 causing 93f2 to be energised. The further operation of 101F is again dependent upon the condition in which 101F is at the time of the WQ pulse, the relative priorities of the bookings stored in 111R and 112R and also whether the last examined booking is for a completed or an incomplete message. Again the actions when the WQ pulse occurs are summarised in the following:

(5) 101F has either 101f3 or 101f4 energised and the booking in 111R is for either a lower priority, or an incomplete message, or both. G1011 is closed by either TS, 92f1 or both; G1014 is closed by 0BT (i.e. the "0" control from the booking track reading circuit). However, G1015 and G1017 will be open allowing G1018 to open, followed in turn by G1019 and G1020 causing 101f5 to be energised.

(6) 101F has 101f3 energised and the booking in 111R is for a completed message of higher priority. G1014 is closed by both 0BT and 101f4; G1018 will be closed by the TS inhibition and 92f2, and G1021 by 0BT and 101f4 respectively. Now G1011 is open and 101f4 is energised to allow the booking contained in 111R to pass to 112R, as previously explained. When the next WQ pulse occurs, G1014 will be closed due to 93f1, which was deenergized by the WQ pulse coinciding with 1BT, irrespective of the other controls. G1011 will not open since any booking examined at this time will have been examined already and so cannot be of higher priority; also, as previously stated there will be unused booking sections between the "1" distributor element and the first encountered booking. However, G1021 will open and 101f5 will be energised.

(7) 101F has 101f4 energised and the booking in 111R is for a completed message of higher priority. G1014 is closed by 0BT and also by the control from G1013; G1018 and G1021 are closed by TS inhibition and 92f2 and by 0BT respectively. Thus 101f4 remains energised, allowing the booking in 111R to pass to 112R. The action for the next WQ pulse follows as described in (6) above.

From the above it can be seen that when all bookings have been checked for their priorities and state of completion, the booking for the highest priority completed message will have been passed to 112R. Also by starting the search from the earliest booking, the booking selected will also have precedence in time of arrival for the bookings of the particular priority. When 101f5 is energised no further search for a higher priority can take place.

Having registered the highest priority booking of the completed messages it is necessary to remove this booking from the incoming booking track so that it cannot be selected again. The particular booking can be found by the fact that it is the first booking encountered, when searching from the distributor element which is "1," and having the priority of the booking registered in 112R.

To enable the same priority to be found, the signal CPS (Fig. 11) is used. The combination of gates G1114–G1120 is so arranged that, should any one of the corresponding elements denoting the priorities of the bookings in 111R and 112R be different, there will be an output from G1120 and the output from the inverter 111X will be zero. Conversely, when all corresponding elements are the same there will be no output from G1120 but 111X will cause CPS to be positive. As the bookings pass into 111R, at each succeeding WQ the priorities are compared until, when the priorities given by both 111R and 112R are the same, CPS being positive allows G1022 to open and 101f6 is energised. The booking on the booking track which has just been read into 111R will now have its first element one booking section past the reading head. Thus, a recording head controlled by 101f6 is located at this position so that, as the booking passes this head, the recording is removed by recording "0" in all element positions. The distributor element at the commencement of the booking section being erased is not, however, returned to 0, so that blank sections in the booking track are not filled up out of turn, but fresh bookings continue to be made serially in time.

The WQ pulse which follows opens G1023 to energise 101f7 so that the required booking only is removed, i.e. 101f6 is energised only from one WQ pulse to the next. To prevent the same WQ energising first 101f6 and then 101f7, the control 93f1 has been added to G1023. The operation of 93F is such that the WB pulse, following the WQ which energises 101f6, energises 93f1 via G908 and G905. It can be seen that 101f7 is energised only when 93f1 is energised and hence G1023 will be opened by the WQ pulse following that which energised 101f6 and the necessary booking only will be removed.

Before 101F is allowed to return to 101f1 energised in readiness for a further search and removal operation it is necessary to use the information contained in 112R to set the track selector switch to the indicated storage track for reading off and registering the "first line" of the selected message for setting up the necessary outgoing bookings. Furthermore the booking contained in 112R must then be removed before checking priorities once again, otherwise the bookings will be compared with the priority already registered.

*(g) Setting the track selector and making the necessary outgoing bookings (without address concentration) (Fig. 32)*

When 101f5 was energised, the required booking was registered in 112R. The WB pulse which follows this opens G1201 in Fig. 12, causing 121f1 to be energised. The latter opens G1202 so that 121C steps under control of the stepping pulses, PS. It has been stated that 112r11–15 indicate the tens designation of the required storage track. The controls of G1203 consist of 121C1 together with 5 other controls from 112r11–15, these latter controls giving the recorded code equivalent of 1. (This was explained in the booking operations above, dealing with the recording of this information.) There will be nine other gates connected to G1204, these gates consisting of other outputs of 121C and the coded equivalents. Thus, when 121C steps to a position indicated by the tens number registered in 112r11–15, the appropriate gate will open, allowing G1204 and G1205 to open, and causing 121f2 to be energised, so closing G1202 and opening G1206.

Thus 121C stops but now 122C will step under control of the PS pulses. G1207 consists of 122C1 together with 5 other controls, these latter controls being from 112r16–20 and giving the recorded code of 1; 112r16–20 contain the units designation of the required storage track. Again there are 9 other controls for the other outputs of 122C and their coded equivalents. 122C will step until the required position is reached when G1208 and G1209 will open to energise 121f3, so stopping 122C. The track selector has now been set to the required track and it is possible to remove the information from 112R and restore 101F to 101f1 energised so that further bookings may be examined, when required.

In the meantime, 101F has passed through to 101f7, as described above, and in 101f7, with 121f3, G1027 opens to a WQ pulse and 101f8 is energised. 101f8 opens G1104 so that the contents of 112R are stepped along and thereby removed. The WB pulse occurring with 101f8 energised opens G909 and 93f2 is energised. Thus, the following WQ pulse can open G1028 and G1029 to energise 101f1 in readiness for the next required search operation. 93F ensures that 101f8 is energised for the duration between two WQ pulses, as it did in the case of 101f6, used for removing the recording.

The next requirement is to read off in turn the addresses in the message on the track now defined by 121C and 122C. This part of the arrangement is shown in Fig. 13A (disregarding the Fig. 13B amendments). Now the priority is of no significance in this connection, only the addresses being required. It must, indeed, be suppressed since, being a numeral, it could be interpreted as an address. This is achieved by inserting a "1" in the distributor element between the priority and the first address. For this purpose, the combination of controls PC and 22f1 applied to G208 after the priority of the message has been booked during the transfer of the first line track load of the message is applied also to G628 via G655. This is a non-recurring combination of controls which is thus applied only during the first transfer.

With 121f3 energised, the PA pulse, which occurs at the beginning of the message, opens G1301 to energise 133f1. When the "1," mentioned above, is read, 1ST, i.e. the "1" control from the storage track reading circuit, will cause G1302 to open and 131f1 will be energised. (The PB inhibition on G1302 prevents it opening to the previous "1," preceding the priority.) This "1" information is obtained via G1505, this gate being controlled from the required storage track via one of the gates G1501, G1503, or equivalent, according to the setting of 121C and 122C. When this "1" is read it is necessary to record "0" in its place so that this character will not be taken out again, and also to advance the character distributor, i.e. the following distributor element must be changed from "0" to "1." This is accomplished by means of controls from 133F.

To give an example, consider that the first line of track 11 is to be read for addresses. When "1" is read in the distributor element via G1501, G1507 will be opened by PC, causing "0" to be recorded in place of the "1." The succeeding IPC opens G1306 to energise 133F to position 2, so that when the next distributor element (after the first address) is read as "0," the accompanying PC with 133f2 opens G1508, causing "1" to be recorded, and PC and "0" open G1307 to restore 131F to position 2. With the succeeding IPC, G1309 is opened, and 133F passes to position 3.

Returning to the operation when 131f1 was initially energised by the opening of G1302, 131f1 energised prepares G1303 and G1304 so that as the character following the marked distributor element is read (i.e. the first address), this information (comprising the "1") is passed via G1303 into 131R6, and the pattern is stepped along under control of G1304. As the information passes into 131R, G1306 is opened by IPC and 133f2 energised, as explained above, for changing the next distributor element from "0" to "1." When this element is read 0ST, applied as an inversion to G1307, energises 131F to position 2, so cutting off the reading circuit at G1303.

The same PC pulse, which has followed the passing of the first character into 131R, is used to examine whether or not this character is a full stop. (It clearly is not for the first address, but a full stop must occur eventually.) G1311 can open only for a full stop character in 131R, by reason of the choice of its five 131r-controls, and since the output of this gate is used to inhibit G1308, if the character in 131R is other than a full stop, G1308 opens to energise 132f1. With 132f1 energised, G1301 cannot re-open to energise 133f1, and so no further character can be passed to 131R at this stage. The next stage is to cause the booking information to be passed to the outgoing booking track denoted by the character in 131R.

Passing now to Fig. 23A, 132f1 energised opens G2302 and 231f1 is energised. 231f1 prepares G2303, and 231C is caused to step under control of PS pulses. Each of the outputs of 231C is associated with an address, and the combination of an output from 231C with its corresponding address code from 131R on a gate such as G2304, of which there is one for each address, causes 231F to pass to position 2 when 231C reaches the position of the address indicated by 131R, so stopping 231C at this position. This is similar to the arrangement shown in Fig. 12 for setting the track selectors.

It is now necessary to pass the booking information to the outgoing booking track selected by 231C. The booking information required consists of the priority, given by 112r1–5, and the storage track number, tens and units, given by 121C and 122C respectively. The gates G2217–G2221 in Fig. 22, each including a control from register 112R, cater for a priority grading of five binary elements, although it will be recalled that Fig. 11, for convenience, was described in terms of three binary elements only. These differences, of course, are of no significance; the use of five elements merely provides a more convenient and logical arrangement in a 5-element permutation code telegraph system.

In Fig. 22, 221C and 222C constitute a tandem-operated counter which controls the transfer of the components of the outgoing booking to 221R. The priority, which is passed first, is controlled by 222C1 applied to gates G2221–G2217, the second control on these gates comprising respectively the first five elements of 112R. The tens unit of the storage track selected is passed next, and is controlled by 222C2 applied to gates G2207, G2209, G2211 and G2214, the second control on these gates being applied respectively through the "OR" gates G2222–G2225, the controls of which are a selection of 121C1–9 controls to give a decimal-to-binary conversion. Thus, for example, 6, which, as a binary number is 0110 (4 plus 2) is translated to binary by having a 121C6 control on gates G2224 and G2223, controlling positions 2 and 3 of 221R. Similarly for other decimal numbers (7=4+2+1, i.e. binary 0111, appears on G2223, G2224 and G2225). Finally, the units digit, from 122C, is applied in position 222C3 with a similar decimal-to-binary conversion, and thus appears on gates G2226–G2229 controlling gates G2208, G2210, G2213 and G2215.

The various elements are passed to 221R4–1 in counter position 221C1 in timing position $t_1$ via gates G2203–G2206, being stepped along to position 1 of 221R in timing position $t_3$; 221C being stepped in unison therewith, and advancing 222C one step at every fifth step.

However, before the operations just briefly referred to can be carried out, the next store to be used in the outgoing booking store of the selected address must be engaged, and this is achieved by the use of waveform WQO, Fig. 8C, which, in combination with the distributor element which is 1 ("1BTO") and 231F being in position 2, opens G2306 to energise 231f3. Position 231f3 controls the transfer from 221R via G2216, at times when WQO and WBO (see Fig. 8C) are not operative, and also controls the driving of 221C and 222C via G2202 and G2201 respectively.

"1BTO" is a composite control derived from the individual outgoing booking stores of the addresses covered by the exchange, there being a 1BTO(1), 1BTO(2) etc. for every address defined by a position of 231C, and applied via gates such as G2317, G2318, G2319 having an individual BTO control and its corresponding 231C control. These are combined in G2320 to give the 1BTO control applied to G2306, and inverted in 232X to give a 0BTO control, applied to G2307.

The booking track read/record circuit for destination (address) 1 is shown in Fig. 23A, where the reading circuit passes through 231A and is shown as deriving 1BTO(1), and the main recording circuit is controlled from G2301 at times when WQO and WBO are not operative and for 231C in position 1. Information is passed via 221R1 using the positive control 221r1.1 when 231F is in position 3. "0" from 221R1 is inverted in 231X to record a "0" via G2312.

The operations just outlined will now be described in rather more detailed and logical order. Under normal conditions, when the priority appears on 112r1–5, 221C and 222C are resting in position 1, and the register 221R will be set (at $t_1$) in its several positions to a condition indicated by the priority markings and conveyed over G2217 (for 221R5) or combinations of gates like G2218, G2230, G2203 for 221R4–1.

With 231f3 energised as described, G2202 will open at timing element $t_3$ to advance 221C, at the same time G2216 opening to advance the elements in 221R successively through position 1 thereof, the successive 1 and 0 elements being passed through G2301 and G2313, or G2301, 231X and G2312 to be registered in the booking track for the priority section between WQO and WBO (see Fig. 8C).

When 221C reaches position 5, G2201 is prepared so that, as 221C returns to position 1, 222C moves to position 2. However, after position 5, WBO arises, so inhibiting G2202 and G2201 (and G2216) for the duration of the distributor element, for which other action, to be described, is required. After the passage of WBO, G2202 is again opened, 221C passes to position 1, 222C passes to position 2, and the tens digit, converted to binary coding, comes down in 221R4–1 via combinations of gates like G2202, G2207, G2230, G2203, and the ten's information registered in 221R is passed and recorded as before. Again, as 221C passes from position 5 to position 1, 222C passes from position 2 to position 3 and the units information is registered in binary form in 221R via gates like G2206, G2208, G2230, G2203, and duly recorded in the last section of the booking track, the end of which is defined by the succeeding WQO element.

The booking is now complete, but it is necessary to show what happens to the various distributor elements defined by WBO and WQO, and the action of 232F.

When 231F passed originally to 231F2 on identification of the wanted address, 232F passed to 232F1, and each WQO pulse arising caused a "0" to be recorded, via G2311 and G2312, in the appropriate booking store until 1BTO was encountered, when 231F passed to 231F2. Thus, the distributor element found as a "1" and defining the next booking section to be used was left as a "0."

On the occurrence of the succeeding WBO pulse, within the booking section in use, a "1" is recorded via G2316 and G2313, and 232F passes to position 2, via G2308. This "1" in WBO indicates "message waiting." When the next WQO pulse arises, at the end of the booking section, a "1" is recorded via G2314 for defining the next section to be used, but first 231F is returned to rest in position 4 via G2307 and G2305. The next WBO pulse opens G2309 and G2310, and 232F passes back to 232f3 energised.

Whilst 231f3 is energised, during the booking process, WBQ opens G1305 (Fig. 13A) to energise 132f2 once again. In consequence, G1301 reopens to energise 133f1, followed in due course by 131f1, and the next character passes from the storage track to 131R. Again, if this is other than a full stop, 132f1 is energised followed by 231f1, and 231C is set according to the new address in 131R. The booking for this address is made as described above, and the procedure repeated for each address as it is encountered.

Eventually, the character passed to 131R will be a full stop, this character being used to divide the addresses from the text of the message. When this happens, the succeeding PC pulse will find G1303 barred by the inhibition from G1311, now open, and 132f1 will not be energised so preventing 231f1 being energised. Instead, the same PC pulse opens G1408 (in Fig. 14) energising 141f1, and the following PC pulse opens G1409 to re-energise 141f2. G1408 does not then reopen because, in the meantime, 133F will have passed to 133F3. In the interval, however, 141f1 with IPC will have opened both G910 and G1210 to energise 91f3 and 121f4 respectively, and the equipment is back to its original state in readiness for dealing with any further booking awaiting attention in the incoming booking track. The signal for this is the energisation of 91f1, and the succession of events just described will follow for the new booking information.

Before passing on to descriptions relating to the further disposal of messages, bookings for which are accumulating in outgoing booking stores, it is desirable to describe the similar arrangements for making outgoing bookings with concentration of addresses accessible via a single destination (Item (h), Fig. 33).

At this stage, concentration is most conveniently effected as, the addresses are withdrawn from store, the object being to convert all addresses for one desination to a single destination code element. However, generation of the destination code elements relative to the addresses indicated in a particular message can be effected on entry of the message into store, and will be described in due course in connection with the generation of Track Clearing Signals.

The description commences from the moment of the reading-off into the pattern register 131R of the individual addresses given in the first line of the message.

The multi-stable registers 301F–303F (Fig. 30) are provided on the basis of one per destination accessible from the exchange, and are, of course, representative only. Each destination register will have associated with it a number of coding gates under the control of outputs from 131r1–5, there being one such gate for each address associated with a particular destination. For example, 301F is assumed to be the multi-stable register used for destination 1, and G3004 and G3005 are the coding gates for two of the addresses for which delivery to these addresses must be by transmission of the message via the outgoing group of circuits to destination 1.

As previously described, the energisation of 131f1 for one character section allows the first address to pass into 131R, and at the end of this section of recording, one of the coding gates G3004–G3007 will open according to the contents of 131R, e.g. G3004 or G3005 would be opened by one or other of the addresses associated with desination 1. Thus, G3008 will open and the succeeding PC pulse opens G3009 causing 301f1 to be energised, indicating that a booking has to be made for desination 1. G1311 in the Fig. 13B block of Fig. 13A follows, and the succeeding IPC, with 231F in position 4, opens G1308 to energise 132f1 which opens G2315 in Fig. 23B to energise 231f2. (In Fig. 23B, 231F is a register without a position 1. This is done purely for circuit convenience, to avoid changing the bulk of the control references derived in Fig. 23B. With the arrangement under discussion, counter 231C and its controls are no longer required, but the procedure from the stage of 231f2 is substantially unchanged in Fig. 23B. Hence the counter-driving stage, 231f1, is eliminated, and its starting controls applied direct to 231f2.)

The further operations in Fig. 23B ensue as for Fig. 23A, 301F, 302F etc. controls being substituted for 231C controls in the generation of 1BTO and the actual registration of a booking.

In the WBO pulse during the entry of the booking, 132f2 is re-energised and the circuit returns to the state in which operations can commence for passing the second address into 131R. The WQO pulse at the end of the entry of the first booking into the appropriate booking store opens G2307 to energise 231f4, and the same combination of controls together with 301f1 (assuming destination 1) opens G3014 to move 301F to 301f2 energised. Position 2 of these destination registers is equivalent to a "busy" condition, and prevents further action in respect of that particular destination.

Should the second address passed into 131R be for a different destination, position 1 of the appropriate 302F, 303F etc. registers will be energised, and the booking made for this destination in the manner previously described, and the register finally left in position 2.

Should, however, the second address passed into 131R be for a destination, say 1, for which a booking has already been made, then the 301f3 control is missing from the G3009 gate, and PC is unable to open the gate to energise 301f1 again. Consequently, G1311 remains closed, and 132f1 and 231f2 cannot be energised, and when 133F passes through its cycle of operations and 133f3 is eventually re-energised, the operation of extracting the succeeding address takes place, no booking having been made for the address just extracted.

This procedure continues until finally the full-stop at the end of the first line passes into 131R. None of the destination multi-stable registers will be operated by this character, but 141f1 will be energised, and the ensuing operations will be as previously described (above). Also, in the IPC element following the energisation of 14f1, G3015, G3017, G3019 and equivalent gates for other destination registers will open, restoring these registers to their stop position, and the circuit is in readiness for dealing with the next message.

(i) *Selecting the highest priority message awaiting transmission in a particular direction*

The foregoing describes how bookings may be made on the outgoing booking tracks. Now it is necessary to show how these bookings may be used to cause messages to be transferred as required from the main storage tracks to the outgoing line tracks. As described earlier, a message may be contained in one or more storage tracks. In the description to follow, it will first be assumed that a message occupies one track only. A further description will be given for the case in which a message is contained in several tracks. Further, it will be assumed that in one case there are two lines which go to a particular destination A and one line only to a destination B (not to be confused with the previous assumption of there being two addresses accessible via a single destination).

When an outgoing line track is free to deal with a new message, 241f4 (Fig. 24) in the line track circuit will be energised. A search is continually taking place to check whether or not there are bookings waiting for each destination. Taking the case of destination A, 1BTA of a WBO element will be positive so that if either of the lines 1 or 2 assumed going to destination A is awaiting a new message, G2502 and G2503 (Fig. 25) will be opened. If the common equipment 251F is not already in use, 251f10 will also be energised so that G2505 will open to energise 251f1. It should be noted in passing that G2506 plays the same part as G2503, for the booking track and line circuit associated with destination B. 251f1 energised opens G2602 and 261C (Fig. 26) will be caused to step. 261C has as many positions as there are outgoing lines from the switching centre. Positions 1 and 2 are assumed to be associated with lines 1 and 2 going to destination A, and position 3 with line 3 which does to destination B. When 261C steps to a position of which 241f4 of the associated line circuit is energised, one of the gates G2507, G2510 and G2511 will open causing G2508 and G2509 to open and 251f3 to be energised. At the same time G2602 will be closed and 261C will be stopped on the position indicating the outgoing line track which is to receive the next message to be passed from storage. Search for the highest priority booking for that destination is now due to commence. This search will start from the WQO element which is 1, that is, the bookings will be scanned in order of arrival (as on the incoming side).

When this element is reached, G2512 followed by G2513 and G2514, will open to energise 251f4. Here it should be noted that the control 1BT applied to G2512 is a combination of the 1 signals from all the booking tracks, the particular one controlling this lead at any particular time being governed by the setting of 261C, and derived as shown in Fig. 26. With 251f4 energised, G2701 will open, so that during wave form IPC at times $t_1$ G2702 will open and the information contained in the correct booking track will pass to 271r16. At times $t_2$ G2703 and G2704 will open so that the pattern in 271R will be stepped along to 271R1. At the end of a particular booking 271R will contain a complete booking, 271r1–5 holding the priority of the message, 271r6–10 holding the 10's number of the storage track and 271r11–15 holding the units number of storage track. Owing to the stepping arrangement used 271r16 will not contain any of the booking information.

Now it is necessary to check that the priority of the booking contained in 271R is higher than that of previous bookings. However, at this time 272R will be clear, as will be seen by the later description, so that 271R must contain a higher priority booking. To avoid describing for each priority comparison, it should be understood that the gate arrangement G2705 to G2712 is a means of comparing the priority elements contained in 271R with those contained in 272R. If 271R contains a higher priority than does 272R, TS will be in an energised condition, and for the opposite state, TS will be in a non-energised condition.

The state of TS is examined by the WQO pulse which arrives at the end of a booking. If TS is energised, as it will be for the first booking examined, G2515 will open and 251f5 will be energised. With 251f5 energised, as the next booking passes into 271R the booking previously contained by 271R will be passed via G2713 and G2714 to 272R and stepped along at $t_2$ (via G2718). Again, when the next booking has passed into 271R a check of priorities is made once more by the WQO pulse. Should the new priority in 271R be higher, 251f5 remains energised. Alternatively, if the new priority is equal to or less than that in 272R, G2516 opens (in a manner to be described) and 251f4 is energised. This allows further bookings to pass from the booking track into 271R without, however, the previous booking contained in 271R passing to 272R. This checking continues until the last booking, i.e. the latest made, is in 271R. If this is of equal or lower priority than the booking already in 272R, G2520 and G2521 open, as will shortly be described, causing 251f6 to be energised. Since this latest booking must be followed by 1 in the WQO element, G2516 cannot open, so that 251f4 cannot be energised. However, if the booking in 272R is of lower priority than the latest booking contained in 271R, 251f5 will be energised so that the booking can be passed to 272R.

It will now be explained how the differentiation between passing to 251f4 or 251f6 energised is obtained, by the use of 261F. It can be seen that the first WBO pulse to occur after 251f4 has been energised opens G2607 to energise 261f1. At the same time this causes the output 261f3.0 from the inverter 262X to become energised also. Thus, during the search for the highest priority booking 261f1 will be energised, which allows G2516 to open when necessary. After the latest booking is examined, as stated previously, a 1 will be read in the WQO position so that G2516 cannot open, but if we are dealing with a lower priority G2521 can open. The same WQO opens G2609 to energise 261f2. It will be seen that 261f2 is a control of G2517, which enables 251f6 to be energised should 251f5 have been energised for the latest booking examined.

The next requirement is to identify and erase from 271R the booking which is recorded in 272R. By the method of search described, this booking will be the earliest made of the highest priority contained in the booking track. Search for this booking is made with 251f6 energised. It can be seen that with 251f6 energised the bookings contained in the booking track are still allowed to pass to 271R. The combination of gates G2719 to G2724 is arranged to check for the same priority of booking contained in 271r1–5 and 272r1–5. When these priorities are the same, G2725 will be closed so that CPS, the output of the inverter 61X, will be energised. Then the WQO pulse occurring at the end of a booking with CPS energised opens G2522 to energise 251f7. At this time the booking on the track, which corresponds to the contents of both 271R and 272R, will be situated such that the start of the booking is one booking section past the reading head. Thus, to erase the recording it is necessary to have a recording head controlled by 251f7 located one booking section distance away from the reading head. The erasure must take place for one booking section only. This is obtained by using the output of 261F. As shown above, at the end of the search for the highest priority booking, 261f2 was energised. In the WBO pulse with 251f7 energised, G2610 is opened to energise 261f1, and in the WQO pulse following that which energised 251f7, G2523 and G2524 open to energise 251f8, stopping further erasure.

(j) *Establishment of outgoing link from store to line track and transfer of message*

With 251f8 energised the next step is to use the booking contents in 272R to set up the outgoing switches from the storage tracks so that the correct message can be passed to the correct outgoing line track. This is carried out in a similar manner to that described for the incoming side, but for the sake of completeness, a description of the process will be given. 251f8 energised causes 281f1 to be energised. This opens G2804 causing 281C, which has one position associated with each 10's storage track number, to be stepped. As will be remembered, 272r6–10 in combination indicate the 10's number of the storage track denoted by the booking being considered. Thus, when 281C steps to a position agreeing with the code given by 272r6–10, G2805 or an equivalent gate will open, so opening G2806 and G2807, causing 281f2 to be energised. This closes G2804 to stop 281C, but opens G2808 to allow 282C to step. The code for the units number of the storage track required is denoted by 272r11–15, so that when 282C steps to a position agreeing with this coding, G2809 or an equivalent gate will open, followed in turn by G2810 and G2811 to energise 281f3. This closes G2808 to stop 282C. Thus, the outgoing switches given by combinations of the outputs of 281C and 282C have been set up as required. As will be remembered, 261C was previously set to a position denoting the outgoing line track destined to receive the message, the switching arrangement being as illustrated in Fig. 29.

Having set up the switches, it is possible to allow transfer to the outgoing line track to take place. PA indicates the beginning of the main message storage track. With 281f3 energised, PA opens G2812 to energise 283f1. The latter opens G2904 and, as can be seen in Fig. 29, the message from the required storage track passes via G2901 or G2902 or equivalent gate via G2903 and G2904 to G2905 or G2906 or equivalent gate, and so to the outgoing line track. Pulse PD indicates the end of the message track. When this matures, 281f4 (at time $t_1$) followed by 283f2 (at time $t_2$) are energised, indicating that transfer has taken place and transmission of the message can commence. Before describing the necessary operations which occur in the line track circuit, the further operation of 251F will be described.

Having used the contents of 272R to set up the outgoing selector, it is possible to remove the contents of 272R in readiness for a future search for a booking. When 281f3 was energised the selector had been set so that the next WQO pulse to occur opened G2525 to energise 251f9. 251f9 opens G2715 so that during IPC 272R is stepped until the contents have been removed. With the arrangement used 272R will be stepped for a complete revolution of the drum so that stepping will occur even after the original contents have been removed, but this is of no consequence. Until transfer is complete it is still not possible to allow the booking search equipment to be used to deal with further bookings, for this might cause 281C and 282C to be moved in the middle of transfer. However, when the PD pulse occurs at the end of transfer, G2526 opens to energise 251f10, and the common equipment is back to its initial condition in readiness for dealing with further requests for a new booking.

(k) Transmission of message to line

Fig. 24 shows that part of the outgoing line track circuit which is necessary for understanding the manner in which the outgoing line track operates in conjunction with the equipment so far described. Earlier it was shown that 251*f*4 was energised to cause search for the highest priority booking to commence. With 251*f*4 energised the WBO pulse which follows opens G2405 of the particular line track circuit denoted by the setting of 261C. In Fig. 24 this control is shown as 261c1, it being assumed that the line track to receive the message for the booking under consideration is line 1 which is associated with 261c1. G2405 opening causes 241*f*1 to be energised. When the message has been transferred to this line track, the PD pulse which caused 281*f*4 to be energised also opens G2407 to energise 241*f*. It should be understood that it is impossible for more than one of the 241*f*1 to be energised at a time, because of the 261C control. The PA pulse which follows opens G2408 to energise 242*f*1. This position can be used to change to 0 the 1 in the distributor element position indicating the first character to be transmitted. When this element is read, i.e. in PC pulse position, G2409 will open causing 243*f*1 to be energised. Wave form IPC which follows will open G2410 to energise 242*f*2. This position energised causes the succeeding distributor element to change from 0 to 1 to indicate the next character which is to be transmitted.

Returning to the operation when 243*f*1 is energised by the opening of G2409, 243*f*1 energised prepares G2417 and G2418 so that as the character following the marked distributor element is read during IPC, this information is passed via G2417 into 241R and the pattern is stepped along under control of G2418 and G2420. ("1LT0" is read by a character read head from the selected outgoing line track; the "0's" are without effect.) As the information passes into 241R, G2410 will be opened by IPC and 242*f*2 energized, the latter being used in changing the next distributor element from "0" to "1," as explained above. When this element is read in PC, G2411 and G2403 open to energise 243*f*2, so cutting off the reading circuit at G2417. The same PC opens G2412 to energise 244*f*1, which is the start tube of the time scale (not shown in the diagram). This time scale is used to transfer information from 241R to the outgoing line. The IPC following opens G2415 to energise 242*f*3; nothing further can happen to 242F and, hence, to 243F until the character stored has been transmitted and 244*f*2 energised once again.

The actual transmission takes place by means of 245F which is controlled by the output from 241R and time scale timings, TS10 etc., the figure after TS indicating the number of milliseconds from the start of the time scale. G2427 and G2426 open when 244*f*1 is energised so causing 245*f*2 to be energised to operate relay RR, the contacts of this relay causing a space, i.e. start signal, to be sent to line. At TS20, G2421 and G2424 open but only one or the other of G2422 and G2425 can open, dependent upon the element stored in 241R1; 245F will be set according to this element (241r1.1 or 241r1.0, via 241X) and the relay contacts will send this element to line. In Fig. 24, 241r1.0 is intended to indicate space and 241r1.1 to indicate mark, it being assumed that marks were recorded as "1" in the original message reception.

At TS30, G2419 and G2420 will open causing the pattern in 241R to step so that the second element of the first character will be stored in 241r1. At TS40, G2421 and G2424 open again and either G2422 or G2425 open according to the information given by the second element in 241r1. Thus, 241F is set dependent upon this element and the *rr* contacts transmit the information to the line. The contents of 241R are stepped again at TS50 and the third element is now stored in 241r1. Each element in turn is examined and transmitted by 245F until when TS120 arrives all elements have been transmitted. TS120 now opens G2423 to energise 245*f*1 and release RR so that mark, i.e. stop element, is transmitted to the line. At time TS150, G2404 opens and energises 244*f*2 so stopping the time scale, at the same time restoring the latter to its TS0 condition.

With 244*f*2 energised, the next PA pulse can open G2408 to energise 242*f*1. When the "1" distributor element is reached, and this will now be before the second character, G2409 opens to energise 243*f*1 and the character is read via G2417 into 241R, the pattern being stepped via G2418 and G2420. Again 242*f*1 and 242*f*2 cause the "1" element to be changed to "0" and the next "0" element to be changed to "1."

The operation already described of 242F, 243F and 244F will continue for the second and succeeding characters. As each character is sent to the outgoing character register it is examined for "end-of-message." A particular character is used to denote the end of message. When this character is read, the PC pulse used to energise 243*f*2 also opens G2413 to energise 241*f*4 to show that the outgoing line track under consideration is ready to receive a further message. The line character just passed to the outgoing register is transmitted by operation of 244F as for the other characters.

The case in which a message contained on several storage tracks has to be transmitted will now be described.

It will be assumed that when the first part of the message has been transferred, as already described, a "1" will have been recorded in the distributor element position following the last character. First, if the end of message character is not received before this distributor element is encountered for sending the next character whilst 242*f*2 is energised the PC pulse which occurs will open G2414 to energise 241*f*3. (Note: 241*f*4 energised indicates that the last part of the message has been transmitted, whilst 241*f*3 indicates that only part of the message has been transmitted.) 241*f*3 causes 251*f*1 to be energised in the same way that 241*f*4 caused 251*f*1 to be energised when a new booking was required. However, for a continuation message there is no necessity to search for a new booking. Instead the track number indicated in the last two character positions of the part of the message transferred to the outgoing line track will give this information. As before, 251*f*1 energised causes 261C to step until it reaches a position agreeing with the outgoing line requiring the continuation message. When this position is reached the appropriate gate of G2527, G2528 or G2529 will open causing 251*f*2 to be energised. The distributor element in front of the two character positions denoting the continuation track is indicated by a PF pulse. This pulse opens G2815 causing 282*f*1 to be energised. 282*f*1 prepares G2728 so that the correct information will be passed according to the position of 261C by one of the gates G2726, G2730 or G2731. As this information passes via G2714 into 272R the pattern in 272R is stepped under control of G2729. The waveform WT covers the two character positions which have to be passed to 272R. The PG pulse which arises between these two character positions causes G2416 to open to restore 241F to position 1 energised so as to remove the request for common equipment from 241*f*3, while the PD pulse which comes immediately following these characters opens G2532, followed by G2524, to energise 251*f*8. As described for the original booking, search operation 251*f*8 is the initiating signal which causes 281F to operate to control 281C and 282C. As previously, 281C and 282C will be positioned according to the codes set up on 272r6–10 and 272r11–15 respectively. Further operation takes place as already described. At the end of the transmission of the part of the message just transferred, 241F will be set to either 241*f*3 energised or 241*f*4 energised, according to whether this portion of the message contains the end of message character, or otherwise.

Having now described the processes for reception, storage and retransmission of messages in a completely automatic telegraph exchange, it is necessary to describe the means by which the transmission made of a single message to its various indicated addresses or destinations may be "ticked off" as they are made, and the common store or stores holding the message released for newly-arriving messages when the last transmission has been made (Sections (*l*) and (*m*) respectively).

As has been indicated earlier, this function requires the generation of Track Clearing Signals based on the use of destination (or address) code elements, so that track freeing and address concentration have much in common. Address concentration has so far been described for messages withdrawn from store; for the generation of Track Clearing Signals, address concentration at the incoming end is preferred, so that the destination code elements may be applied to each store as it is taken into use, for providing a "tally" of the number of transmissions to be made.

The basis of the arrangement to be described is the use of certain elements of a storage track for recording the number of different destinations to which a message is to be sent, the position of each element serving, moreover, to identify the corresponding destination. One element per destination is required, which means that one character recording section of five elements can be used to provide for five destinations. It is assumed that the character section(s) chosen for this purpose will appear immediately before the character positions used for recording the continuation line track number, the destination elements being denoted by a covering waveform WD, as shown in Fig. 8D. As will be seen later it is necessary to treat each destination element separately at one stage and so each element will be further covered by individual pulses P$t$ $dx$, $x$ being 1, 2, etc., for destinations 1, 2, etc. respectively, sample pulse forms being shown in Fig. 8D.

It is the intention that, as the first track load of a message is passed from an incoming line track to the common store, the different destinations required will be obtained from the addresses and a kind of numerical record, or "tally," of the wanted destinations in the form of a series of elements will be made on the storage track used for the first part of the message. At the same time a similar record will be made on the line track so that this information can be recorded at a later stage on any necessary continuation storage tracks.

After a message has been completely received, and when transfer from store to an outgoing line track takes place, the related destination element for the outgoing line track concerned will be wiped out from the particular storage track involved in the transfer. A search is continually being made of the destination elements, using individual equipment for each storage track, so that when a state is reached in which no destination elements are present, the track indicator can be set to the "free" condition, indicating that the storage track can be used for a further message.

The figures particularly associated with this part of the description are Figures 3A and 6A, previously referred to, and Fig. 31, Figs. 34 and 35 being also relevant as giving overall pictures of the functions to be described.

The description starts from the time that a message is being transferred from a line track to a storage track, as described above in sections (*b*) and (*d*) respectively for complete short messages (less than one track load) or for the first track loads of longer messages.

In such circumstances, BRS (Booking Required Signal) is operative, and transfer of booking information is under the control of register 22F. In position 1 of 22F, the priority (obtained from the line track) is transferred to booking; in position 2, the line circuit number (from the position of 23F) is transferred, and so on. However, the addresses for the message appear in the line track between the priority and the full stop that terminates the "first line." Hence, BRS, inhibited by 22$f$1 during priority transfer, but allowed to be active thereafter, is a convenient control for extracting the addresses.

Figure 6:
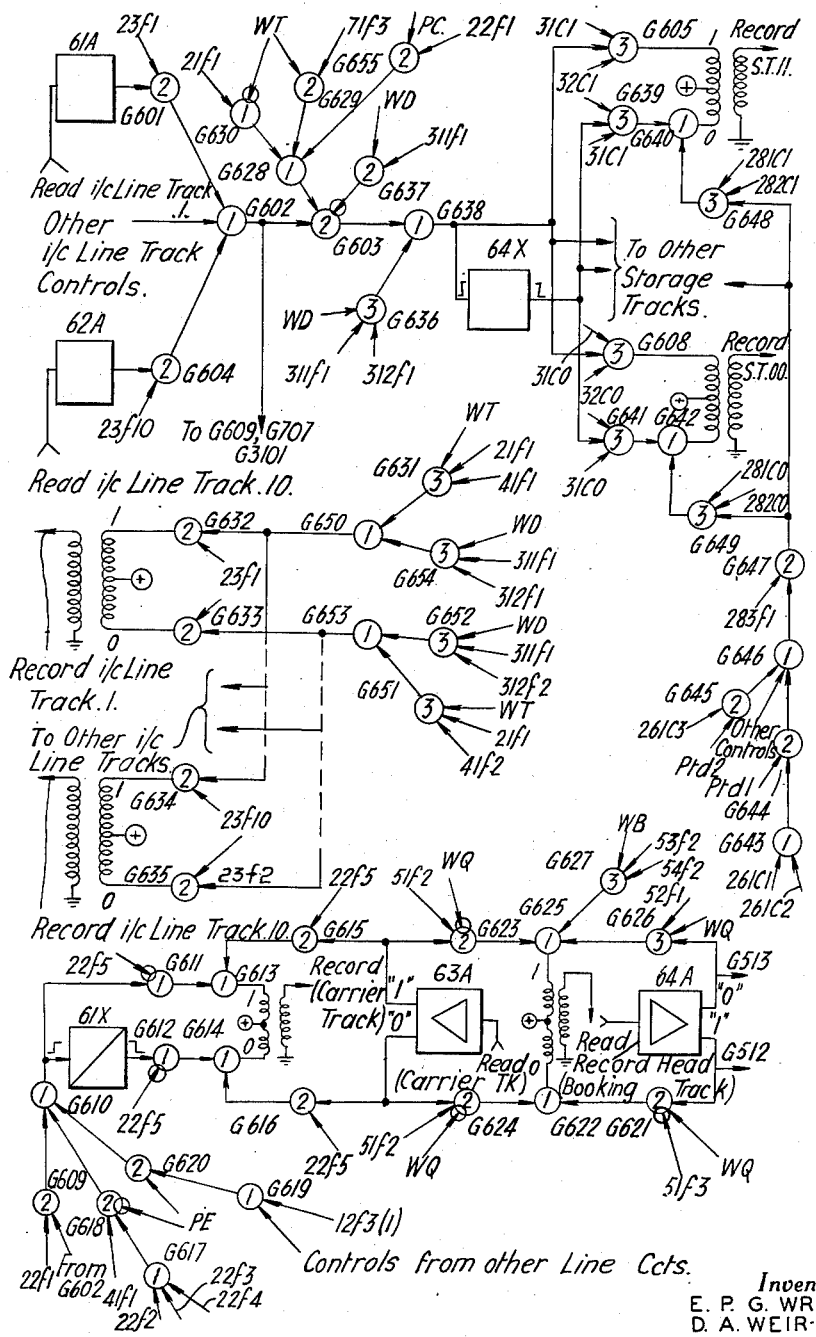

G3101 in Fig. 31 monitors on the line-to-store transfer gate G602 in Fig. 6, and at times $t_1$ in wave form sections IPC when BRS is not inhibited by 22$f$1, addresses are passed into register 311R, element by element, and stepped along at times $t_2$ via gate G3102. Control 21$f$1 denotes the transfer operation and 311$f$2 is a full-stop monitor in its rest position.

At the end of each IPC section, therefore, 311R contains a complete address character in its positions 1–5.

Register 312R in Fig. 31 is a concentrator for the various destinations assumed to be accessible from the switching equipment—capacity for three such destinations only being shown, by way of example—and the gates G3107–G3110 between the two registers are decoding gates for directing the addresses received in 311R into the appropriate destination position on 312R.

Each element position 1–5 of 311R is provided with a 1 or a 0 output, the latter via an inverter, as shown for example a 311X for position 1, and each 1 or 0 output is strapped as required, according to the various address codes, to the corresponding one of the gates G3107–G3110. Thus, if the telegraphic code for address 1, at destination 1, and decoded in G3107, is MMMSM, then 311$r$1.1, 311$r$2.1, 311$r$3.1, 311$r$4.0, 311$r$5.1 would be strapped to G3107 (via suitable decoupling elements, not shown); and so on for other addresses, for the same, or for other of the destinations.

Each set of address decoding gates for each destination is fed via "Or" gates G3111, G3113, G3115 respectively and PC-controlled gates G3112, G3114, G3116 respectively to the appropriate destination positions in 312R. G3107 and G3108 show address decoding gates for destination 1, G3109 and G3110 show one decoding gate each for destinations 2 and 3, the existence of others being indicated on gates G3113 and G3115.

Thus, if the first address code received in 311R is for address 1 of destination 1, then, in the PC element following the close of the IPC element in which it was received in 311R, G3112 opens, and 312R1 is energised, and 312$r$1.1 becomes positive.

In the next IPC element, the second address is passed into 311R, replacing the first, and again the succeeding PC pulse tests the destination coding gates (G3112 etc.). Should the new address be for a destination for which an address has already been received (i.e. 1, in the present example), the appropriate gates, e.g. G3108, G3111, G3112, will open, but no change will be recorded in 312R, as the corresponding position will already have been energised, and the address is thus absorbed.

Should the address be for any other destination, then the appropirate position of 312R will accordingly be energised, and the action will proceed thus for succeeding addresses until the full stop (see Fig. 8D) at the end of the "first line" passes into 311R. The full-stop code from 311R1–5 is strapped to the gate G3104 controlling 311F, and in the succeeding PC element, 311F is energised to position 1.

Action in response to the full-stop code is as follows: The removal of 311$f$2 from G3101 on the change-over of 311F closes that gate, so that no further information can pass from the line track to 311R, and 312R will thus now be registering as single energised elements all destinations to which the message has to be transmitted. Subsequently, G3102 clears the contents from 311R thus removing the full-stop code from G3104, so that 311F2 can be re-energised at the end of transfer in preparation for subsequent use.

When, in due course, the WD waveform (Fig. 8D) occurs during the transfer operation, and in advance of PD (a pulse which occurs for the last element of the track, but shown in Fig. 8C as preceding the first element; see also Figs. 8A and 8B), 311*f*1 will still be energised, and consequently G637 will open, applying an inhibition to G603 to close it, thereby preventing information on the line track passing to the storage track for this period. (No vital information on the line track is, in fact, lost by this process, since the end of the line track for receiving incoming messages is determined by the pulse PX which can be derived at any predetermined required point in the track, the remainder of the track being then available for supervisory purposes.) Instead, G636 will examine the state of 312*f*1 during waveform WD. 312F examines the condition of 312R1 and, owing to the stepping action provided by $t_2$ through G3116 during WD, 312F will record whether or not different destinations have to be recorded. For required destinations, 312*f*1 will be energised, and a 1 will be recorded via G636 and G638 and gates like G605 for each such destination in due position on the track. For destinaitons not required, 312*f*2 will be energised, G636 will remain closed, and 0 will be recorded via 64X and gates like G639 for each such destination.

At the end of WD, 312R will have been completely cleared in readiness for further operations, and when the PD pulse occurs at the end of the transfer operation, 311*f*2 will be re-energised so returning this part of the circuit to the initial condition. The storage track involved in the transfer will now be recording a code corresponding to the destinations to which the message must later be transmitted. Since it is required to record this code of destinations on any continuation tracks which may be taken into use for this message, the method of effecting this is to record the destinations code on the line track as well so that this information is readily available for transfer recording during later transfers to the continuation track(s).

The information is recorded on the line track as follows. During WD, when the destinations code is being initially recorded on the storage track, as described above, the information is passed via G654 and G650 (for 1's) or via G652 and G653, (for 0's) to record the same information on the appropriate line track. During later transfers of information from this line track to any continuation track, G636 and G637 will no longer be open so that the destinations code passes directly from the line track via G602, G603 and G638 to the relevant continuation storage track. During this operation, information is prevented from passing into 311R since BRS is no longer operative when information is passing to a continuation track. Thus, 311R remains in the cleared condition and 311*f*1 cannot be energised, so preventing information spuriously opening the decoding gates to 312R, or 311*f*1 inhibiting G603.

Having recorded the destination code elements on a storage track, it remains to show how this information may be used in the track clearing arrangement.

(*m*) *Freeing of storage tracks after complete transmission of message (Fig. 35)*

When the contents of a storage track are passing to an outgoing line track, 281C and 282C in combination denote the identity of the storage track and 261C denotes the identity of the outgoing line track involved in the transfer; 283*f*1 allows transfer to take place. This process has already been described under (*j*) above.

As explained above, P*td*1 is a pulse coincident with the destination 1 code element so that, if one of the two (assumed) outgoing line tracks concerned with this destination is being used in the transfer, G643 and G644 will open. The controls 261C1 and 261C2 denote line tracks 1 and 2 in the group for this destination. Thus, for this element P*td*1, G646 and G647 will open for a transfer to one of these line tracks, and 0 will be recorded in the element for destination 1 on the storage track used in the transfer, and on all relevant continuation tracks, in due course. For later transfer from this track to other destinations, other appropriate destination elements will be changed to 0.

Referring back now to Fig. 3, 36F is used to search for "1" recordings during the WD waveform for the particular track (11) with which it is associated. While the message on this track is still required for further transfers, G326 will open during WD and 36*f*1 will be energised. G328 cannot therefore open to PD (last track element), and 32*f*2 (or equivalent for other tracks) which was energised when this track was taken into use, will remain energised ("Busy"). The succeeding PA pulse at the commencement of the track restores 36F to position 2 energised in readiness for a check during the next cycle of the store.

Eventually, when the requisite number of transfers have been made, all the destination code elements will have become 0. When this occurs, 36*f*1 will no longer be energised during WD and, when PD occurs, G328 will open to energise 32*f*1 to indicate that this storage track is available for a new message.

Note that G327, which provides an inhibiting control on G328 from either 31*f*2 or 31*f*3, is added to prevent 32*f*1 being energised in the interval between this track being taken into use and the time that the needed destination code elements have been recorded.

(*n*) *Use of incoming address concentrator for making outgoing bookings*

The derivation of the destination code elements in this manner leads to a simplification of the procedure adopted in regard to the second embodiment described, which used the registers 301F etc. for the same purpose: for the destination elements having been once generated at an early stage in the proceedings, and recorded, are available at any future time for controlling a booking transfer.

For this purpose, after the first priority comparison and determination of the booking of the highest priority of completed message in storage, the procedure of reading the "first line" of the selected message and the making of outgoing bookings as each address is brought down would be replaced by the procedure (under the control of WD and P*tdx*) of reading the whole of the first store-load so as to include the stored destination code elements, staticising these elements in a register, such as, for example, the 301F series of registers, and using them as previously described.

Moreover, in such an arrangement, all the necessary bookings for one message could then be made simultaneously.

While the principles of the invention have been described above in connection with specific embodiments, and particular modifications thereof, it is to be clearly understood that this description is made only by way of example and not as a limitation on the scope of the invention.

What we claim is:

1. In a telegraph switching system, a switching center, a plurality of incoming lines, a plurality of outgoing lines, first magnetic track sections one of which is individual to each incoming line and each outgoing line, and each of which is capable of storing a teleprinter message, common magnetic sections accessible in common to all said incoming and outgoing lines, means for transferring a message received over an incoming line to its individual first track section, means for transferring a message stored in said individual first track section to a free common track section, means responsive to destination information carried by said message for selecting a wanted outgoing line and a first track section associated therewith, means for transferring a message stored in said common track section to said outgoing line track section and means for transmitting a message stored in said last-mentioned track section over said wanted outgoing line.

2. A telecommunication exchange system comprising a switching center, a plurality of incoming lines for receiving items of intelligence comprising teleprinter messages, message-priority information and message-destination information, a plurality of outgoing lines, common magnetic drum storage equipment at said switching center comprising a plurality of incoming and outgoing line storage sections for respective lines and comprising a plurality of common storage sections, line circuit means for storing intelligence items received over any said incoming line in the corresponding line storage section, first transfer means for automatically transferring stored intelligence items from said incoming line storage section into the said common storage sections, second transfer means for automatically transferring intelligence items stored in said common storage sections to selected outgoing line storage sections in accordance with destination information included with said intelligence items, and retransmitting means for automatically retransmitting stored information items from said selected outgoing line storage section over the associated outgoing lines.

3. A telecommunication exchange system as set forth in claim 2 comprising plural-track selecting means for selecting a plurality of common storage sections for storing a message too long for storage in a single section, sequence information storage means for automatically storing information as to the identity and order of use of the storage sections for said long message, and plural-section connecting means operable under control of said sequence information storage means for automatically and sequentially connecting the said retransmitting means to the respective storage sections containing said long message.

4. A telecommunication exchange system as set forth in claim 2 wherein multiple-address control means is provided for controlling the said retransmitting means to automatically retransmit over the same outgoing line all stored messages having the same destination information.

5. In a telecommunication system as claimed in claim 2, a separate teleprinter character store in each said line circuit means for receiving and storing a single teleprinter character transmitted at teleprinter speed over the associated incoming line, means for retransmitting each character received and stored at high speed and at spaced intervals to said line storage sections, and means in the said first transfer means for retransmitting at high speed all characters stored in said teleprinter character store into the said common storage sections.

6. In a telecommunication system as set forth in claim 2, priority-checking equipment for checking the said priority information associated with each stored message, outgoing booking storage sections for respective ones of said outgoing lines, and outgoing booking transfer means for transferring information regarding the stored message checked by said priority checking apparatus to a predetermined outgoing booking storage section in accordance with destination information associated with the said stored message.

7. A telecommunication system as claimed in claim 6 wherein discriminating equipment is provided to insure that a message is directed only once to an outgoing line.

8. A telecommunication exchange system as claimed in claim 7 wherein sorting equipment is provided for each outgoing line for automatically determining the sequence of transmission of messages thereover, each of said sorting equipments operating independently of the other.

9. In a telecommunication exchange as claimed in claim 8, connecting circuits between said retransmitting means and said common storage sections and means for controlling said connecting circuits to establish connections between the said retransmitting means and the common storage sections in accordance with sequence determination.

10. In a telecommunication exchange as claimed in claim 8 transfer-detecting means for detecting the transmission of messages from the common storage section to an outgoing line, common storage section clear-out means, and means controlled by the said clear-out means and said transfer-detecting means for clearing out common storage sections when the message stored therein is transferred to the outgoing line.

11. In a telecommunication system as claimed in claim 5, means included in said second transfer means for retransmitting at high speed each group of characters stored in said common storage sections to the said selected outgoing line, and means in the said retransmitting means for transmitting groups of characters received in said line storage sections to said lines at teleprinter speeds.

12. In a telecommunication system as claimed in claim 11, the said connecting circuits including an incoming transmission link and associated switching equipment for automatically interconnecting the incoming line equipment means with said common storage drum and incoming connecting circuits including an outgoing transmission link and associated switching equipment for automatically interconnecting any outgoing line equipment means with said common drum storage.

13. In a telecommunication system as set forth in claim 12, link control means included in said first transfer means for successively interconnecting a plurality of incoming line equipments with respectively corresponding common storage sections when said teleprinter character stores contain teleprinter characters, whereby successive portions of teleprinter messages being received simultaneously over incoming lines are transmitted over said link at random.

14. In a telecommunication system as set forth in claim 13, line storage section control means for recording the identity of the line storage sections storing successive portions of the same message.

15. In a telecommunication system as set forth in claim 12, link control means included in said second transfer means for successively interconnecting a plurality of outgoing line equipments with respectively corresponding common storage sections when said retransmitting equipment is ready to transmit, whereby successive portions of long messages stored at random in said common storage section are transmitted successively over the last said link.

16. In a telecommunication system as claimed in claim 11, detecting means in said line storage section control means for indicating when any line storage section is filled and for indicating the end of a message being stored, and means controlled by the said indications for controlling the said incoming transmission link and associated switching equipment to connect the last said line storage section to one of the common storage sections.

17. A telecommunication exchange system as claimed in claim 16 comprising means for recording in a line storage section the identity of a common storage section to which information in a line storage section is transferred, means responsive to the transmission of subsequent messages to another common storage section for extracting the record from the line storage section of the previous common storage section, means for using the said last-mentioned record after the message has been transferred to set the switching equipment associated with the said incoming transmission link to connect with the said previous free storage track, means for transferring the identity of the last used common storage section into said line storage section after extraction of the previous identity stored therein, means for transmitting the identity of the last-used common storage section over said incoming transmission link to said previous common storage section, and means for subsequently releasing the said transmission link.

18. In a telecommunication system as claimed in claim 6, common outgoing booking store equipment for recording particulars of stored incoming messages including the identity of the common storage section in which the beginning of a message is stored, the said outgoing booking transfer means including means operable when an outgoing line is free for selecting a common storage section containing the start of a message to be transmitted over the free outgoing line, and control means for controlling said outgoing transmission link and associated switching equipment to interconnect the selected common storage section to the corresponding outgoing line in accordance with the common booking control means.

19. In a telecommunication exchange as set forth in claim 18, automatic distributing equipment for distributing booking information to said outgoing booking store sections according to the destination of the messages.

20. A telecommunication exchange as claimed in claim 18, wherein each section of a message in a common storage section is accompanied by the identity of the storage section in which a succeeding section of the message is stored (or by an end of message signal) and wherein each succeeding common storage section identity transmitted from successive storage sections is stored in the outgoing line equipment and is adapted automatically to control the setting up of a transmission path from the storage section in question to the outgoing line equipment when a previous message section has been transmitted over the outgoing line.

21. A telecommunication exchange as claimed in claim 2 and which comprises incoming line circuits, outgoing line circuits, incoming character registers each individual to an incoming line circuit and each capable of storing a teleprinter character, outgoing character registers each individual to an outgoing line circuit and each capable of storing a teleprinter character at teleprinter speed and retransmitting at high speed, magnetic drum track sections, of which one is individual to each incoming line circuit and one is individual to each outgoing line circuit and each of which is capable of storing a number of teleprinter characters, common magnetic drum sections available in common to incoming line circuits and constituting said common storage sections, transfer equipment for automatically transferring incoming teleprinter character elements from an incoming line to its character register at teleprinter speed, means for automatically transferring teleprinter characters from a character register to the corresponding individual track section at drum speed, means for automatically transferring teleprinter characters from individual incoming drum track sections to common drum track sections, automatic discriminating means for automatically determining the next stored message to be sent out, selecting means for automatically selecting common drum track sections in which a message to be sent out is stored, means for automatically transferring teleprinter characters from common drum track sections to outgoing individual drum track sections, means for automatically transferring teleprinter characters at drum speed from outgoing drum track sections to outgoing character registers, and means for automatically transferring teleprinter characters element by element at teleprinter speed from outgoing character registers to corresponding outgoing lines.

22. A telecommunication exchange as claimed in claim 1, and comprising allocation equipment for automatically allocating a plurality of idle common track sections for use in storing successive portions of the same teleprinter message transferred from an individual incoming track section, and recording equipment for automatically recording the sequence of common track sections used for storing a single teleprinter message.

23. A telecommunication exchange as claimed in claim 22, and comprising message booking information stores, e.g. track sections, for incoming messages, and information-extracting and information-transferring equipment for automatically directing part of an incoming message constituting booking information, e.g. origin and priority information, to an idle booking store, together with (a) the identity of the common store, or the first of a plurality of common stores, used for storing that incoming message, and (b) a corresponding end-of-message signal (when eventually received).

24. A telecommunication exchange as claimed in claim 23, and in which said recording equipment records the identities of succeeding common track sections used for storing successive portions of the same teleprinter message, each in the last preceding common track section, whereby said recording equipment includes a portion of each common track section wholly used for storing a message.

25. A telecommunication exchange as claimed in claim 23, and comprising outgoing booking stores, message-handling equipments, end-of-message signal detection equipment for automatically detecting from the records in the booking stores bookings relative to completely received messages and transfer equipment for automatically transferring booking information relating to completely received messages from incoming booking stores to outgoing booking stores associated with message-handling equipments.

26. A telecommunication exchange as claimed in claim 25, and in which said transfer equipment includes means for automatically extracting priority information from all incoming booking stores in use and containing an end-of-message signal, means for automatically determining which message (for which an end-of-message signal has been received) has the highest priority, and means for automatically transferring booking information relating to the highest priority message to an outgoing booking store or stores individual to the destination or destinations for which the selected message is intended, under the control of, an address (or addresses) forming part of the selected message in the common drum track section.

27. A telecommunication exchange as claimed in claim 26, comprising first automatic selecting means, second automatic selecting means, and in which said priority determining means is effective to set a first automatic selecting means to give access to the common drum section containing the "first line" as herein defined of the said message and means responsive to the address, or each address in turn, contained in the "first line" to control the setting of a second automatic selecting means to select message-handling equipment appropriate to the required destination, or the required destinations in turn, in accordance with the said address(es), whereby the said transfer means can transfer the necessary booking information from said incoming booking store to the outgoing booking store(s) of the selected destinations.

28. A telecommunication exchange as claimed in claim 27 and in which discriminating equipment is provided for ensuring that only one outgoing booking is made for each outgoing direction (destination) selected in respect of a single message, irrespective of the number of addresses accessible via that outgoing direction and contained in the said "first line;" the said discriminating equipment comprising a multi-stable register per outgoing direction which is arranged to be set to a first position for the first occurrence of an address for a particular direction, means for deriving a signal in said first position being for controlling a transfer of booking information to the outgoing booking store of the particular direction so selected, and for setting said register to a second position, and wherein subsequent addresses for the same direction in respect of the same message are ineffective to reset the same register to the said first position and are absorbed.

29. A telecommunication exchange as claimed in claim 28, and comprising message re-transmission equipment for automatically sending out messages stored in said common drum sections over outgoing channels under control of said outgoing booking stores.

30. A telecommunication exchange as claimed in claim 29 and comprising automatic means for extracting priority information from all outgoing booking stores in use for a particular direction (destination), automatic means for determining which of the outgoing bookings for that direction has the highest priority, and automatic means for establishing a connecting circuit from the common drum section containing the message (or the first portion thereof) relative to the booking so determined to the outgoing line store (e.g. drum track section) for that direction for retransmission thereover.

31. A telecommunication exchange as claimed in claim 30 and comprising automatic sequence control equipment arranged to detect in turn the common drum section identity stored in an outgoing booking store and continuation identities stored in successive common stores used for storing a single teleprinter message, and means responsive to said identities automatically to connect up in proper order the common drum sections to the said outgoing line store.

32. A telecommunication exchange as claimed in claim 31 and comprising control equipment arranged to cancel a booking for an outgoing direction when the information contained in the relative booking store has been used to establish a re-transmission connecting circuit.

33. A telecommunication exchange as claimed in claim 5, means for transferring addresses contained in an incoming message from a line storage section to a common store, automatic means controlled by said transfer means for converting each address during the transfer process to a single code element of a first sort, together with means for recording said element in a predetermined position in said line store so as to form a part of said message.

34. A telecommunication exchange as claimed in claim 33 and which comprises also an address concentrating means whereby only one code element is generated for a plurality of addresses accessible via the same outgoing direction (destination).

35. A telecommunication exchange as claimed in claim 33 wherein said address conversion means comprises a pattern movement register having a position per address which is arranged to be energised by its appropriate address during transfer to provide the said first code element, an address which is absent from said message giving rise to a code element of a different sort for recording in the said predetermined position.

36. A telecommunication exchange as claimed in claim 34, wherein said address concentrator comprises a pattern movement register having a position per destination and gating means to each such position appropriate to each address accessible via the corresponding destination, whereby on the occurrence of one, or a plurality, of addresses accessible via a single destination, the address, or the first only of such addresses, will be effective to generate the said first code element; and in the case of destinations for which no addresses occur, a code element of a different sort will be generated for recording in the said predetermined position.

37. A telecommunication exchange as claimed in claim 36, and which comprises a store "busy" indicator for each common storage section means, responsive, during the transfer of a message from a common storage section to a line store for an outgoing direction, to the appropriate one of said first code elements in said message to maintain in a busy condition a store "busy" indicator appropriate to the said common storage section, and also to convert the said code element into an element of the said other sort for re-recording into the common storage section in place of the element read therefrom, whereby when all the first code elements are so converted, the store "busy" indicator will change to give a "store free" indication.

38. A telecommunication exchange as claimed in claim 34, and comprising means responsive to destination code elements stored with the associated message in a common storage section to control a transfer of booking information to one or more outgoing direction booking stores.

39. A telecommunication exchange as claimed in claim 38 and comprising means responsive to destination code elements stored with the associated message in a common storage section to control the simultaneous transfer of booking information to a plurality of outgoing direction booking stores.

References Cited in the file of this patent

UNITED STATES PATENTS

| | | |
|---|---|---|
| 2,541,133 | Toulon | Feb. 13, 1951 |
| 2,546,627 | Blanton | Mar. 27, 1951 |
| 2,575,329 | Blanton | Nov. 20, 1951 |
| 2,609,451 | Hansen | Sept. 2, 1952 |
| 2,622,153 | Schuler | Dec. 16, 1952 |
| 2,667,533 | Zenner | Jan. 26, 1954 |
| 2,766,318 | Bacon | Oct. 9, 1956 |
| 2,770,797 | Hamilton | Nov. 13, 1956 |
| 2,798,554 | Smith | July 9, 1957 |